(12) United States Patent
Dawson et al.

(10) Patent No.: US 12,407,037 B1
(45) Date of Patent: Sep. 2, 2025

(54) BUSBAR COOLING SYSTEM FOR A VEHICLE BATTERY PACK

(71) Applicant: Eaton Intelligent Power Limited, Dublin (IE)

(72) Inventors: James Dawson, Carol Stream, IL (US); Jason Degen, Carol Stream, IL (US); Jamie Houmard, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 836 days.

(21) Appl. No.: 17/693,313

(22) Filed: Mar. 11, 2022

Related U.S. Application Data

(60) Provisional application No. 63/159,689, filed on Mar. 11, 2021.

(51) Int. Cl.
| | |
|---|---|
| *H01M 10/625* | (2014.01) |
| *H01M 10/613* | (2014.01) |
| *H01M 10/6556* | (2014.01) |
| *H01M 10/6568* | (2014.01) |
| H01M 50/502 | (2021.01) |

(52) U.S. Cl.
CPC ....... *H01M 10/625* (2015.04); *H01M 10/613* (2015.04); *H01M 10/6556* (2015.04); *H01M 10/6568* (2015.04); *H01M 50/502* (2021.01); *H01M 2220/20* (2013.01)

(58) Field of Classification Search
CPC ............ H01M 10/625; H01M 10/613; H01M 10/6556; H01M 10/6568; H01M 50/502; H01M 2220/20
USPC ......................................................... 429/120
See application file for complete search history.

(56) References Cited

U.S. PATENT DOCUMENTS

| | | | |
|---|---|---|---|
| 2016/0190663 A1* | 6/2016 | Bahrami | H01M 10/613 429/120 |
| 2018/0069278 A1* | 3/2018 | Mastrandrea | H01M 50/213 |
| 2018/0261992 A1* | 9/2018 | Bower | H01M 50/512 |
| 2019/0067763 A1* | 2/2019 | Ing | H01M 10/04 |
| 2020/0313260 A1* | 10/2020 | Wang | H01M 10/625 |

FOREIGN PATENT DOCUMENTS

| | | | | |
|---|---|---|---|---|
| EP | 3696877 A1 * | 8/2020 | | H01M 10/613 |

* cited by examiner

*Primary Examiner* — James M Erwin
(74) *Attorney, Agent, or Firm* — Meunier Carlin & Curfman LLC

(57) ABSTRACT

A busbar cooling system includes an enclosure and a conductive assembly. The enclosure has a first non-conductive housing and a second non-conductive housing that are configured to permit fluid to flow through the busbar cooling system, the upper housing having an upper internal wall arrangement and the lower housing having a lower internal wall arrangement, wherein the upper and lower internal wall arrangements collectively define a plurality of distinct and concentrically arranged cavities. The conductive assembly is configured to permit electrical current to pass through the busbar cooling system, said conductive assembly includes an internal cooling core having a plurality individual conductors that are concentrically arranged in a spaced apart relationship to one another, and wherein each cavity is configured to receive a substantial extent of one of the conductors of the internal cooling core.

19 Claims, 48 Drawing Sheets

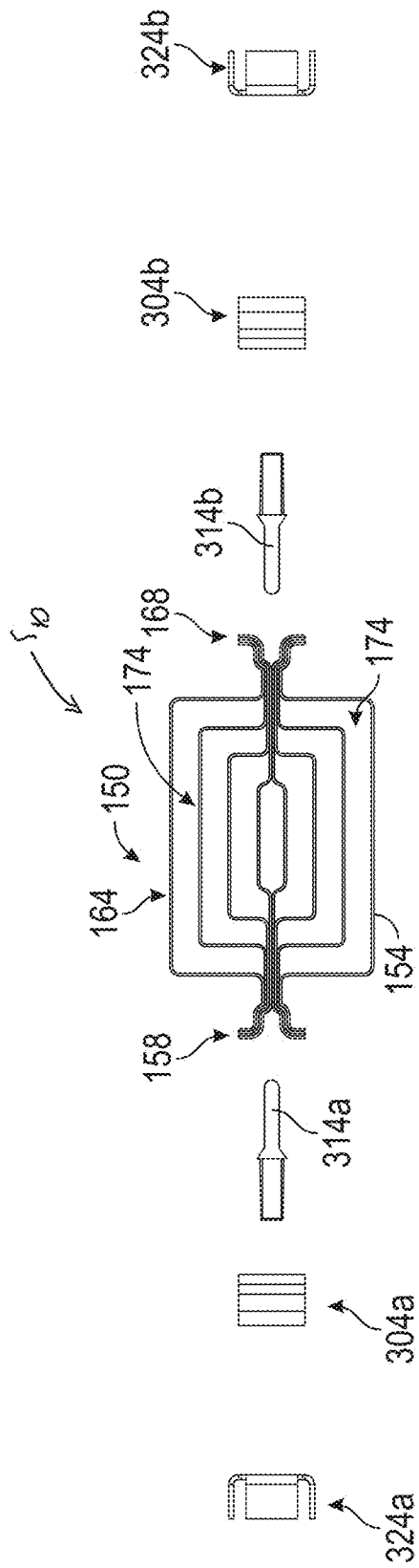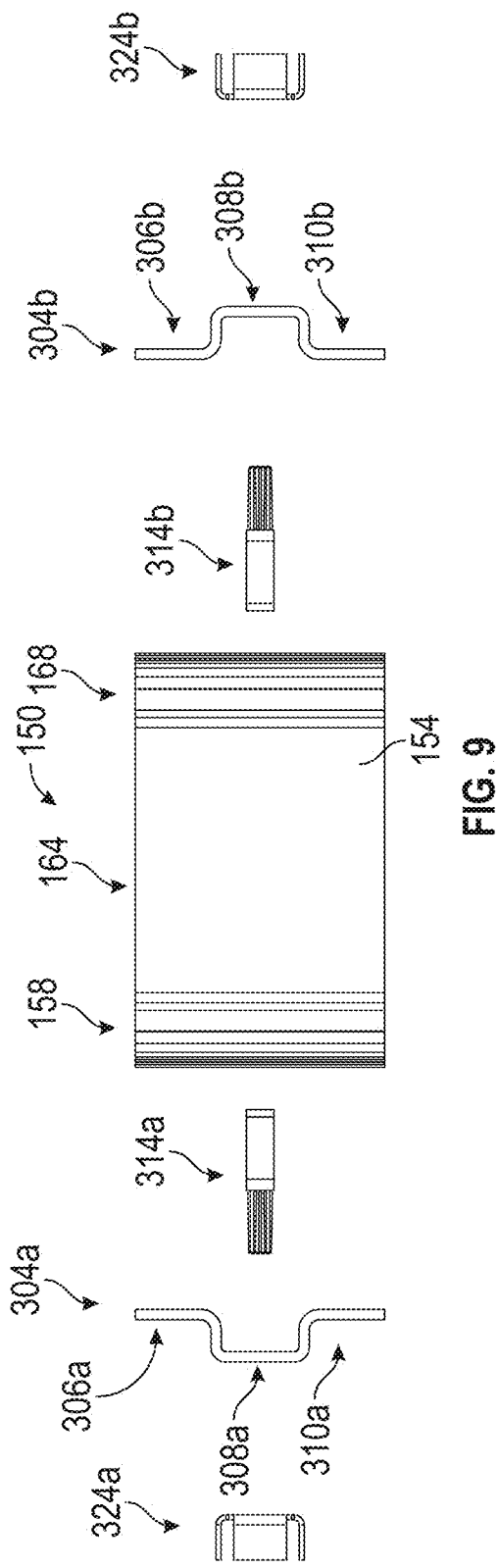

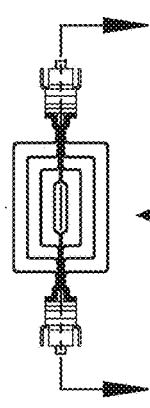
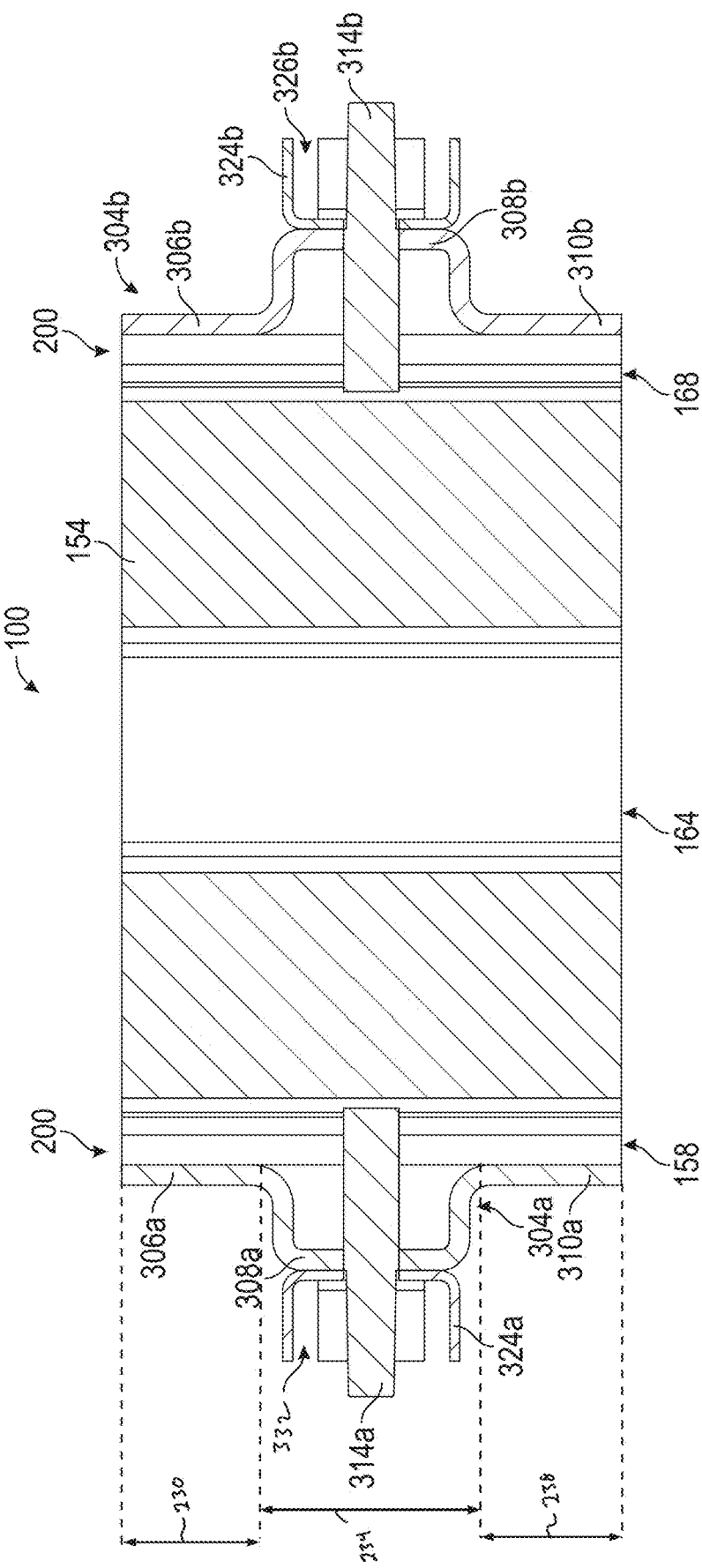

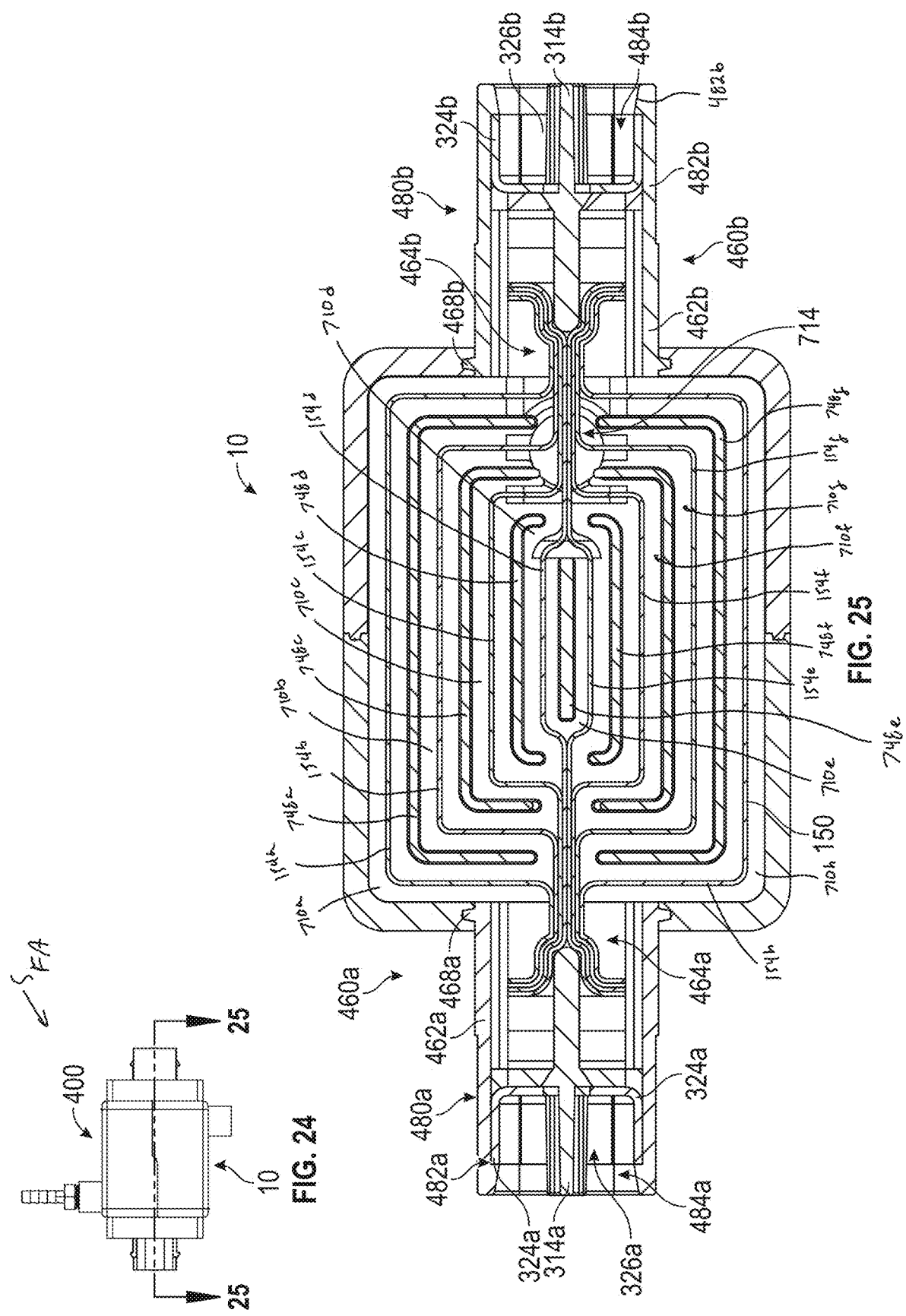

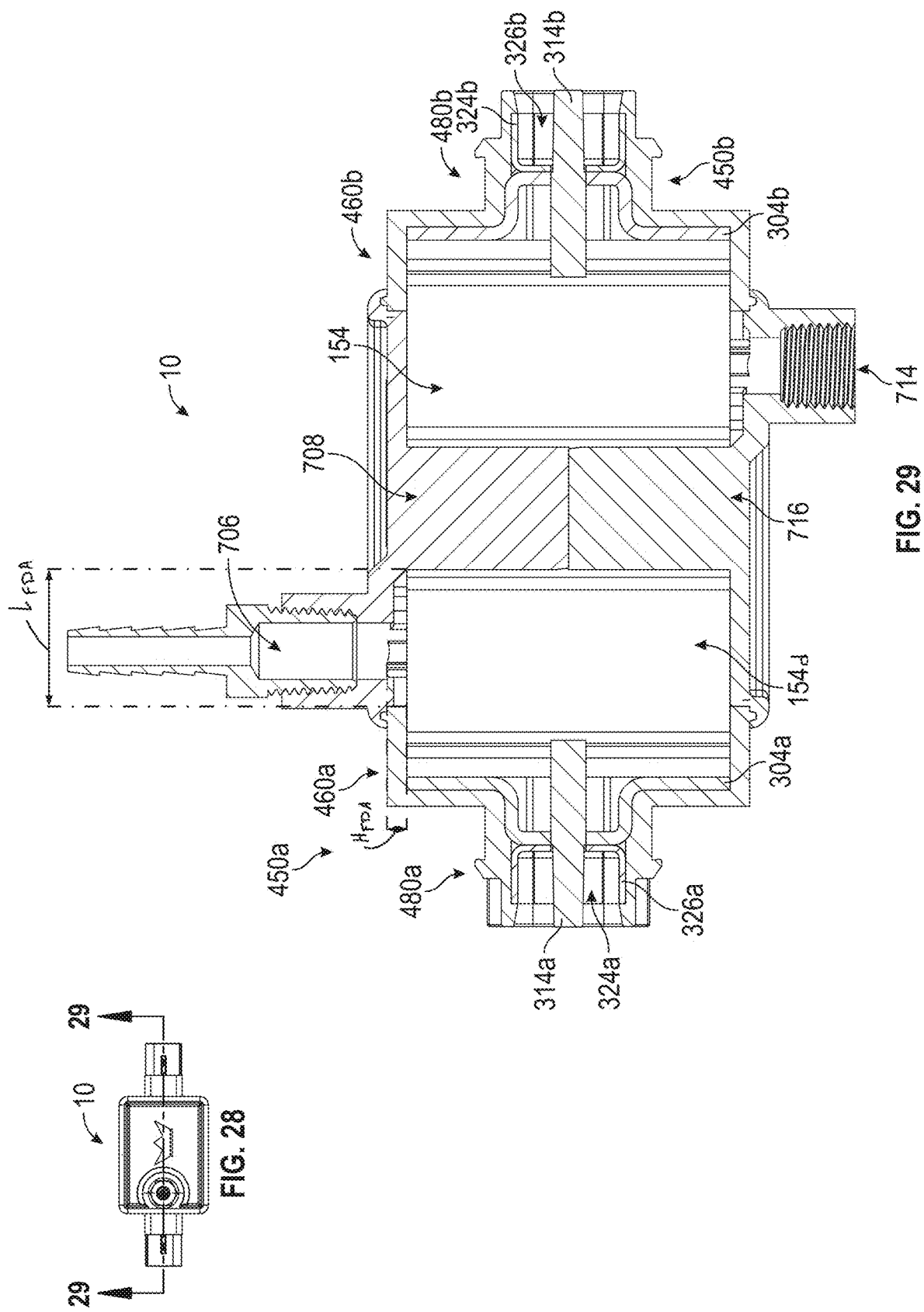

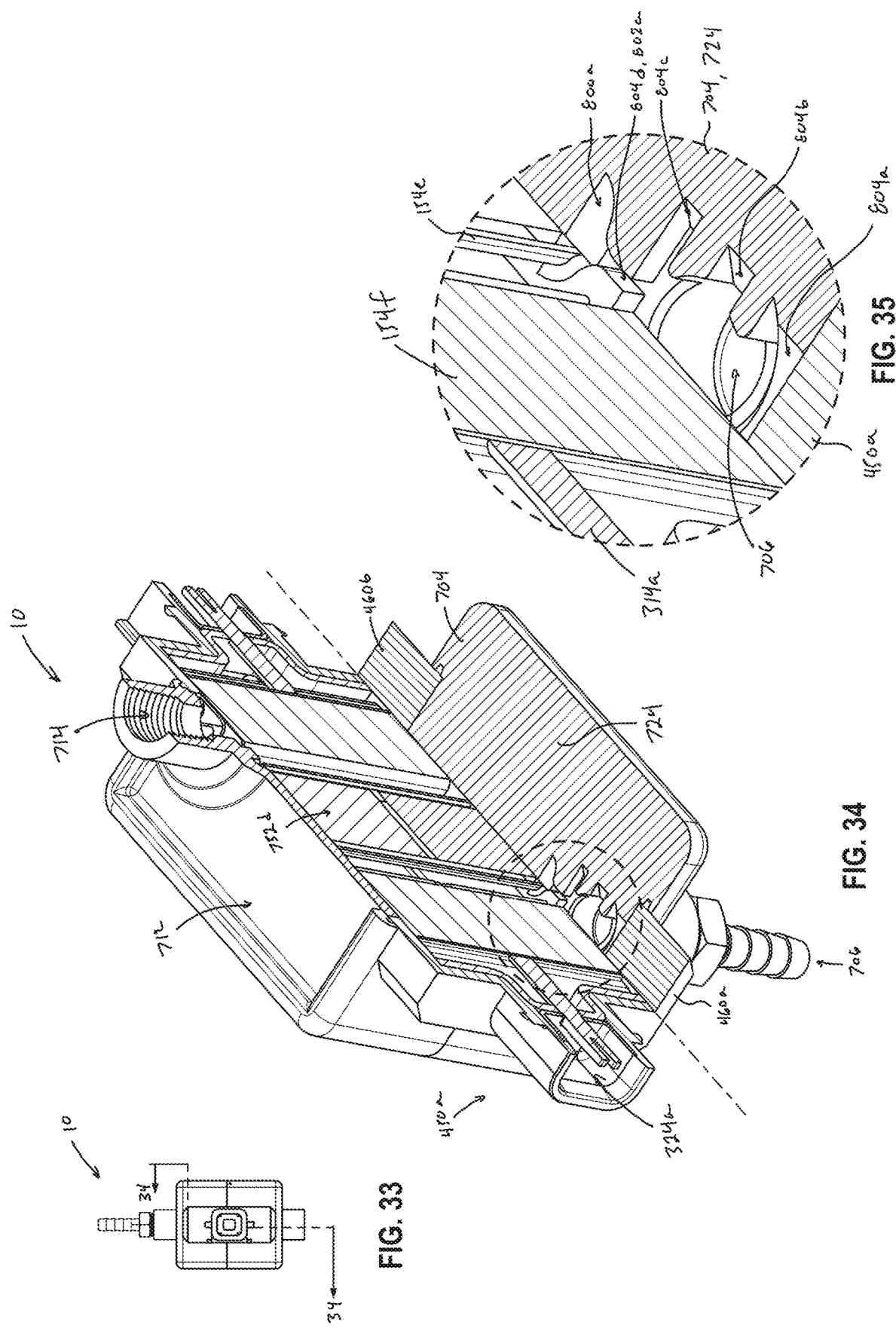

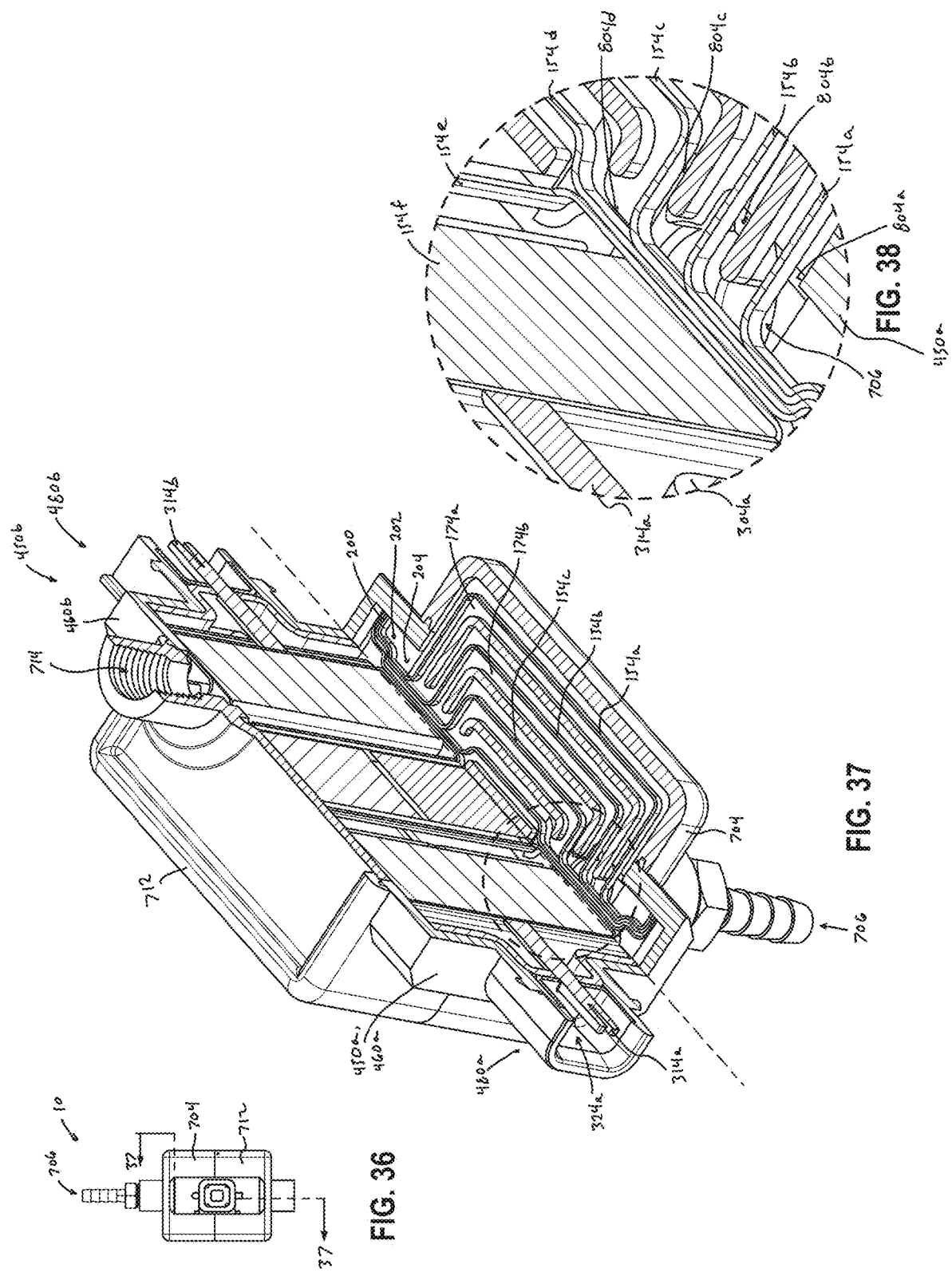

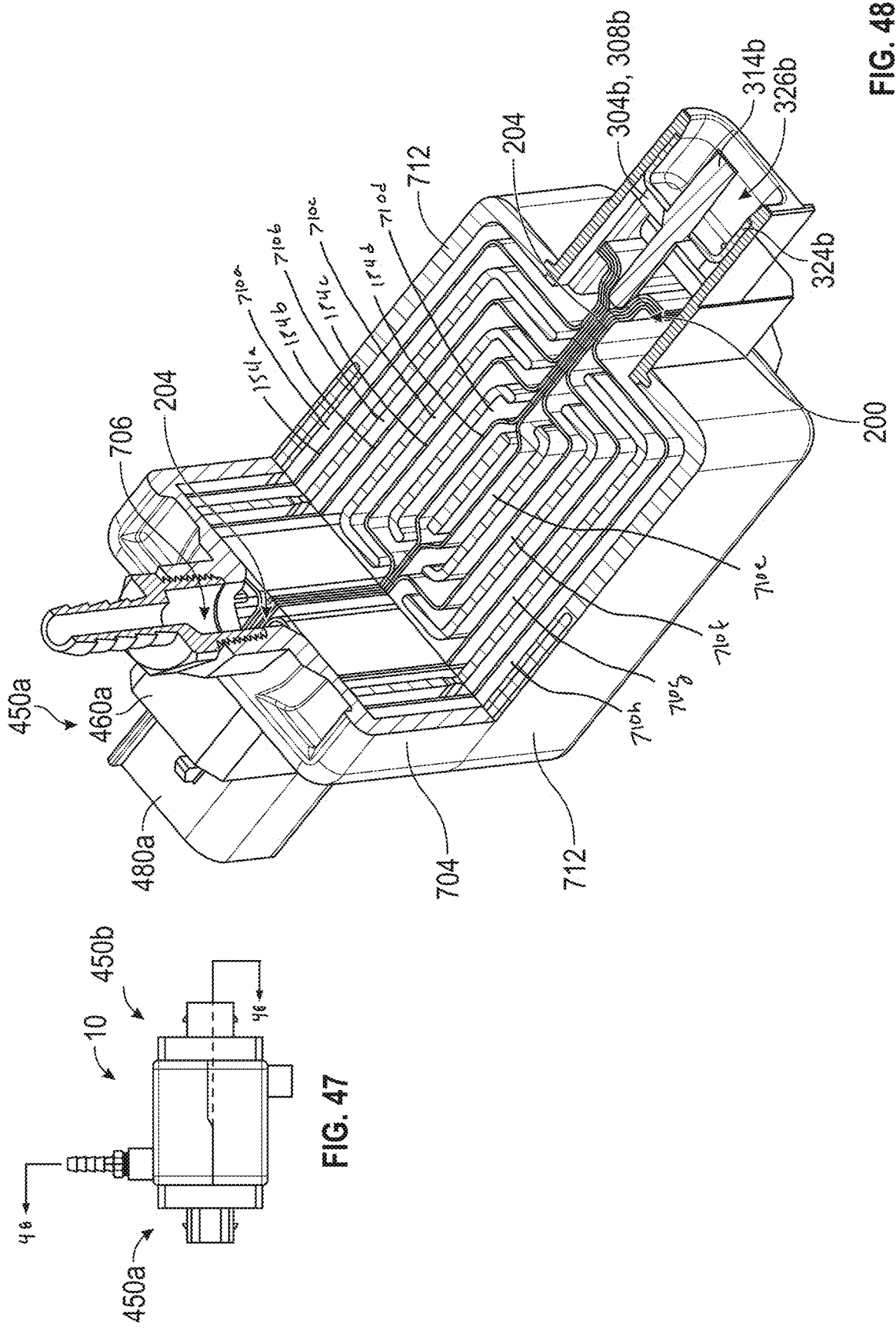

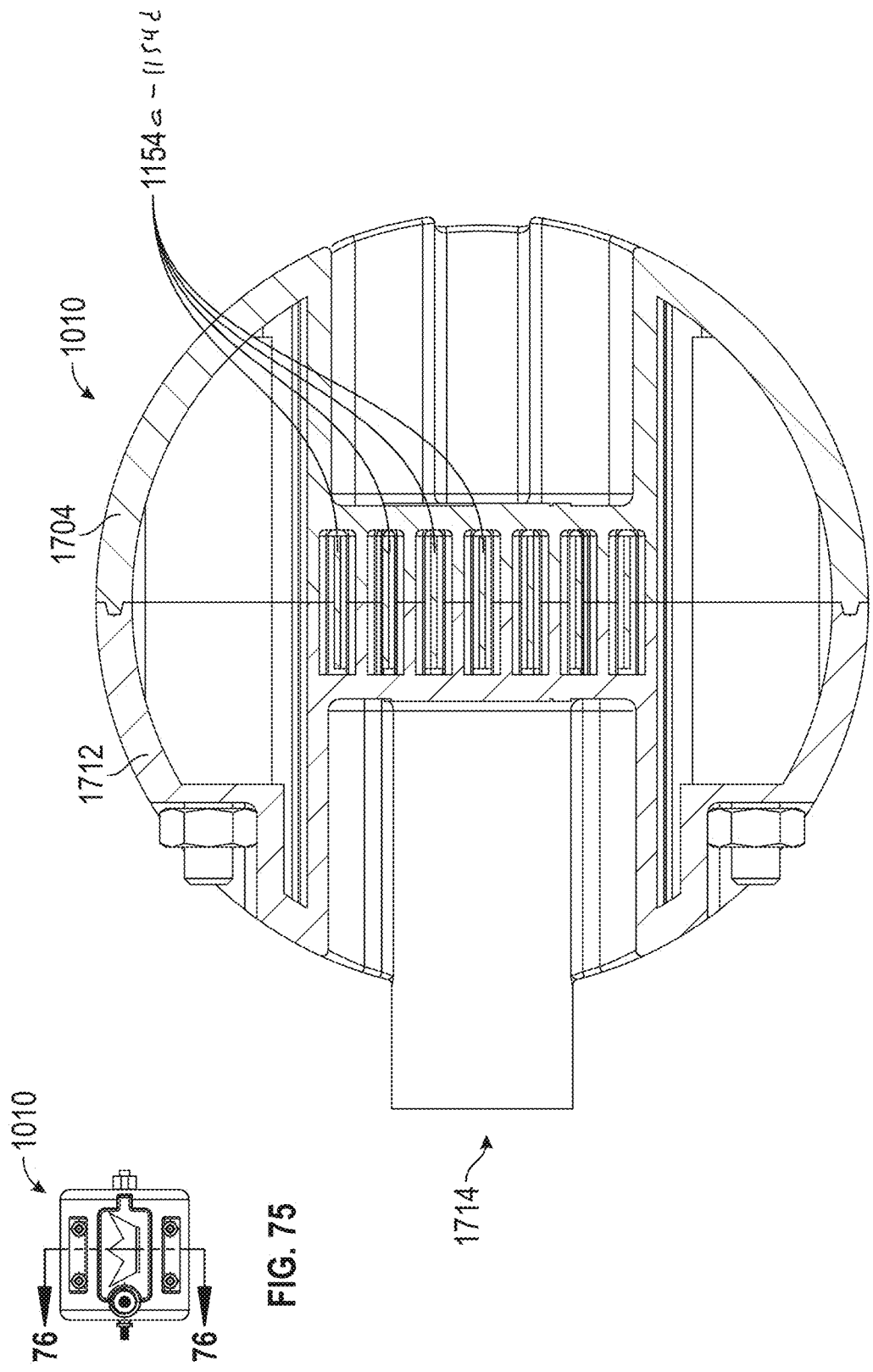

BUSBAR COOLING SYSTEM FOR A VEHICLE BATTERY PACK

PRIORITY CLAIM

This application is claims the benefit of U.S. Provisional Patent Application Ser. No. 63/159,689, the disclosures of which is hereby incorporated by reference in their entirety for all purposes.

TECHNICAL FIELD

This disclosure relates to a busbar cooling system to improve thermal management issues associated with rapidly charging and/or discharging a battery pack in a vehicle, such as a motor vehicle. In particular, the busbar cooling system has an enclosure with upper and lower housings, a current inlet casing, a current outlet casing, a male charging connector assembly, and a male discharging connector assembly. The cooling system also includes a conductive assembly with an internal cooling core that is bathed with a cooling fluid within the enclosure, a current inlet assembly, and a current outlet assembly.

BACKGROUND OF THE INVENTION

Electrified vehicles, including hybrid electric vehicles (HEVs), plug-in hybrid electric vehicles (PHEVs), fuel cell vehicles (FCVs), and battery electric vehicles (BEVs), differ from conventional motor vehicles because they are operated using one or more electric machines or motors powered by a battery pack. The battery pack includes a plurality of battery cell assemblies arranged in one or more battery arrays or modules. These battery arrays or modules are electrically and mechanically coupled to one another using busbars. In addition, the battery pack is electrically and mechanically coupled to an on-board charger for AC charging and an exterior charger for DC charging using busbars.

There are two primary types of chargers used to charge the battery cells in the battery pack of a vehicle. The first type of charger is located within the vehicle and commonly referred to as an "on-board" charger. The on-board charger typically: (i) accepts AC from an external source (e.g., outlet), (ii) has limited power, typically less than about 22 kW, and (iii) needs a considerable period of time to fully charge the vehicle's battery pack. Charging times for the vehicle's battery pack using the on-board charger are typically between 8-12 hours and can reach up to about 24 hours depending on the power level of the charger and the battery characteristics.

The second type of charger is external to the vehicle and commonly referred to as an "off-board" charger. This off-board charger typically: (i) accepts DC from an external source (e.g., fast-charging station or "super charger"), (ii) has nearly unlimited power, and (iii) needs only a short period of time to fully charge the vehicle's battery pack. Charging times for the vehicle's battery pack using the off-board charger are typically between 30 minutes and 1 hour depending on the power level of the charger and the battery characteristics. However, it is desirable to further reduce the charging time, for example under 15 minutes or even 10 minutes, to improve the utility of the vehicles, reduce the vehicle's downtime while charging and make them more appealing to the general public and consumers.

Reducing the charging time of the vehicle's battery pack can generally be achieved in two ways: using higher charging voltages or using higher charging currents. Using a higher charging voltage is typically not feasible because it undesirably increases the size, weight, and cost of the charging system due to at least the insulation requirements and other concerns. While using a higher charging current does not involve the same concerns associated with increasing the charging voltage, using a higher charging current does create thermal management issues that must be addressed. These thermal management issues, namely the build-up of heat, result from the high current flow over electrical components that have resistances. These thermal management issues are further exacerbated because the vehicle is stationary and not moving when it is charging and as a result, there is no air flow passing through the vehicle to provide convective cooling of the various electric components and the battery pack.

In addition to the significant thermal management issues that arise while charging the battery pack, other thermal management issues may arise while rapidly discharging the battery pack. For example, the rapid discharge of the battery pack may occur when a vehicle is quickly accelerated (e.g., launch control found in the Porsche Taycan or the Ludicrous Mode found in the Tesla Model P) or aggressively driven for even a relatively moderate period of time.

Conventional methods attempting to manage these thermal management issues include active cooling of the battery cells, increasing the cross-sectional area of the busbars that are utilized to carry the current from the source (e.g., charger or battery) to the receiver (e.g., battery or motor), and/or replacing certain electrical components with other components that have a lower resistance. However, each of these solutions has significant limitations and concerns that reduce their effectiveness and/or practicality. For example, actively cooling the battery cells increases system weight, cost and complexity and does not solve thermal management issues associated with transferring current into or out of the battery cells. Additionally, the reduction in cooling that is achieved by increasing the busbar's cross-sectional area does not overcome the downside effects of increasing the weight and material costs of the enlarged busbar. Finally, using lower resistance materials undesirably increases the cost of the charging system, thereby reducing its practicality and appeal.

Accordingly, there is an unmet need for a busbar cooling system that effectively manages the thermal management issues associated: (i) charging the battery pack or (ii) discharging the battery pack, including the usage of conventional busbars. A full discussion of the features and advantages of the present invention is deferred to the following detailed description, which proceeds with reference to the accompanying drawings.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 8 is a top view of the conductive assembly of FIG. 7;

FIG. 9 is a side view of the conductive assembly of FIG. 7;

FIGS. 11 and 12 are top views of the conductive assembly of FIG. 10;

FIG. 13 is a cross-sectional view of the conductive assembly taken along line 13-13 of FIG. 12;

FIG. 24 is a second side view of the busbar cooling system of FIG. 22;

FIG. 25 is a cross-sectional view of the busbar cooling system taken along line 25-25 of FIG. 24, showing the distinct cavities and an extent of the internal cooling core positioned therein;

FIG. 28 is a top view of the busbar cooling system FIG. 22;

FIG. 29 is a cross-sectional view of the busbar cooling system taken along line 29-29 of FIG. 28, showing an extent of the cooling core and the enclosure with inlet and outlet openings;

FIG. 33 is a first end view of the busbar cooling system of FIG. 22;

FIG. 34 is a cross-sectional view of the busbar cooling system taken along line 34-34 of FIG. 33, showing a fluid distribution assembly formed in an extent of the upper housing;

FIG. 35 is zoomed-in view of FIG. 34;

FIG. 36 is a first end view of the busbar cooling system of FIG. 22;

FIG. 37 is a cross-sectional view of the busbar cooling system taken along line 37-37 of FIG. 36, showing a fluid distribution assembly formed in an extent of the upper housing with an extent of the internal cooling core positioned in said fluid distribution assembly;

FIG. 38 is zoomed-in view of FIG. 37;

FIG. 47 is a side view of the busbar cooling system of FIG. 22;

FIG. 48 is a cross-sectional view of the busbar cooling system taken along line 48-48 of FIG. 47, showing an internal conductor of the cooling core and the enclosure with the inlet opening;

FIG. 75 is a front view of the busbar cooling system of FIG. 70; and

FIG. 76 is a cross-sectional view of the busbar cooling system taken along line 76-76 of FIG. 75 and showing the system in the fully assembled state $S_{F4}$.

DETAILED DESCRIPTION

Figure 1:
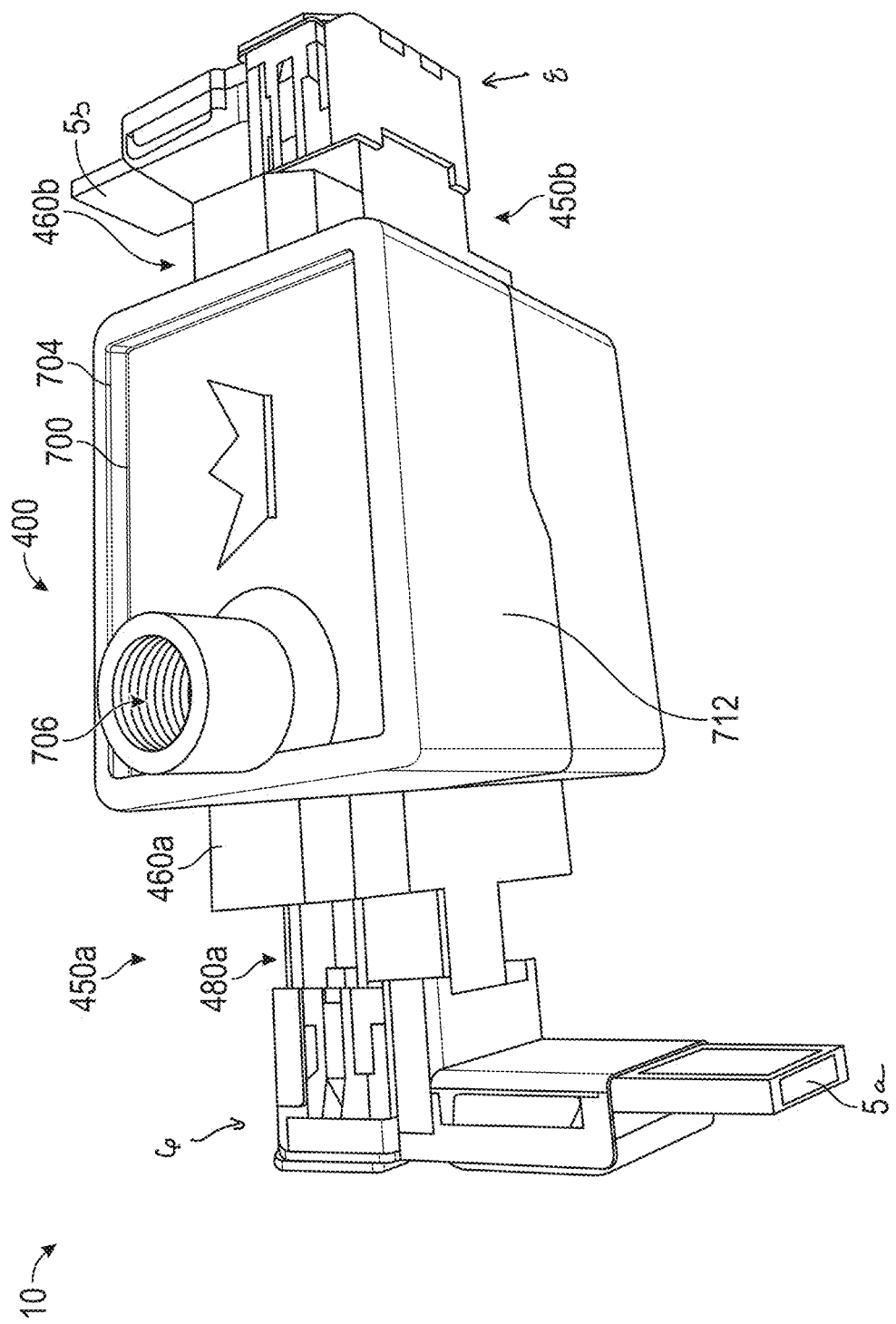
FIG. 1 is a perspective view of a first embodiment of a busbar cooling system having: (i) an enclosure with current inlet and outlet casings, (ii) a male charging connector assembly, and (iii) a male discharging connector assembly.
Figure 2:
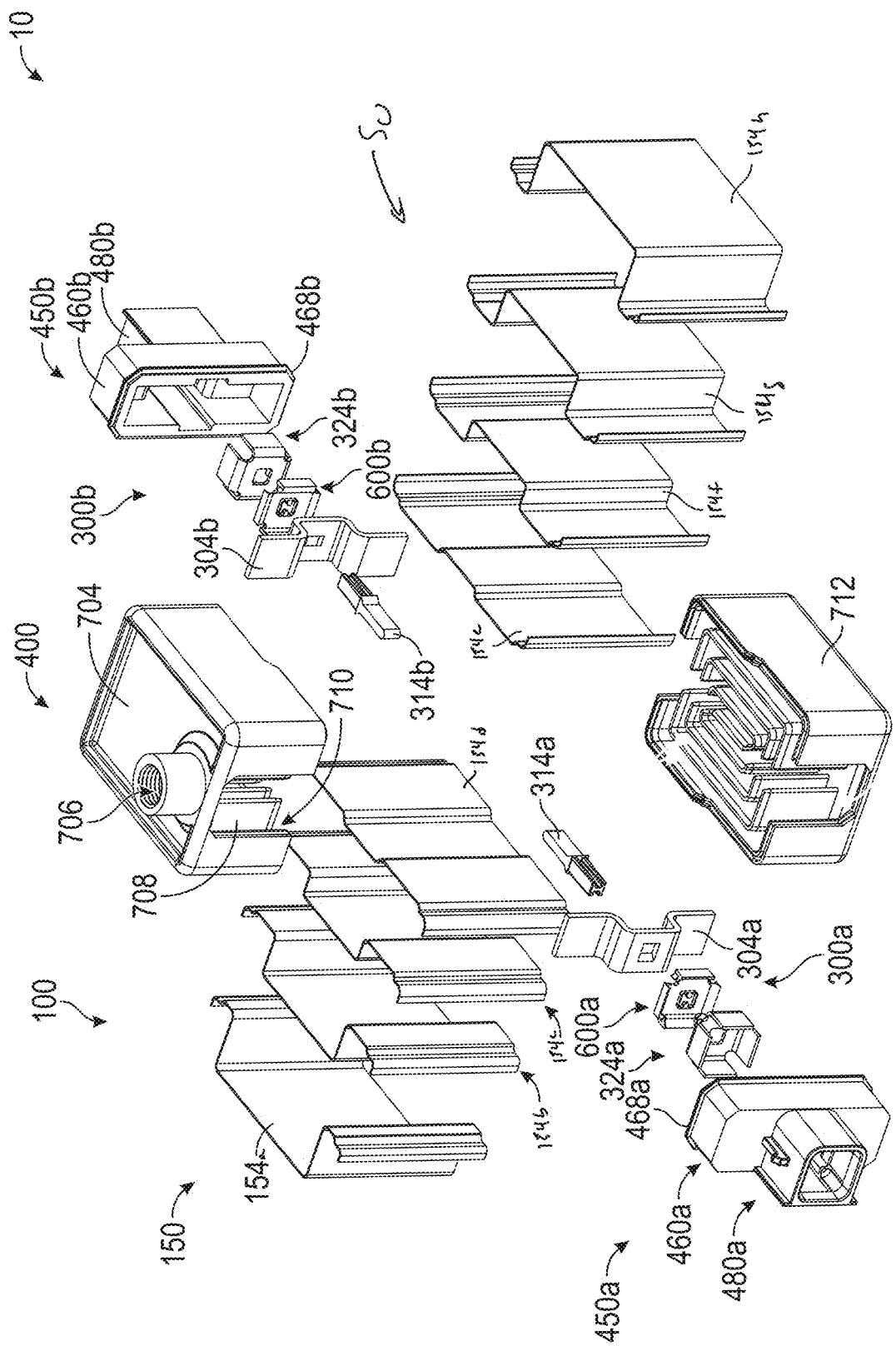
FIG. 2 is an exploded view of the busbar cooling system of FIG. 1, wherein the busbar cooling system includes: (i) the enclosure and (ii) a conductive assembly with an internal cooling core in an uncoupled state $S_U$, a current inlet assembly, and a current outlet assembly.

The detailed description set forth below is intended as a description of various implementations and is not intended to represent the only implementations in which the subject technology may be practiced. As those skilled in the art would realize, the described implementations may be modified in various ways, all without departing from the scope of the present disclosure. Accordingly, the drawings and description are to be regarded as illustrative and not restrictive.

The busbar cooling system 10, 1010 is designed and configured to help effectively control thermal management issues, namely excessive temperatures and undesirable heat buildup, associated with rapidly charging and/or discharging a battery pack, in particular a vehicle battery pack 4. In particular, the busbar cooling system 10, 1010 is designed to reduce the heat that is generated by current flowing across a busbar while current is flowing: (i) from outside of the vehicle and into the battery pack 4, (ii) between the battery modules contained in the battery pack 4, or (iii) between the battery pack 4 to a device or component within the vehicle (e.g., motors) that is external to the battery pack 4. Managing and reducing heat that is generated during these conditions is beneficial because it allows: (a) the battery pack 4 to be charged using a higher current level, (b) the battery pack 4 to be discharged at a higher current level, and/or (c) for more efficient use of the electrical power that is being used to charge the battery pack 4 or is being used by the external device (e.g., motors). Additionally, if the current level is not increased, then the busbar cooling system 10 allows the vehicle to employ (i) materials that have higher resistivity and lower material costs, or (ii) busbars that have smaller cross-sectional areas which are reduces material costs and are lighter in weight. Further, the busbar cooling system 10, 1010 makes it easier or possible to comply with or exceed the current and heat performance requirements outlined in various vehicle specifications, such as USCAR.

As detailed in the following paragraphs, the busbar cooling system 10, 1010 reduces the heat generated by the current flow across the busbar and between vehicle components because it is positioned between the busbar's endpoints and preferably at or near mid-length of the busbar. In contrast to conventional devices that are designed to reduce the busbar's heat buildup, the busbar cooling system 10, 1010 is: (i) not simply positioned adjacent to the busbar, (ii) is not designed to merely envelop or surround the busbar with a fluid-filled jacket, and (iii) can be used in multiple different configurations. The system's 10, 1010 unique configuration, including its distinct enclosure with internal cavities are configured to receive a fluid that surrounds and bathes a significant extent of the electrical conductors in a spaced-apart relationship, is significantly more efficient at cooling the busbar in comparison to t conventional devices. As such, the structures and/or features of conventional devices cannot be simply adopted or implemented into a busbar cooling system without careful analysis and verification of the complex realities of designing, testing, manufacturing, and certifying a busbar cooling system. Theoretical designs that are an attempt to implement such modifications from conventional devices are insufficient (and in some instances, woefully insufficient) because they amount to mere design exercises that are not tethered to the complex realities of successfully designing, manufacturing, validating and testing a busbar cooling system.

The multiple different configurations of the busbar cooling system 10, 1010 have unique benefits and may be used independently of one another or in combination. In one configuration shown in FIG. 52, the busbar cooling system 10, 1010 may be completely separate from the vehicle's active cooling system. In this configuration, the busbar cooling system 10, 1010 includes a separate pump and a separate radiator. The separate pump that is associated with the system 10, 1010 may be: (i) only powered when the vehicle is connected to an external DC charging system (e.g., fast charging) and (ii) only powered by the external DC charging system (i.e., not powered by the vehicle's battery pack 4). In other words, this configuration does not utilize power in any manner from the vehicle's battery pack 4 and as such there is no electrical drain on the vehicle's battery pack 4. In a similar configuration shown in FIG. 53, the busbar cooling system 10, 1010 includes a separate pump and a separate radiator, wherein said pump is powered by the vehicle's battery pack 4. As such, the separate pump can be powered when the vehicle is not connected to an external DC charging system.

Figure 54:
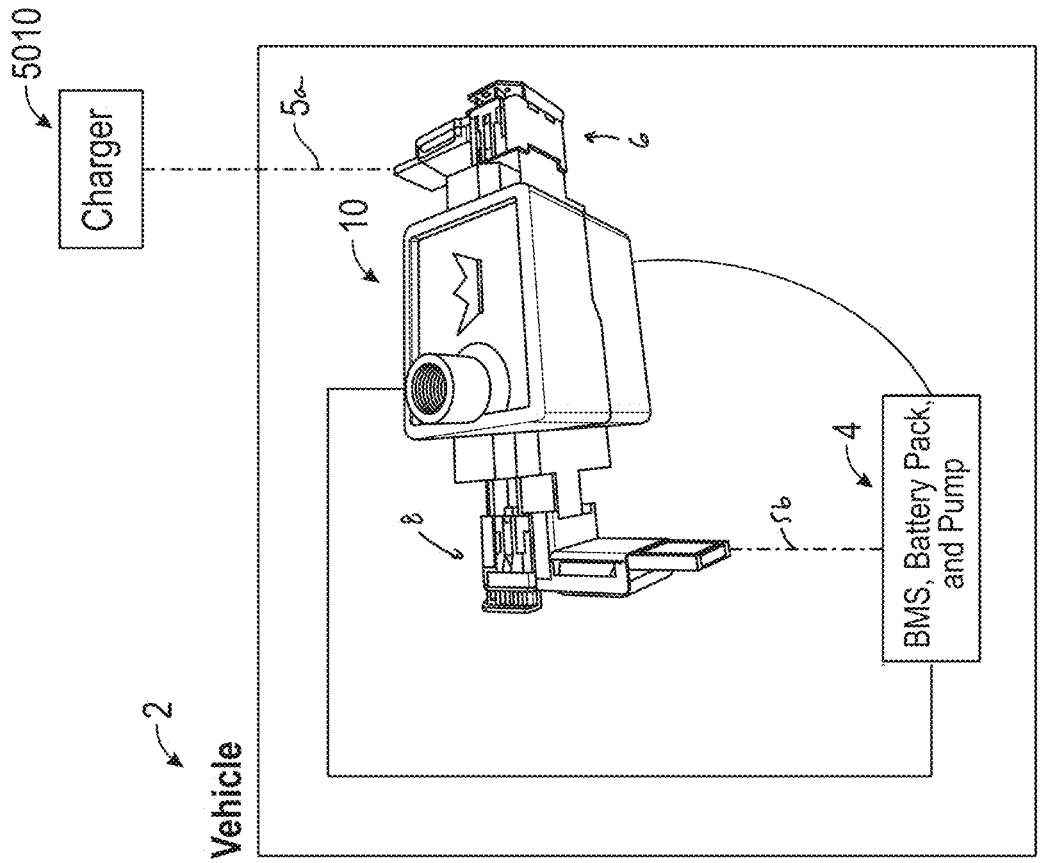
FIG. 54 is a diagram showing a third installation environment of the inventive busbar cooling system.
Figure 56:
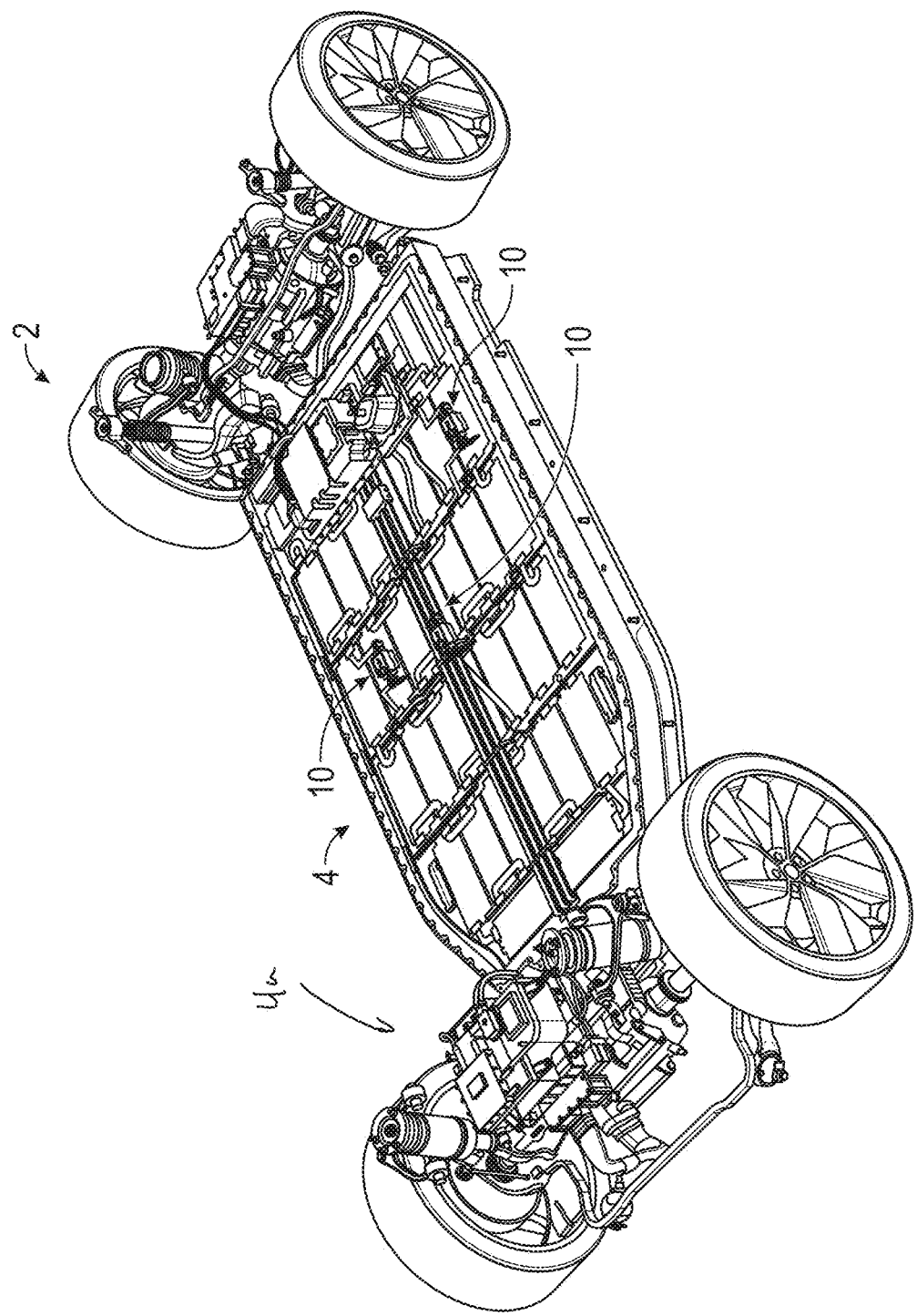
FIG. 56 is a front perspective view of a fifth installation environment, showing three inventive busbar cooling systems installed in a skateboard of a vehicle.
Figure 57:
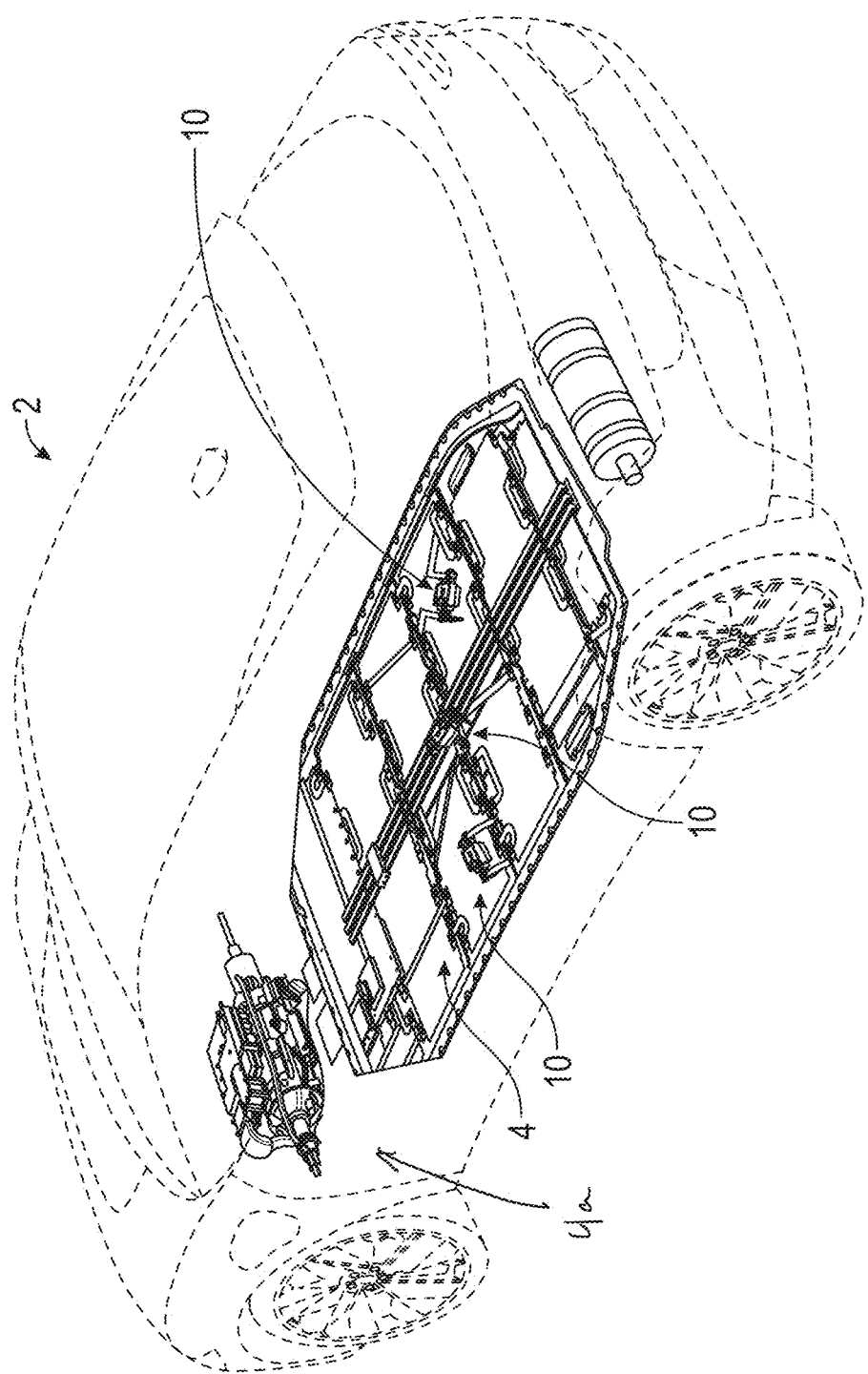
FIG. 57 is a rear perspective view of the fifth installation environment of FIG. 56, showing three inventive busbar cooling systems installed in the vehicle.
Figure 58:
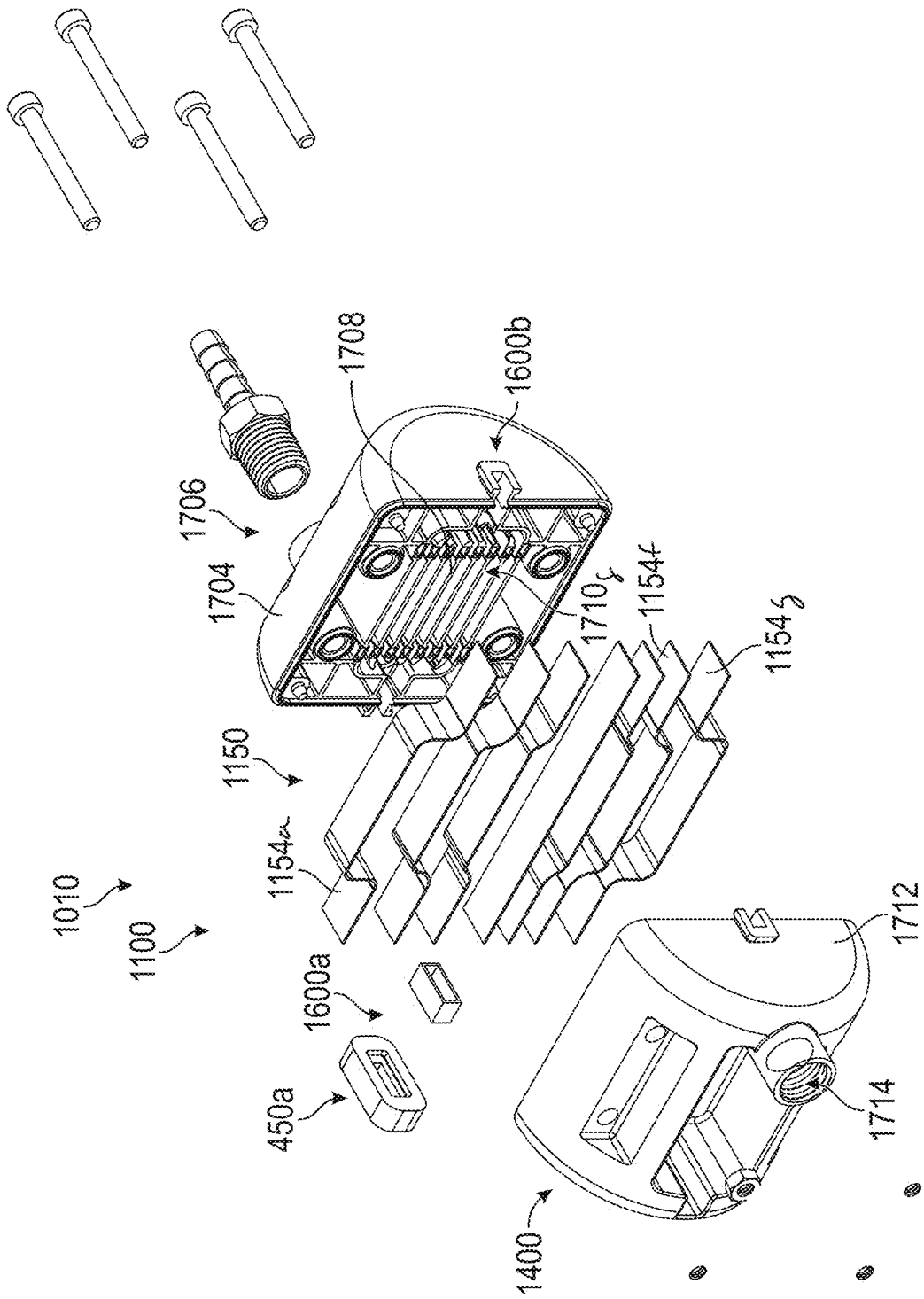
FIG. 58 is an exploded view of a second embodiment of the busbar cooling system having (i) an enclosure with a front housing and a rear housing, (ii) a conductive assembly with an internal cooling core in an uncoupled state $S_U$, and (iii) sealing assemblies.
Figure 60:
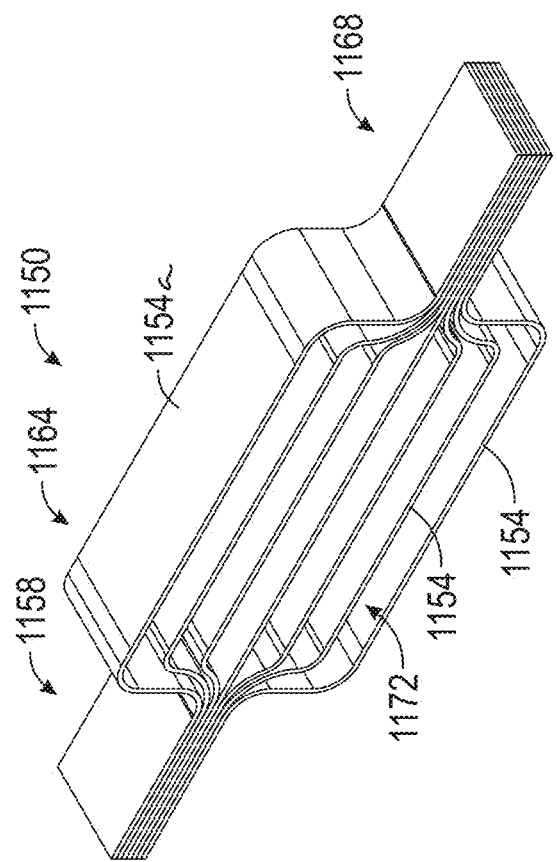
FIG. 60 is a perspective view of internal cooling core of FIG. 58 in a coupled state $S_{CU}$.
Figure 59:
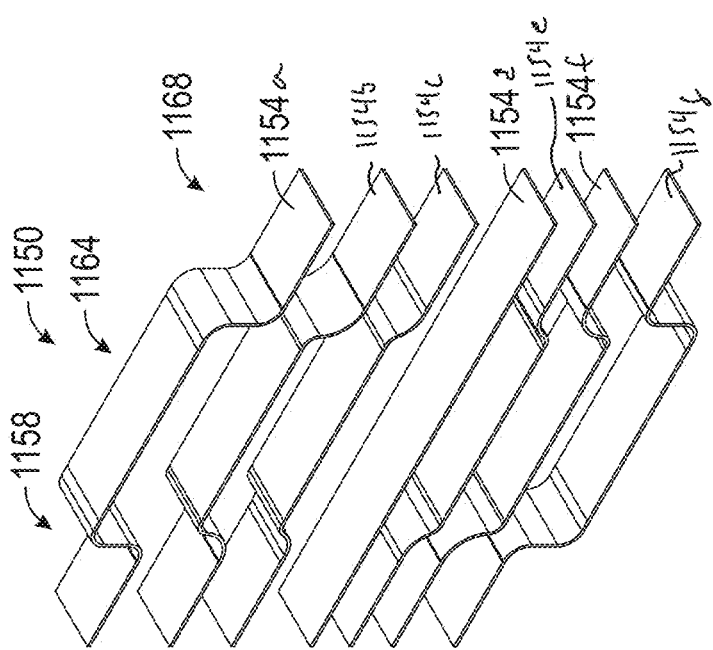
FIG. 59 is a perspective view of the internal cooling core of FIG. 58 in the uncoupled state $S_U$.
Figure 61:
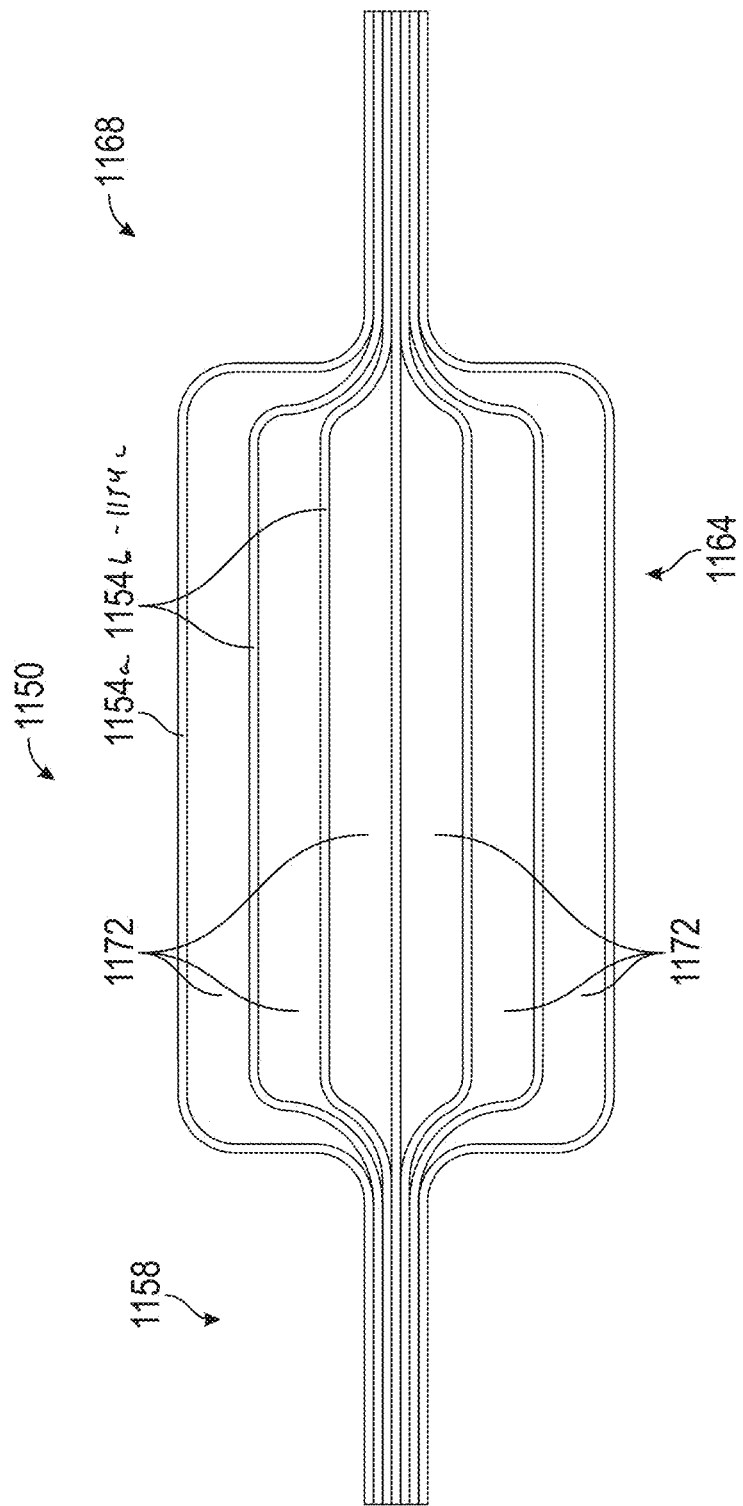
FIG. 61 is a side view of internal cooling core of FIG. 58 in the coupled state $S_{CU}$.
Figure 62:
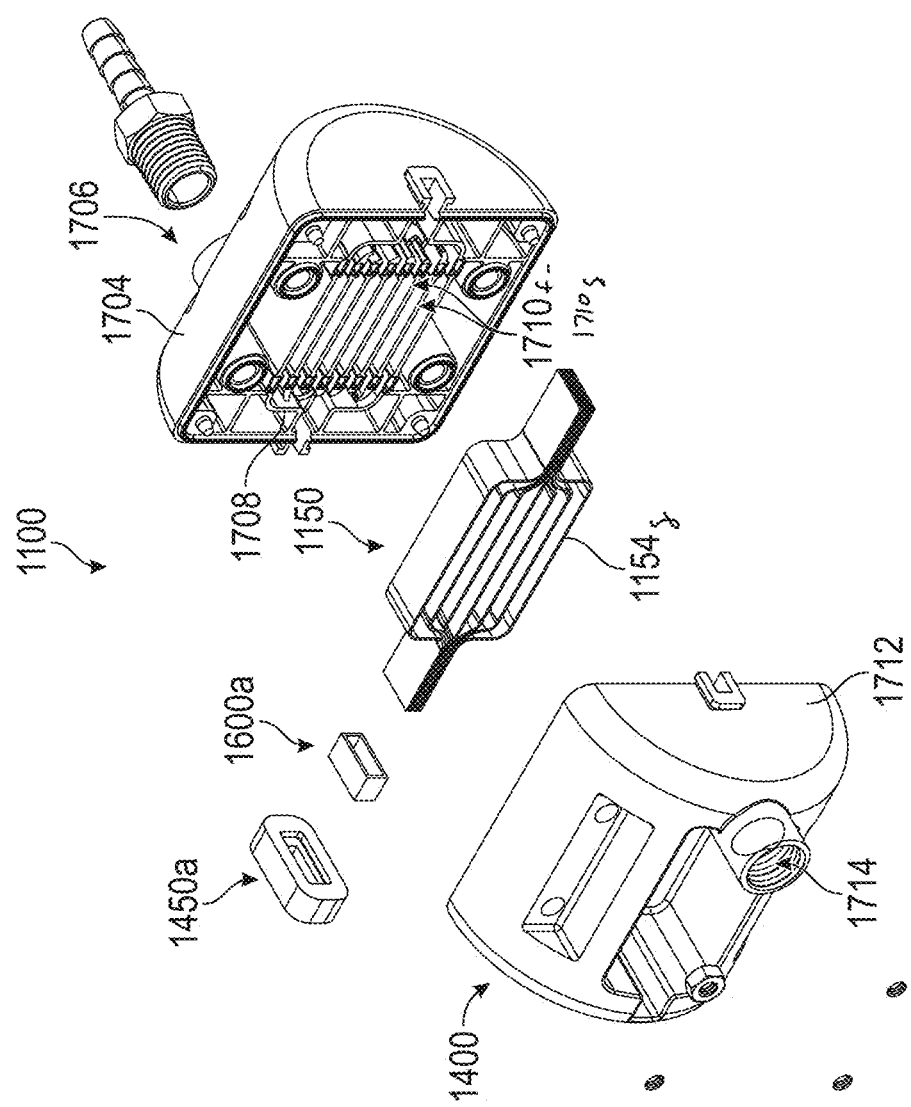
FIG. 62 is an exploded view of the busbar cooling system of FIG. 58, wherein the internal cooling core of the conductive assembly is in the coupled state $S_{CU}$.
Figure 63:
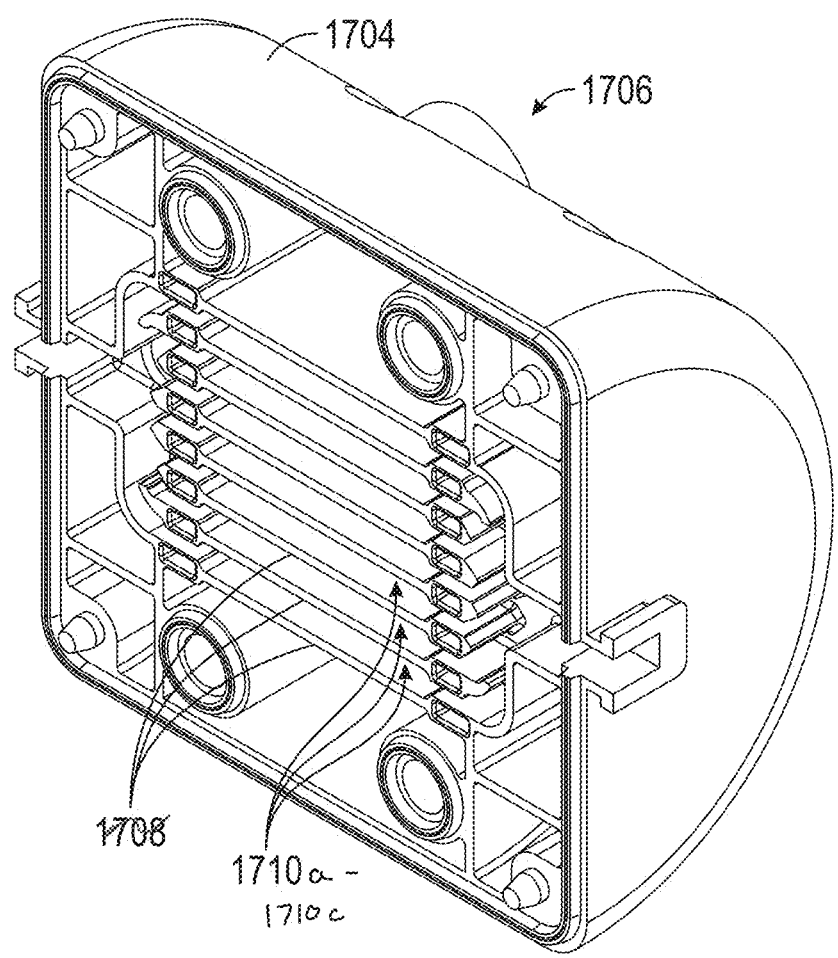
FIG. 63 is a perspective view of a rear housing of the busbar cooling system of FIG. 58.
Figure 65:
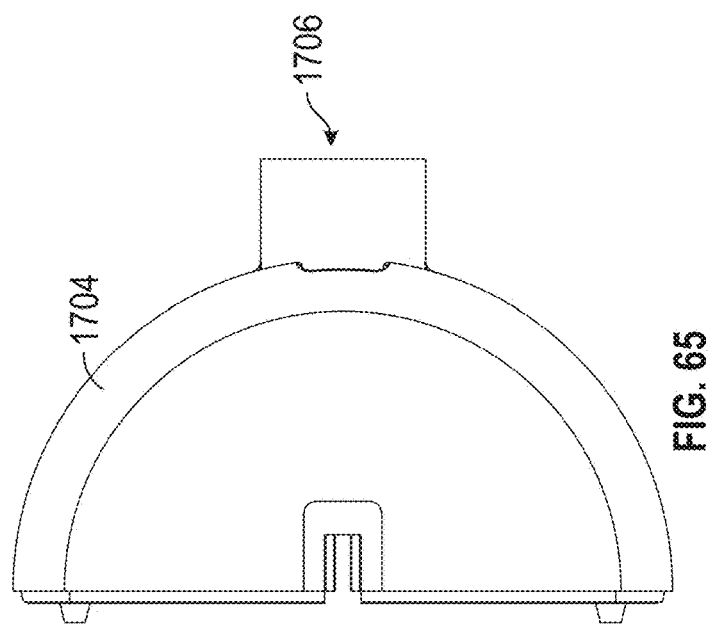
FIG. 65 is a side view of the rear housing portion of FIG. 58.
Figure 64:
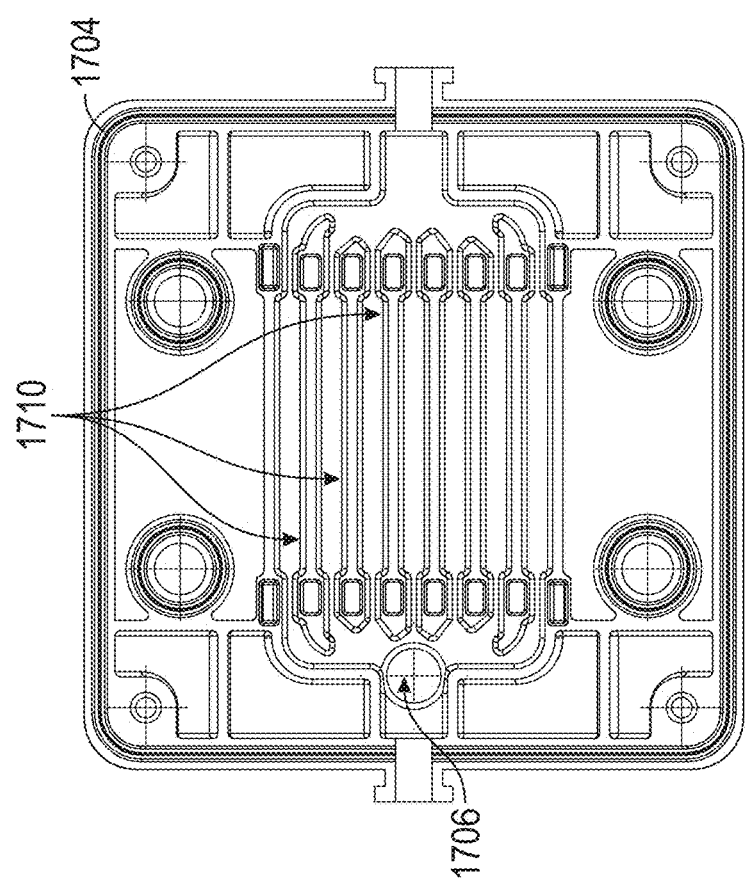
FIG. 64 is a front view of the rear housing portion of FIG. 58.
Figure 66:
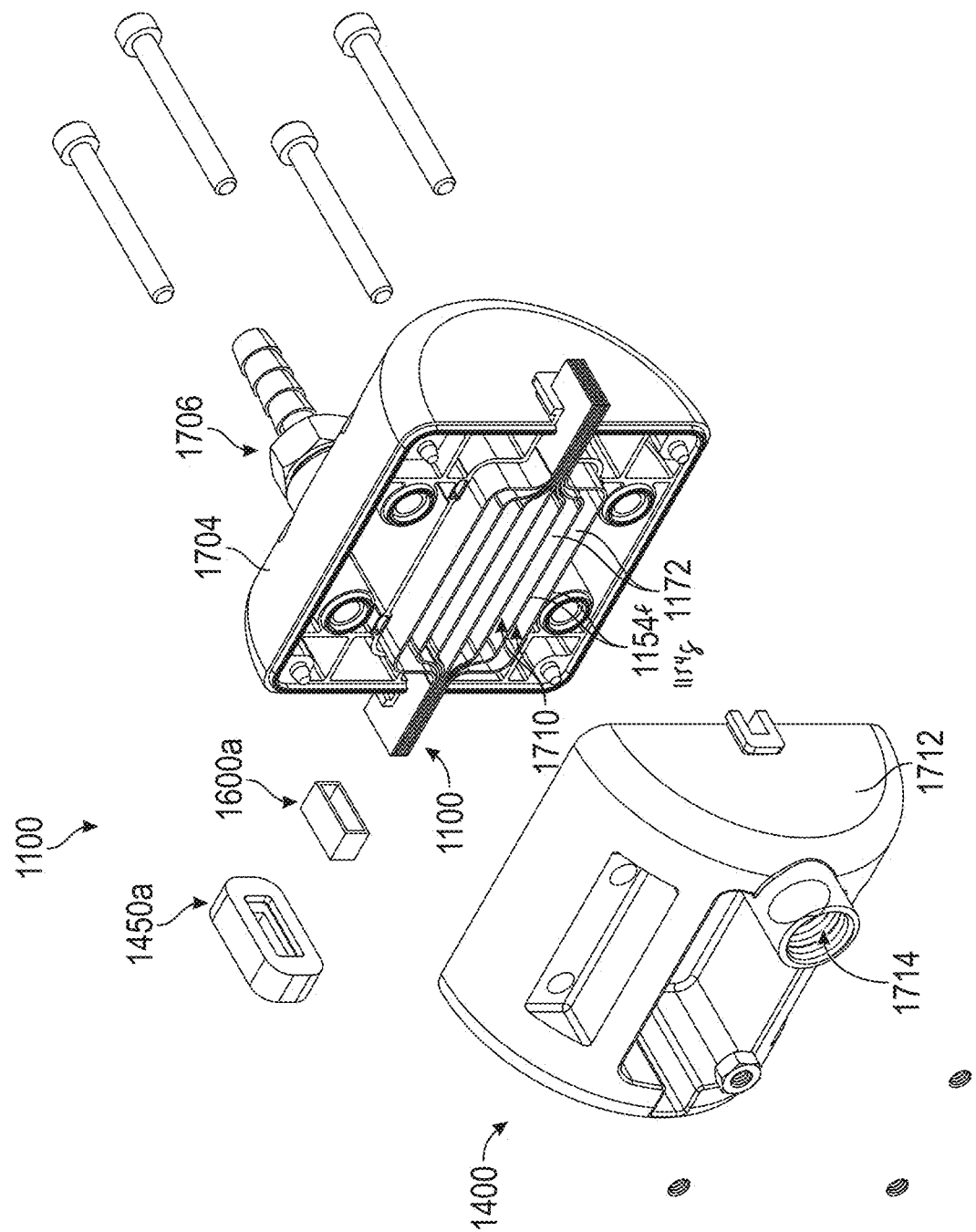
FIG. 66 is a perspective view of the busbar cooling system of FIG. 58 in a partially assembled state SPA, wherein the front housing and sealing assemblies are separated from the conductive assembly, and an extent of the conductive assembly resides within the rear housing.
Figure 67:
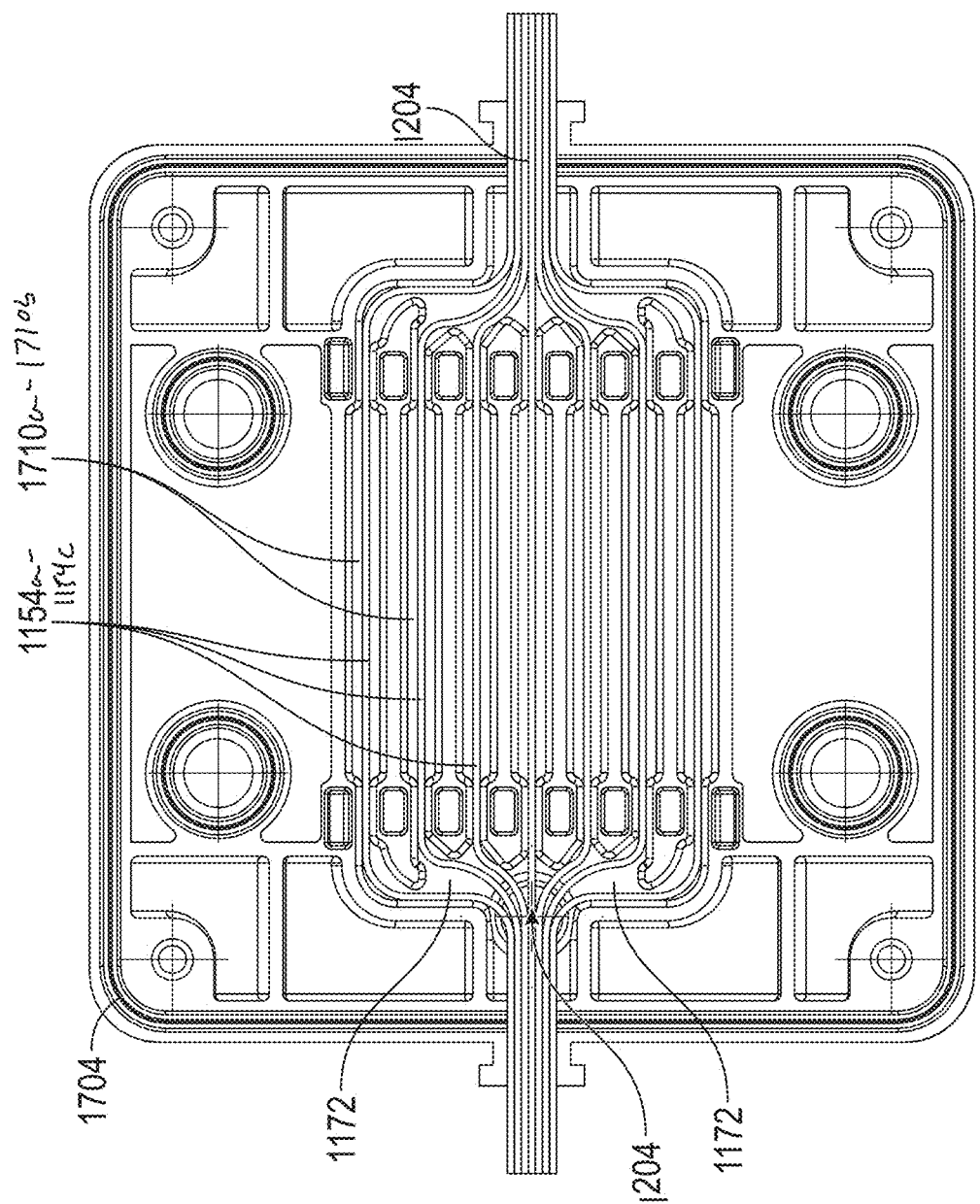
FIG. 67 is a frontal view of the busbar cooling system of FIG. 58 in the partially assembled state SPA, wherein the front housing and sealing assemblies are omitted.
Figure 68:
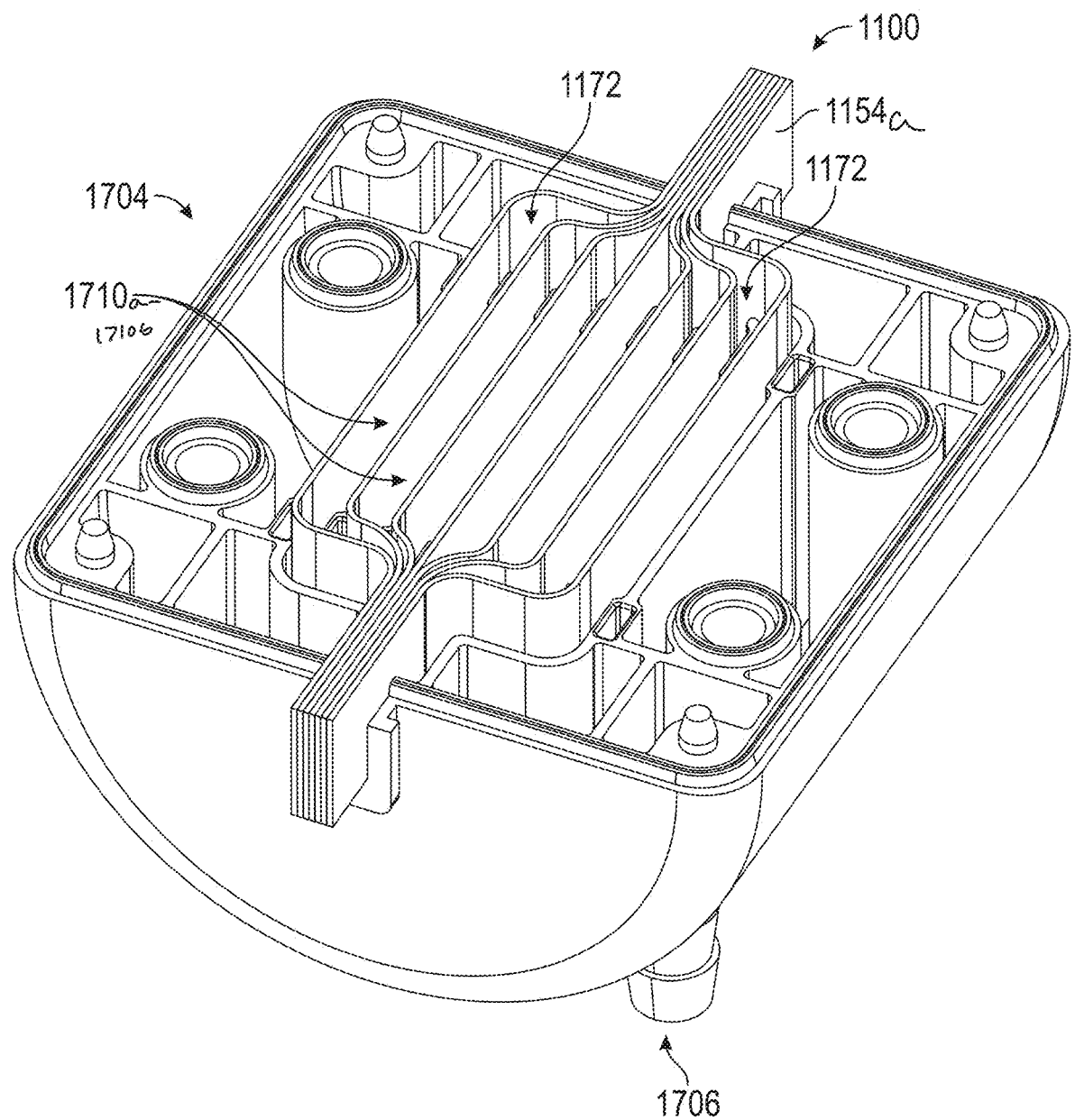
FIG. 68 is a perspective view of the busbar cooling system of FIG. 58 in the partially assembled state SPA, wherein the front housing and sealing assemblies are omitted.
Figure 69:
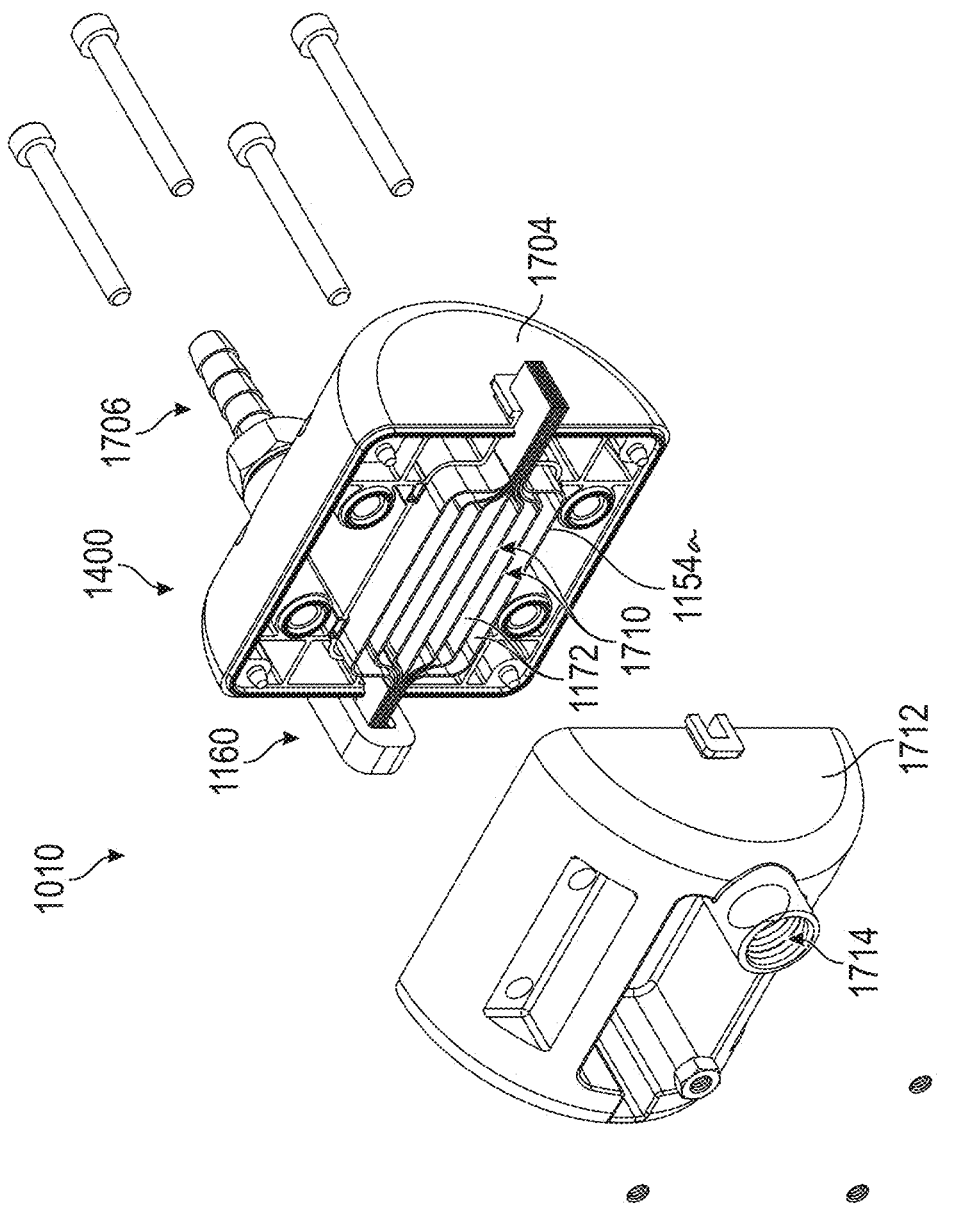
FIG. 69 is a perspective view of the busbar cooling system of FIG. 58 in a second partially assembled state $S_{PA2}$, where an extent of the conductive assembly resides within the rear housing and the front housing is separated from the conductive assembly and the sealing assembly.
Figure 70:
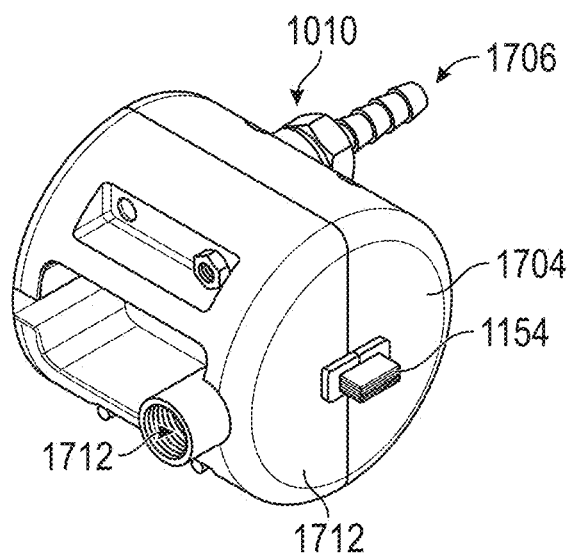
FIG. 70 is a perspective view of the busbar cooling system of FIG. 58 in a fully assembled state $S_{F4}$.
Figure 71:
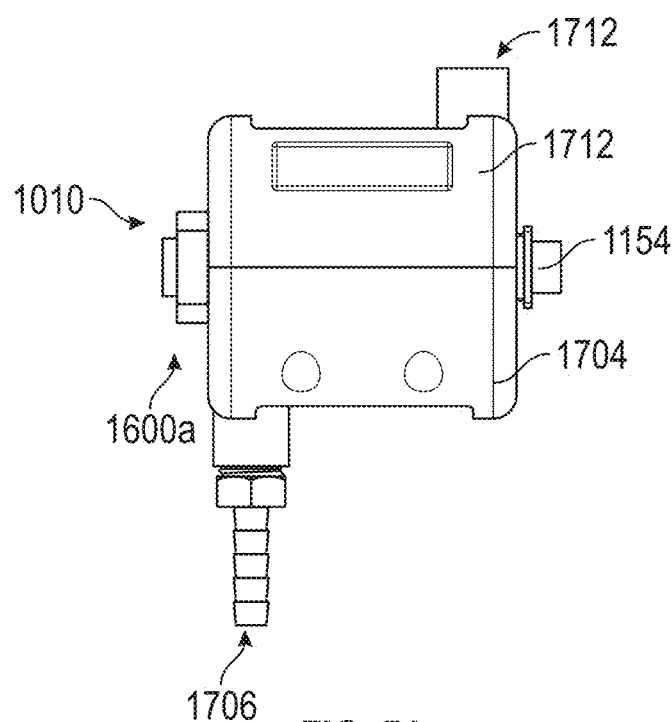
FIG. 71 is a top view of the busbar cooling system of FIG. 70.
Figure 72:
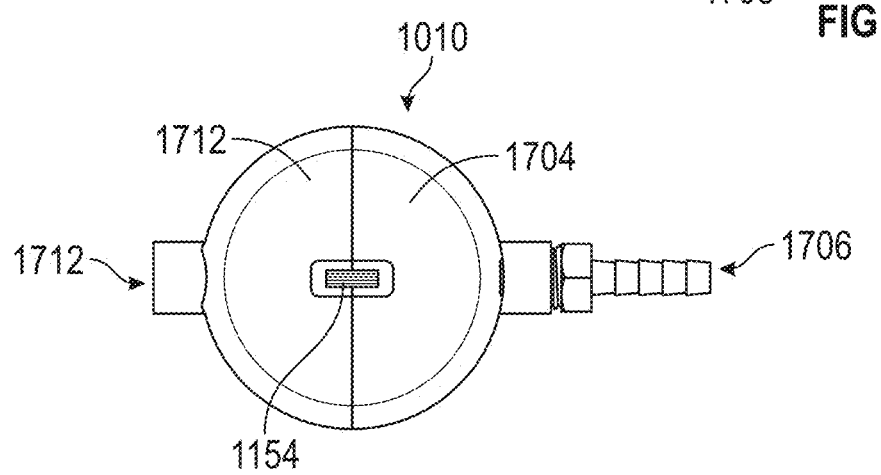
FIG. 72 is a side view of the busbar cooling system of FIG. 70.
Figure 74:
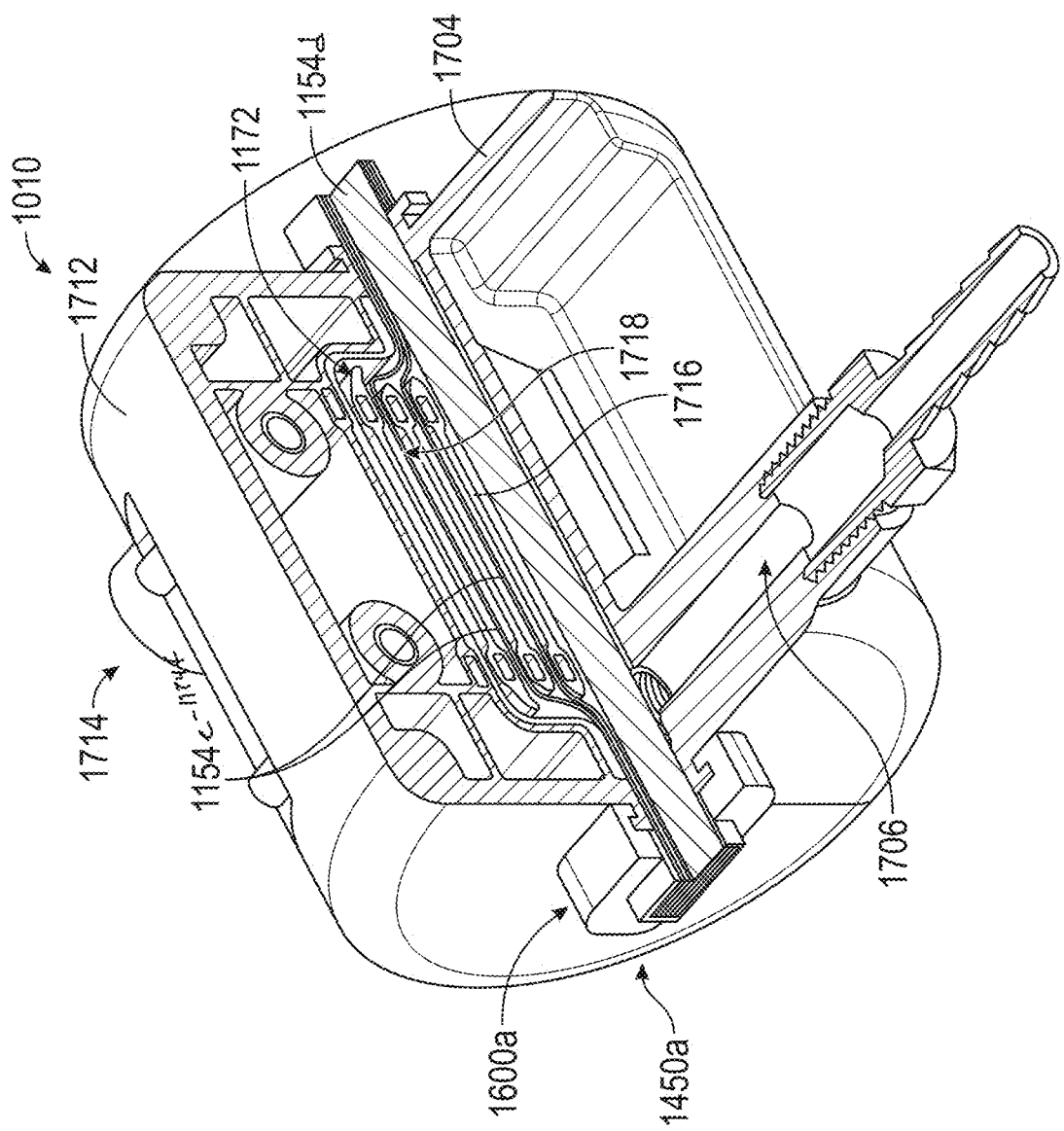
FIG. 74 is a cross-sectional view of the busbar cooling system taken along line 74-74 of FIG. 73 and showing the system in the fully assembled state $S_{F4}$.
Figure 73:
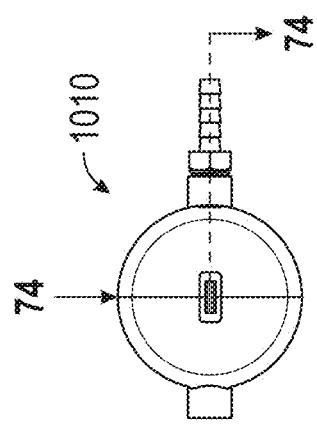
FIG. 73 is a side view of the busbar cooling system of FIG. 70.

In another configuration shown in FIG. 54, the busbar cooling system 10, 1010 is fully integrated into the vehicle's active cooling system and does not require a separate pump or radiator. This configuration eliminates the weight, cost, and space considerations associated with the first configuration's pump and radiator requirements. This configuration requires sufficient plumbing to connect the fluid ports to the vehicle's active cooling. As such, it is difficult to retrofit a previously designed active cooling system to include said system 10, 1010 without significant modifications. In yet another configuration shown in FIG. 55, the busbar cooling system 10, 1010 may receive cooling fluid from a device (e.g., external DC charging system) exterior to the vehicle. This configuration is beneficial because it does not require the pump and radiator requirements of the first configuration and does not require integration into the vehicle's current active cooling system of the third configuration; however, this configuration requires either multiple connections between the external DC charging system and the vehicle, or it requires the passing of fluid adjacent a high power connector.

The busbar cooling system 10, 1010 effectively controls and minimizes thermal management issues associated with rapidly charging and/or discharging a battery pack 4, where the battery pack 4 can be installed in a "vehicle" 2 that includes an airplane, motor vehicle (e.g., car, van, pick-up truck, SUV), a military vehicle (e.g., tank, personnel carrier, heavy-duty truck, and troop transporter), a bus, a locomotive, a tractor, marine applications (e.g., cargo ship, tanker, pleasure boat, submarine and sailing yacht), telecommunications hardware (e.g., server), a power storage system (e.g., backup power storage), renewable energy hardware (e.g., wind turbines and solar cell arrays), a 24-48 volt system, for a high-power application, for a high-current application, for a high-voltage application.

I. System

To facilitate the flow of current flow from the charger 5010 into the system 10 and out of the system 10 into other devices (e.g., battery management system (BMS), battery pack 4, or the combination thereof 4a), the vehicle 2 utilizes a busbar 5. The busbar 5 may be: (i) a flexible busbar, which is comprised of a plurality of conductors, (ii) a rigid busbar, which is formed from a single conductor, (iii) a RigiFlex busbar, which is disclosed in PCT/US20/50016 and/or U.S. provisional application 63/234,320, or (iv) a combination thereof. On one side of the system 10, the busbar 5 is coupled to a male charging connector assembly 6. Likewise, a busbar 5 is coupled to a male discharging connector assembly 8 on the other side of the system 10. As such, the busbar 5 is coupled to both sides of the system 10 via the male charging/discharging connector assemblies 6, 8. Said male charging/discharging connector assemblies 6, 8 include male terminal assemblies having male terminal bodies that are received by the female receiver 332 of the female terminals 324a, 324b, when the male charging/discharging connector assemblies 6, 8 are coupled to the system 10. For sake of brevity, specific disclosure of the male charging/discharging connector assemblies 6, 8 is omitted from this application because it is disclosed in detail in the following applications PCT/US19/36010, PCT/US19/36070, PCT/US21/43788, PCT/US21/47180, PCT/US20/13757, PCT/US21/43686, PCT/US20/49870, and U.S. patent Ser. No. 17/570,740, all of which are fully incorporated herein by reference.

The system 10 is mechanically and electrically coupled between the male charging/discharging connector assemblies 6, 8. The busbar cooling system 10 is comprised of: (i) a conductive assembly 100 and (ii) an enclosure 400 that surrounds at least an extent of the conductive assembly 100. The conductive assembly 100 is configured to allow current to pass through the busbar cooling system 10, while the enclosure 400 is configured to allow a non-conductive fluid to pass through the busbar cooling system 10. The configuration of the conductive assembly 100 and the enclosure 400 enable a substantial extent of the conductive assembly 100 to come into direct contact and bathed with the non-conductive fluid which is supplied into the enclosure 400. Direct contact between the conductive assembly 100 and the non-conductive fluid is beneficial because it allows the system 10 extract more heat from the busbars 5 in comparison with systems that separate the conductive assembly 100 from the non-conductive fluid.

II. Conductive Assembly

The conductive assembly 100 is comprised of: (i) an internal cooling core 150, (ii) a current inlet assembly 300a, and (iii) a current outlet assembly 300b. The conductive assembly 100 is made from a conductive material and is configured to allow current to pass through the busbar cooling system 10. In particular, the current inlet assembly 300a is designed to receive current from: (i) the charging system (e.g., external DC charger), (ii) a first battery module, or (iii) the battery pack 4. The current that is received by the current inlet assembly 300a is then transferred through the internal cooling core 150 to the current outlet assembly 300b. The current outlet assembly 300b then transfers the current that is received from the internal cooling core 150 to from: (i) the battery pack 4, (ii) a second battery module, or (iii) a device or system (e.g., motor) contained within the vehicle. Additional details about the structure and function of the conductive assembly 100 will be discussed below in greater detail.

The internal cooling core 150 is comprised of at least one conductor 154 and preferably a plurality of individual conductors 156. As best shown in FIGS. 2-5, the internal cooling core 150 includes eight individual conductors 154a-154h; nevertheless, any number of conductors may be utilized (e.g., 1 to 1000, and preferable between 5 and 20). Each of the individual conductor 154a-154h is designed to: (i) receive current from the current inlet assembly 300a, (ii) fit within a distinct cavity that is formed within the enclosure 400, (iii) enable a majority of one of the conductor 154a-154h to be spaced away from other conductors 154a-154h contained within the internal cooling core 150, (iv) minimize the resistance that is generated by the conductor 154a-154h, (v) maximize the amount of heat that can be removed from the busbar 5, and (vi) transfer the received current to current outlet assembly 300b.

Figure 5:
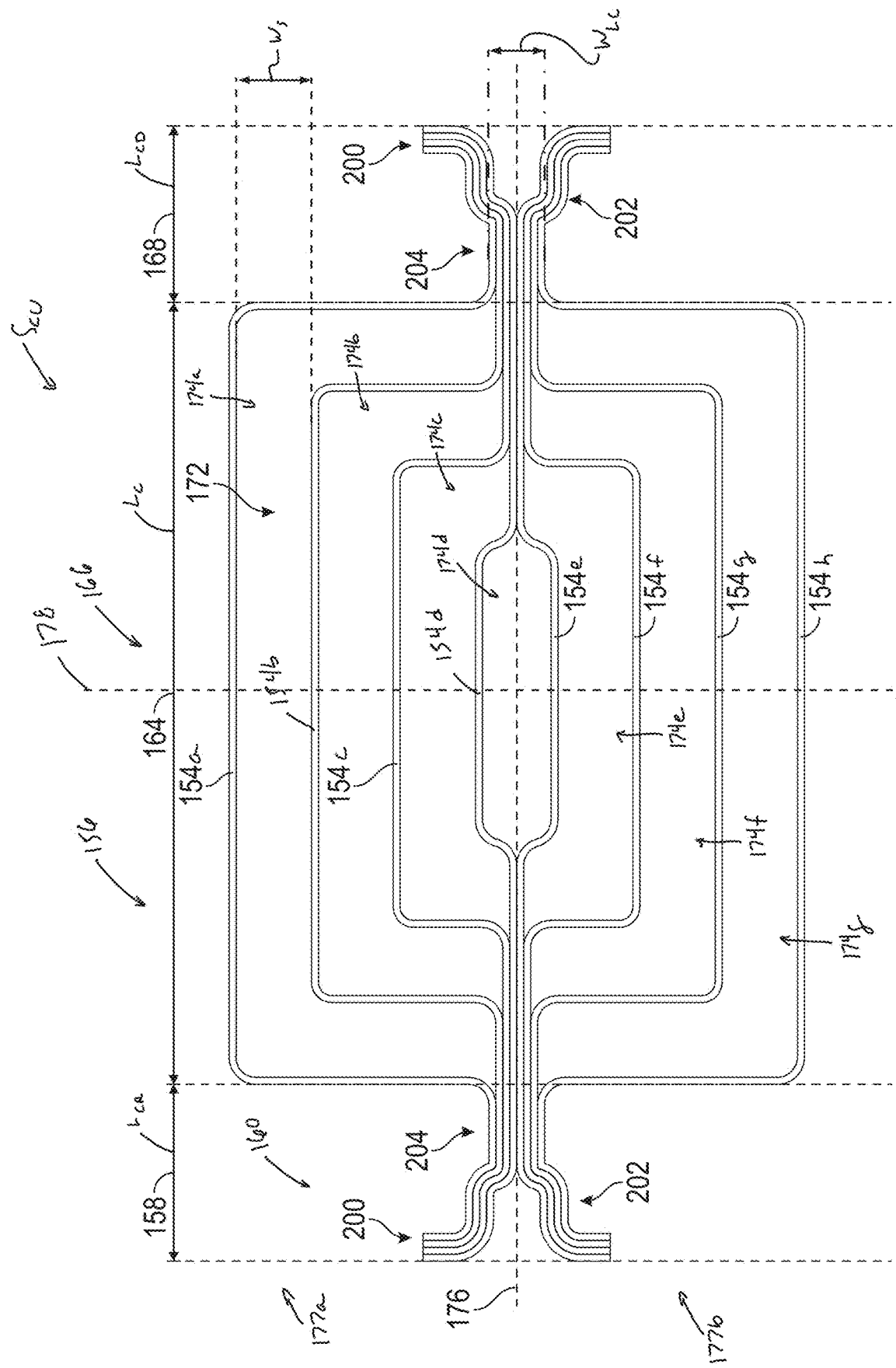
FIG. 5 is a top view of the internal cooling core of FIG. 2 in the coupled state $S_{CU}$.
Figure 6:
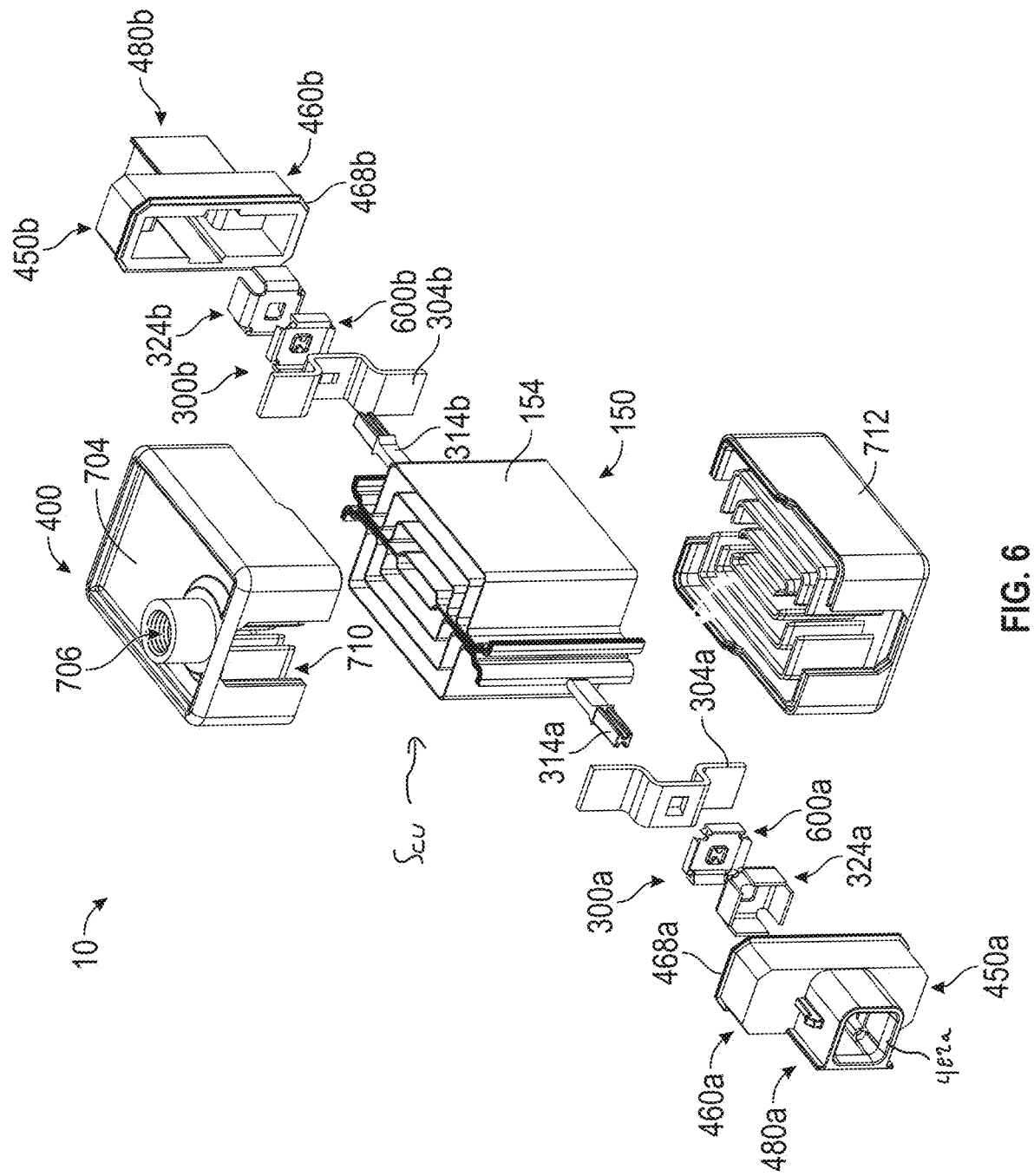
FIG. 6 is a perspective view of the busbar cooling system of FIG. 1, wherein the busbar cooling system includes: (i) the enclosure and (ii) the conductive assembly with the internal cooling core in the coupled state $S_C$, the current inlet assembly, and the current outlet assembly.
Figure 7:
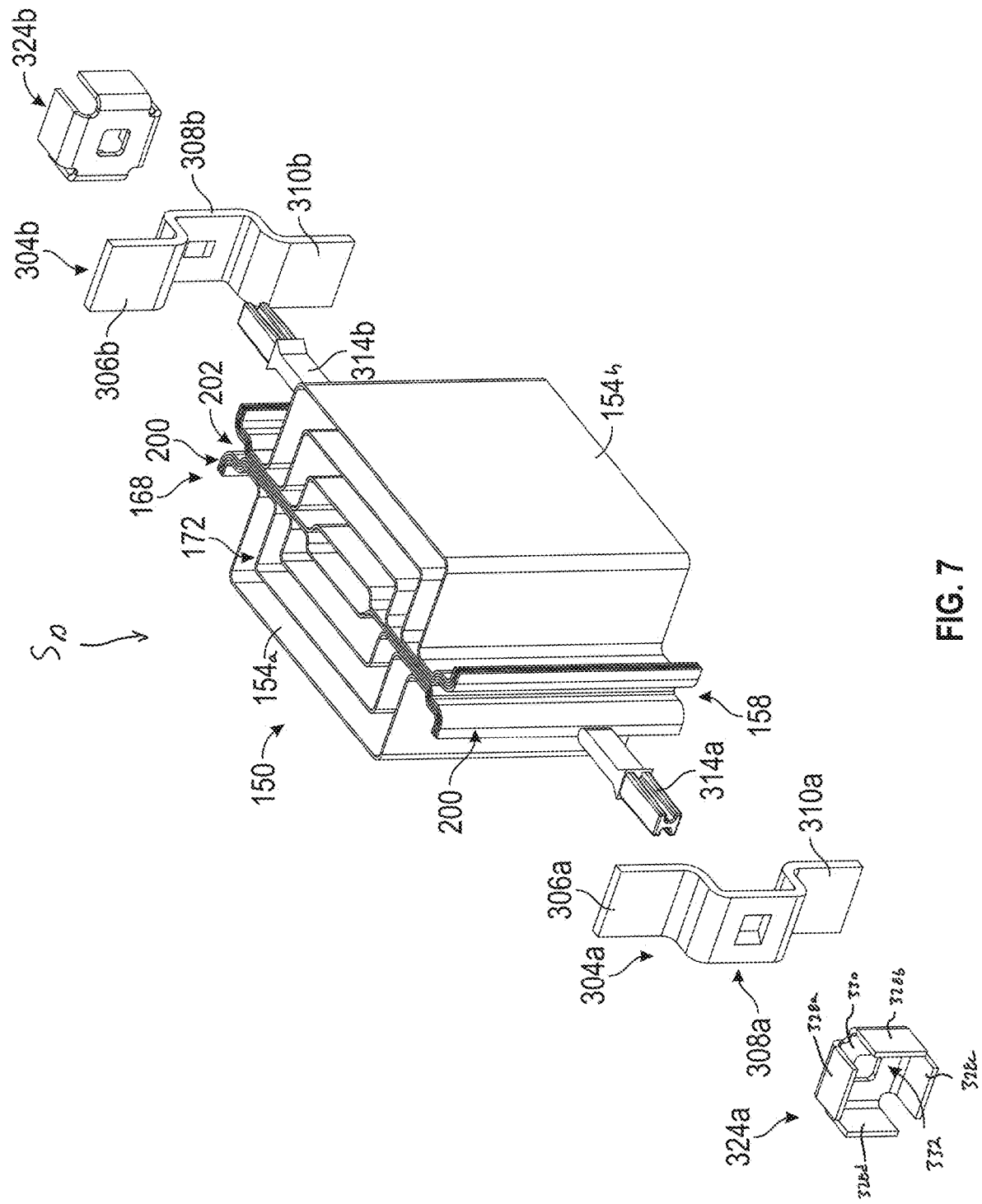
FIG. 7 is a perspective view of the conductive assembly of FIG. 6 in a disconnected state SD.
Figure 10:
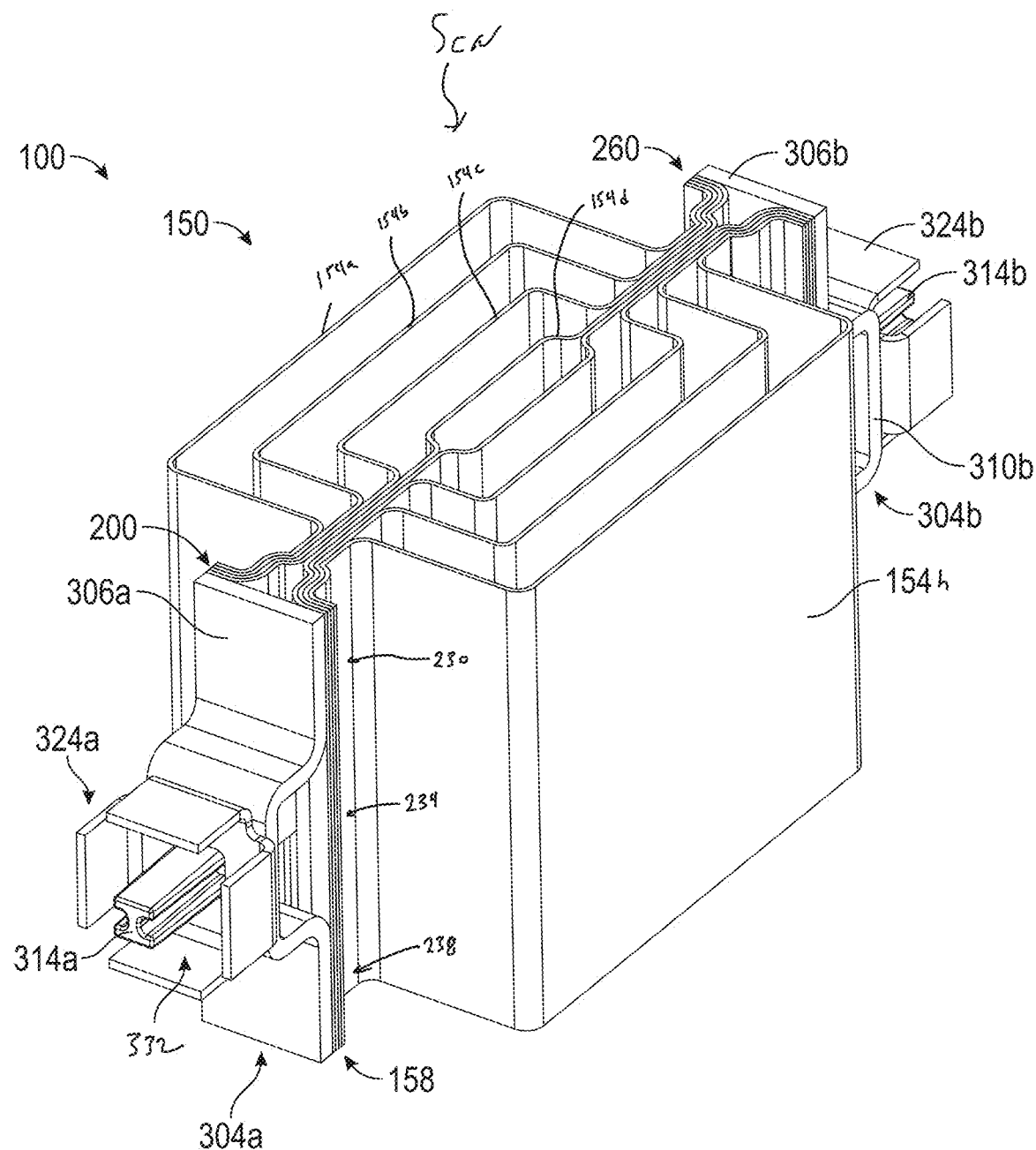
FIG. 10 is a perspective view of the conductive assembly of FIG. 2 in a connected state $S_{CN}$.
Figure 11:
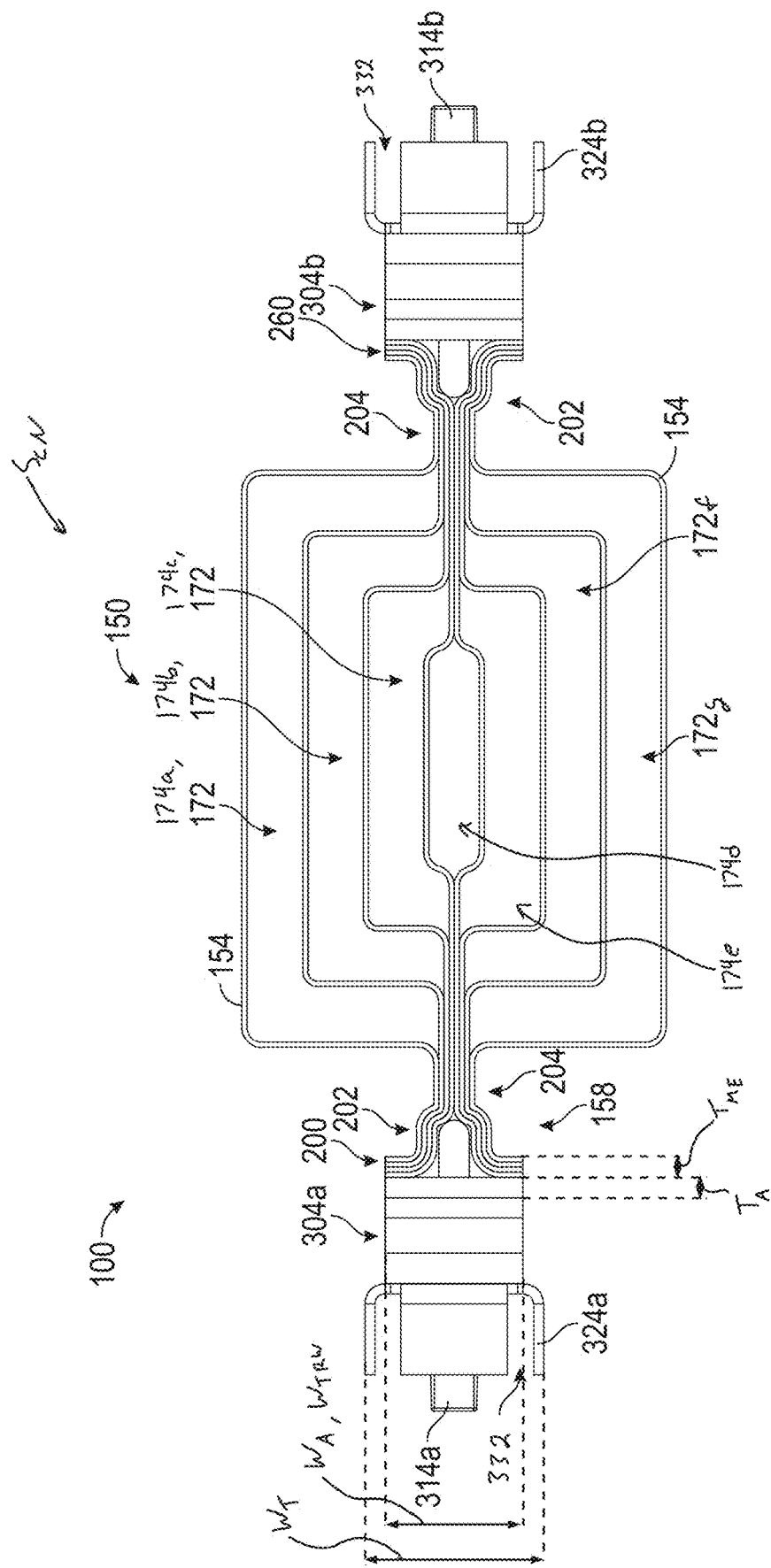
Figure 14:
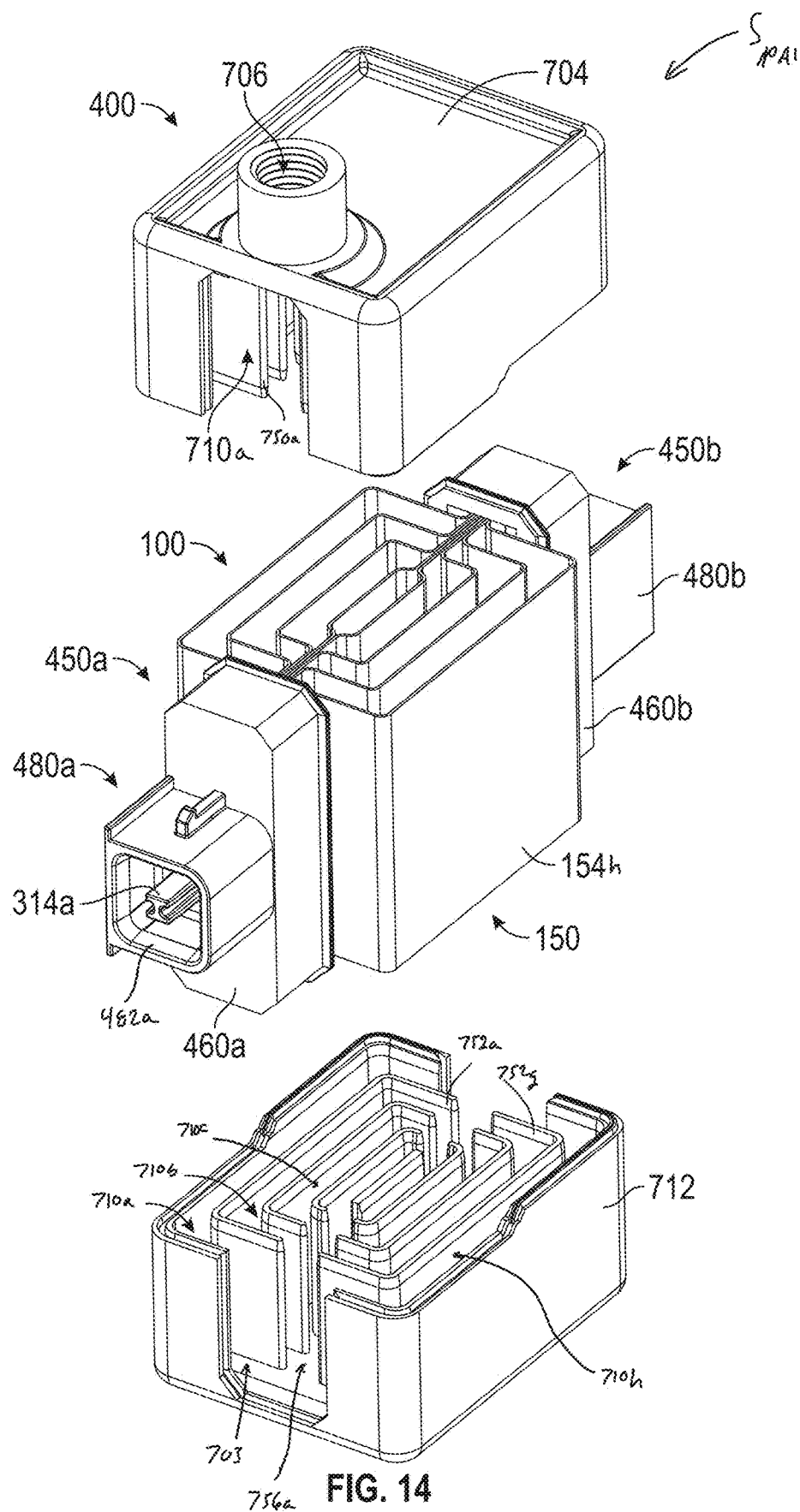
FIG. 14 is a perspective view of the busbar cooling system of FIG. 1 in a first partially assembled state $S_{PA1}$, wherein: (i) the upper housing is separated from the conductive assembly, (ii) the lower housing is separated from the conductive assembly, (iii) the current inlet casing is coupled to the current inlet assembly, and (iv) the current outlet casing is coupled to the current outlet assembly.
Figure 15:
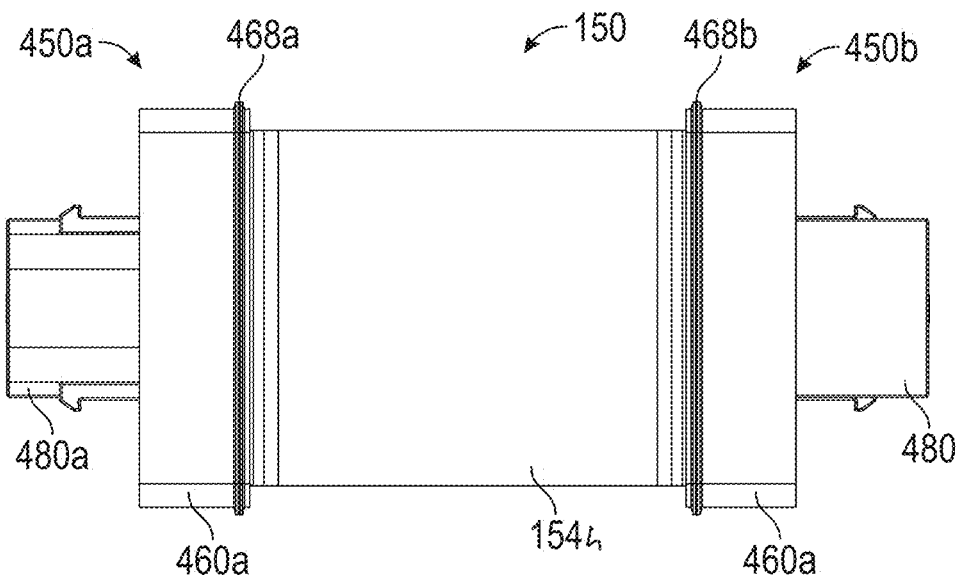
FIG. 15 is a side view of the busbar cooling system of FIG. 14, wherein the upper and lower housings have been omitted to reveal the positional arrangement of the conductive assembly, and the current inlet and outlet casings.
Figure 16:
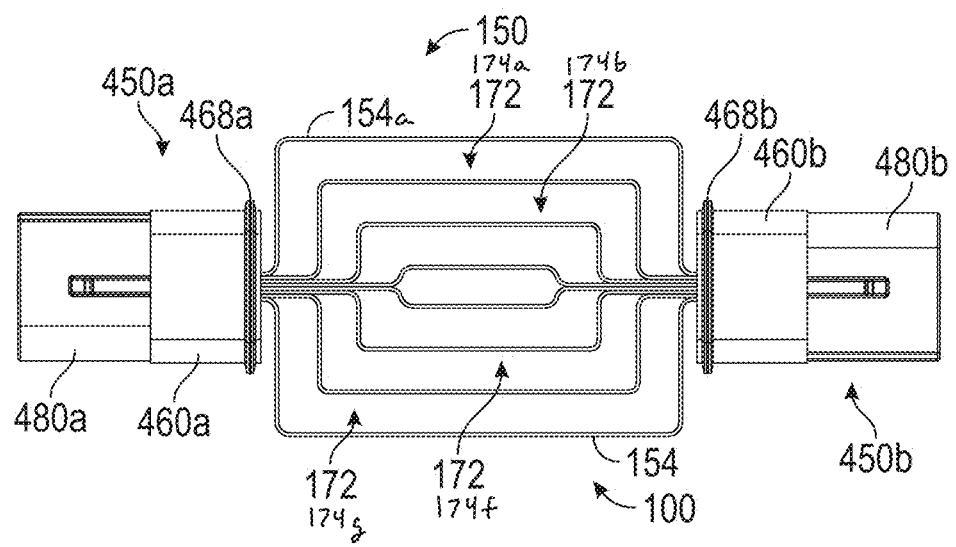
FIG. 16 is a top view of the busbar cooling system of FIG. 15.
Figure 18:
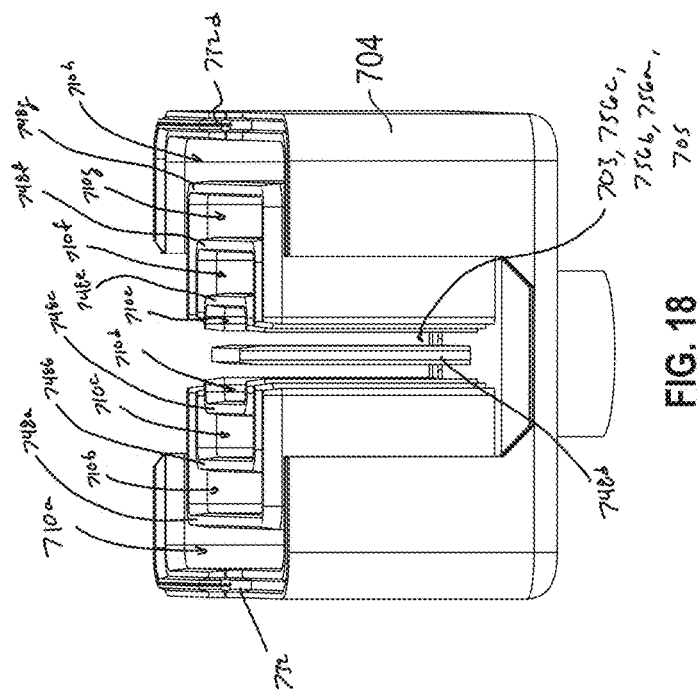
FIG. 18 is an elevated end view of the upper housing of FIG. 14.
Figure 17:
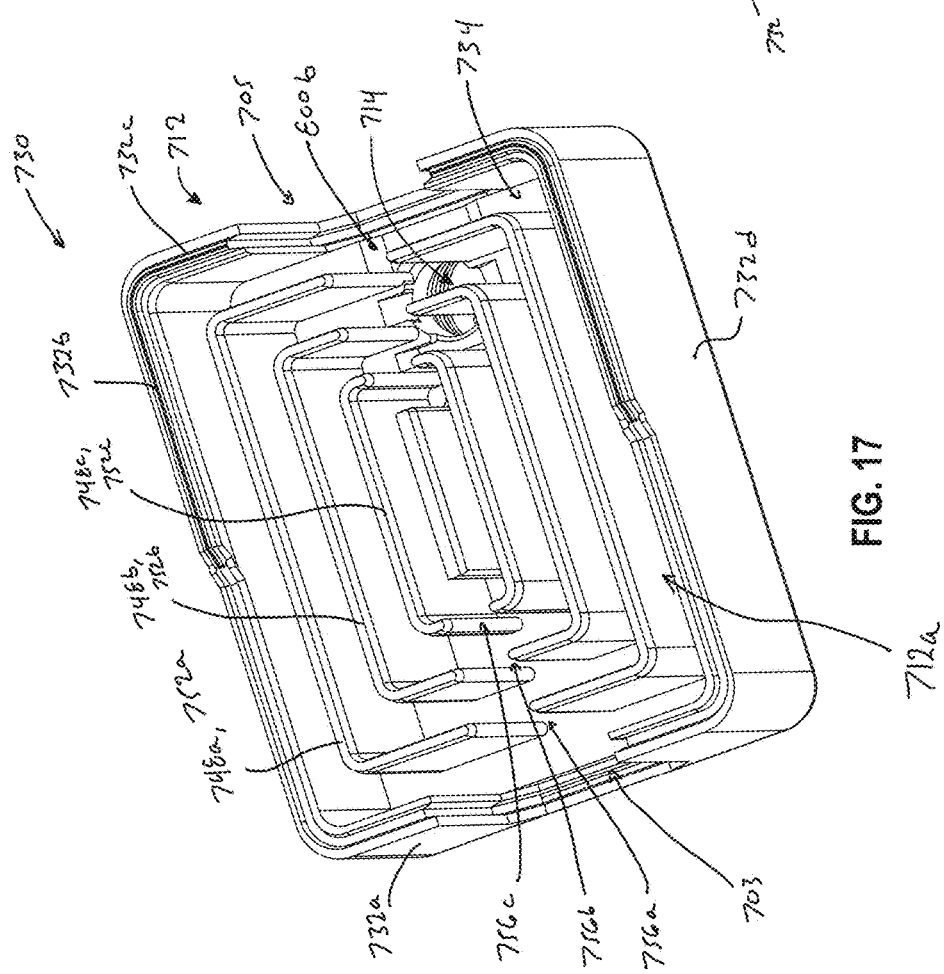
FIG. 17 is a lower perspective view of the upper housing of FIG. 14.

To achieve these design objections, each conductor 154a-154h has a complex configuration that can be broken down into three primary segments, which include: (i) first segment or the current receiving segment 158, (ii) second segment or the cooling segment 164, and (iii) third segment or the current providing segment 168. It should be understood that more (e.g., between 3 and 100) or less (e.g., between 1 and 2) segments may be included or identified for each conductor 154a-154h in the internal cooling core 150. The current receiving segment 158 includes a combination of complex bends 160 that enable the plurality of conductors 156 to be: (i) coupled to one another, and (ii) coupled to the current inlet assembly 300a. Coupling said conductor 154a-154h to one another is beneficial as it facilitates even or uniform distribution of current into the internal cooling core 150 from male charging connector. However, in other embodiments, the conductors 154a-154h may not be coupled to one another and instead may be individually coupled to the current inlet assembly 300a. As shown in FIG. 5, the length of the current receiving segment 158 $L_{CR}$ is between 6 mm and 20 mm and preferably 13 mm. It should be understood that length of the current receiving segment 158 $L_{CR}$ may be greater or smaller in other embodiments of the system 10.

The cooling segment 164 includes an amalgamation of bends 166, which are configured to provide a plurality of spaces 172 between each of the conductors 154a-154h. In other words, the cooling segment 164 and likewise the conductors 154a-154h in the internal cooling core 150 are in a spaced apart in relationship to one another. These spaces 172 enable system 10 to efficiently and effectively cool the busbar 5 and increase the surface area that can be cooled by the non-conductive fluid. In fact, the surface area of the internal cooling core 150 has a surface area that is approximately 10.4 times greater than the surface area of a conventional rectangular busbar CRB that would extend between the current inlet assembly 300a and a current outlet assembly 300b. As described below, the conventional rectangular busbar CRB has a rectangular configuration defined by a stack of rectangular conductors that are not separated by intervening structures or gaps/spaces. Said 10.4 time greater or about 1,044% is determined by dividing the surface area of internal cooling core 150 (86,806.95 mm²) by surface area of the conventional rectangular busbar (8,314 mm²). The surface area of internal and external sides of the internal cooling core 150 is calculated from: (a) a total conductor length of 855.8 mm, as each conductors 154a-154h is spaced apart from other conductors 154a-154h, (b) width of each conductor is 50 mm, and (c) a thickness of each conductor is 0.5 mm, and (d) there are 8 conductors 154a-154h contained in the internal cooling core 150. And the surface area of the internal and external sides of the conventional rectangular busbar CRB is calculated from: (a) a length of 83.16 mm, which extends between the current inlet assembly 300a and a current outlet assembly 300b, (b) width of each conductor is 50 mm, and (c) an overall thickness of the busbar is 4 mm, which is formed by 8 conductors that each have a thickness of 0.5 mm. As disclosed above, these surface area calculations only take into account the surface areas of the sides and do not take into account the surface area of the top, bottom, front, and rear extents of the conductors.

Each space 174a-174g contained in the plurality of spaces 172 are balanced such that: (i) a significant amount of fluid can flow around each individual conductor 154a-154h to enable effective cooling of each conductor 154a-154h, and (ii) too much fluid is not required, which would increase the size, weight, and space requirements of the system 10. It should be understood that the each space 174a-174g is sized based upon: (i) the anticipated current flow through the internal cooling core 150, (ii) size of each conductor 154a-154h (e.g., length, width, height, and thickness), (iii) conductor material (e.g., aluminum, brass, graphene, silver, pure copper, gold, zinc, nickel, bronze, iron, platinum, steel, lead, stainless steel, or any combination thereof), (iv) type of fluid (e.g., chemical composition, density, and etc.), and/or (i) volumetric flow rate of the system 10. In the first embodiment (see FIG. 5), the width of the space $W_S$ is between 1 mm and 10 mm and is preferably 5.5 mm and the length of the cooling segment 164 $L_C$ is between 30 mm and 120 mm and is preferably 60 mm. It should be understood that width of the space $W_S$ between the conductors 154a-154h and the length of the cooling segment $L_C$ may be greater or smaller in other embodiments of the system 10.

The current providing segment 168 includes a combination of complex bends 170 that enable the plurality of conductors 156 to be: (i) coupled to one another, and (ii) coupled to the current outlet assembly 300b. Coupling said conductor 154a-154h to one another is beneficial as it facilitates even or uniform distribution out of the internal cooling core 150 and into the male discharging connector. However, in other embodiments, the conductors 154a-154h may not be coupled to one another and instead may be individually coupled to the current outlet assembly 300b. As shown in FIG. 5, the length of the current providing segment 168 $L_{CP}$ is between 6 mm and 20 mm and preferably 13 mm. It should be understood that length of the current providing segment 168 $L_{CP}$ may be greater or smaller in other embodiments of the system 10.

As shown in FIGS. 2-5, the bends 160, 170 in the individual conductors 154 formed within the first and third segments 158, 168 substantially mirror each other. While the mirroring of these bends 160, 170 is unnecessary to enable the system 10 to function, it is desirable because it enables the current inlet assembly 300a and current outlet assembly 300b to mirror one another. As such, non-symmetrical designs may be utilized and are contemplated by this disclosure. Nevertheless, mirroring of these components 300a, 300b increases efficiencies, simplifies assembly, reduces installation cost, and reduces additional parts. In particular, the first and third segments 158, 168 include a flared out design that is comprised of: (i) a flat mounting extent 200a, 200b, (ii) a curved receiving extent 202a, 202b, and (iii) longitudinal extent 204a, 204b. The flat mounting extent 200a, 200b is designed to be directly coupled to an adapter 304a, 304b that is included within the current inlet and outlet assembly 300a, 300b, while the curved receiving extent 202a, 202b is designed to receive the touch proof post 314a, 314b that is also included within the current inlet and outlet assembly 300a, 300b. This flared out arrangement is not only beneficial for the placement of the touch proof post 314a, 314b, but it also ensures that the adapters 304a, 304b are not simply coupled to a plurality of end surfaces of the plurality of conductors 154a-154h. This not only helps ensure proper current flow path into and through the system 10, but it also increase durability and removes failure modes.

The longitudinal extent 204a, 204b of the first and third segments 158, 168 is designed to ensure that the conductors 154a-154h are properly jointed together prior to being bent in the curved receiving extent 202a, 202b. In other words, reducing the length of the longitudinal extent 204a, 204b may introduce failure modes into the system 10 because the conductors 154a-154h may not be sufficiently coupled to one another prior to being bent in the curved receiving extent 202a, 202b. Other designs or configurations are contemplated by this disclosure and apparent to those skilled in the art. For example, the flared out design may be omitted, such that the conductors 154a-154h will only include a longitudinal extent (e.g., omitting the flat mounting extent 200a, 200b and curved receiving extent 202a, 202b). While feasible, this design may not be preferred because the adaptor 304a, 304b will only be coupled to a plurality of end surfaces of the conductors 154a-154h (i.e., not to a side of the conductors 154a-155h). Nevertheless, this design may have some benefits because it would allow the width of the adaptors 304a, 304b to be reduced from approximately 14 mm to 4 mm for a cooling core 150 that includes 8 conductors with widths of 0.5 mm each.

Still referring to FIGS. 2-5, the amalgamation of bends 166 contained in the cooling segment 164 of each conductor 154a-154h are not uniform for all conductors 154a-154h contained in the cooling core 150. In other words, each conductor 154a-154h is different from at least one other conductor 154a-154h. And in fact, the four conductors 154a-154d on one side 177a of the 0 each have configurations that are different from one another. Similarly, the four conductors 154e-154h on the opposed side 177b of the central longitudinal axis 176 each have configurations that are different from one another. Stated another way, any adjacent conductors—namely, 154a and 154b, 154b and 154c, 154c and 154d, 154e and 154f, 154f and 154g, 154g and 154f—that are not included in the center pair of conductors 154d and 154e have a different configuration. The differences in the amalgamation of bends 166 allows for the creation of the spaces 174a-174h between the conductors 154a-154h in order to form the core's 150 spaced-apart design. In particular, this spaced-apart design provides a concentric arrangement for the plurality of conductors 156. This concentric configuration of conductors 154a-154h allow system 10 to efficiently and effectively cool the internal cooling core 150.

While almost all of the adjacent conductors 154a-154h may have a different configuration, the configuration of the outer most conductors match 154a, 154h, the configuration of the inner most conductors match 154d, 154e, and the configuration of the pairs of conductors 154b, 154g; 154c, 154f that are positioned between the inner and outer conductors 154d, 154e, 154a, and 154f match. Stated another way, the configuration of the second segment 164 and in turn the configuration of the internal cooling core 150 are mirrored about the central longitudinal axis 176. Additionally, the configuration of the second segment 164 and in turn the configuration of the internal cooling core 150 is also mirrored about the central vertical axis 178. While the mirroring of these bends 166 about the axis 176, 178 is unnecessary to enable the system 10 to function, it is desirable because it enables extents of the enclosure 400 to mirror one another, reduces the number of parts in half, increases efficiencies, simplifies assembly, and reduces installation cost. As such, non-symmetrical designs may be utilized and are contemplated by this disclosure.

Based on this concentric arrangement of conductors 154a-154h, the outermost conductors 154a 154h are the longest conductors (i.e., a length between 60 mm and 240 mm, preferably 120 mm), while the innermost conductor 154d, 154e is the shortest conductor (i.e., a length between 45 mm and 180 mm, preferably 93 mm). In other words, the length of the outermost conductor 154a, 154h is approximately 29% longer than the length of the innermost conductors 154d, 154e. The difference in the lengths between the outermost and innermost conductors 154a, 154h, 154d, 154e is different than the length of the conductors that comprise the conventional rectangular busbar CRB. In other words, the lengths of each conductor in the conventional rectangular busbar CRB are equal, but the lengths of all conductors 154a-154h contained in the internal cooling core 150 are not equal. In fact, the total or combined length of all conductors 154a-154h contained in the system 10 is approximately 855.8 mm, while the total or combined length of all conductors contained in the conventional rectangular busbar CRB that would extend between the current inlet assembly 300a and a current outlet assembly 300b is approximately 665.28 mm. As such, the total length of the concentric arrangement of conductors 154a-154h is approximately 28% more than the total length of all conductors contained in the conventional rectangular busbar CRB. This increase in length also increase the resistance of the internal cooling core 150 as compared to the resistance of the conventional rectangular busbar CRB. In particular, the total resistance of the concentric arrangement of conductors 154a-154h is approximately 71.8 µΩ, while the total resistance of the conventional rectangular busbar CRB is approximately 55 µΩ. As such, the total resistance of the internal cooling core 150 is about 30.5% larger than the total resistance of the conventional rectangular busbar CRB. Increasing the total resistance of the internal cooling core 150 by about 30.5% and increasing the total length of the concentric arrangement of conductors 154a-154h by approximately 28% is unconventional because they contradict the goals of decreasing: (i) weight, (ii) cost, (iii) resistance, (iv) size, and (v) complexity of manufacturing, of the system 10.

A majority of the bends contained within the cooling segment 164 are formed at 90 degree angles or substantially at 90 degrees to maximize the spaces 172 formed between the conductors 154a-154h and to help ensure that the fluid properly flows through the enclosure 400 and around the conductors 154a-154h. Nevertheless, other configurations are contemplated by this disclosure. For example, the conductors 154a-154h that are contained within this cooling segment 164 may have a different configurations, which include alterations of: (i) type of bend contained in conductor (e.g., arc, curvilinear, parabolic, etc.), (ii) number of bends (e.g., 0-200), and (iii) angle of the bends angles between 1 degree-179 degrees. While the length of each conductor 154a-154d contained on one side 177a of the central longitudinal axis 176 is different from one another, the thickness and height of said conductors 154a-154d do not change. This simplifies manufacturing because the same stock material can be used to form each conductor 154a-154d and the bends that are formed in the stock material do not need to be specifically centered around differences in the stock material. Nevertheless, the thicknesses and the heights of the conductors 154a-154d may change over the length or height of the conductors 154a-154d. For example, the outermost conductor 154a may have a greater thickness the one of the inner conductors 154d to aid in current transfer due to the increase in length. Alternatively, the height of the innermost conductor 154d may be less than the height of the other conductors 154a-154c because the innermost conductor 154d has a shorter length in comparison to the outermost conductor 154a. Finally, other configurations of the height and thickness are contemplated by this disclosure.

Figure 3:
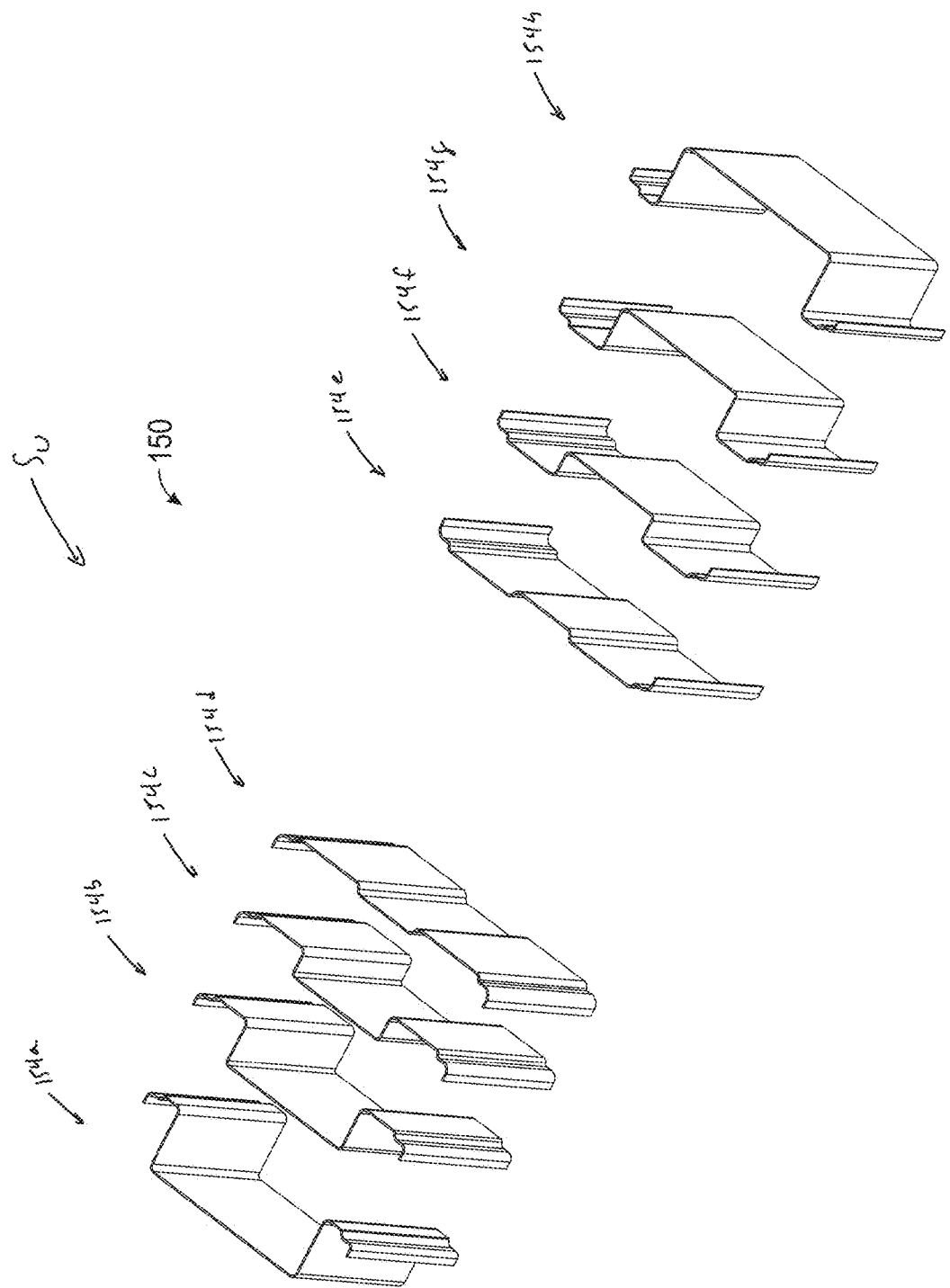
FIG. 3 is a perspective view of internal cooling core of FIG. 2 in the uncoupled state $S_U$.
Figure 4:
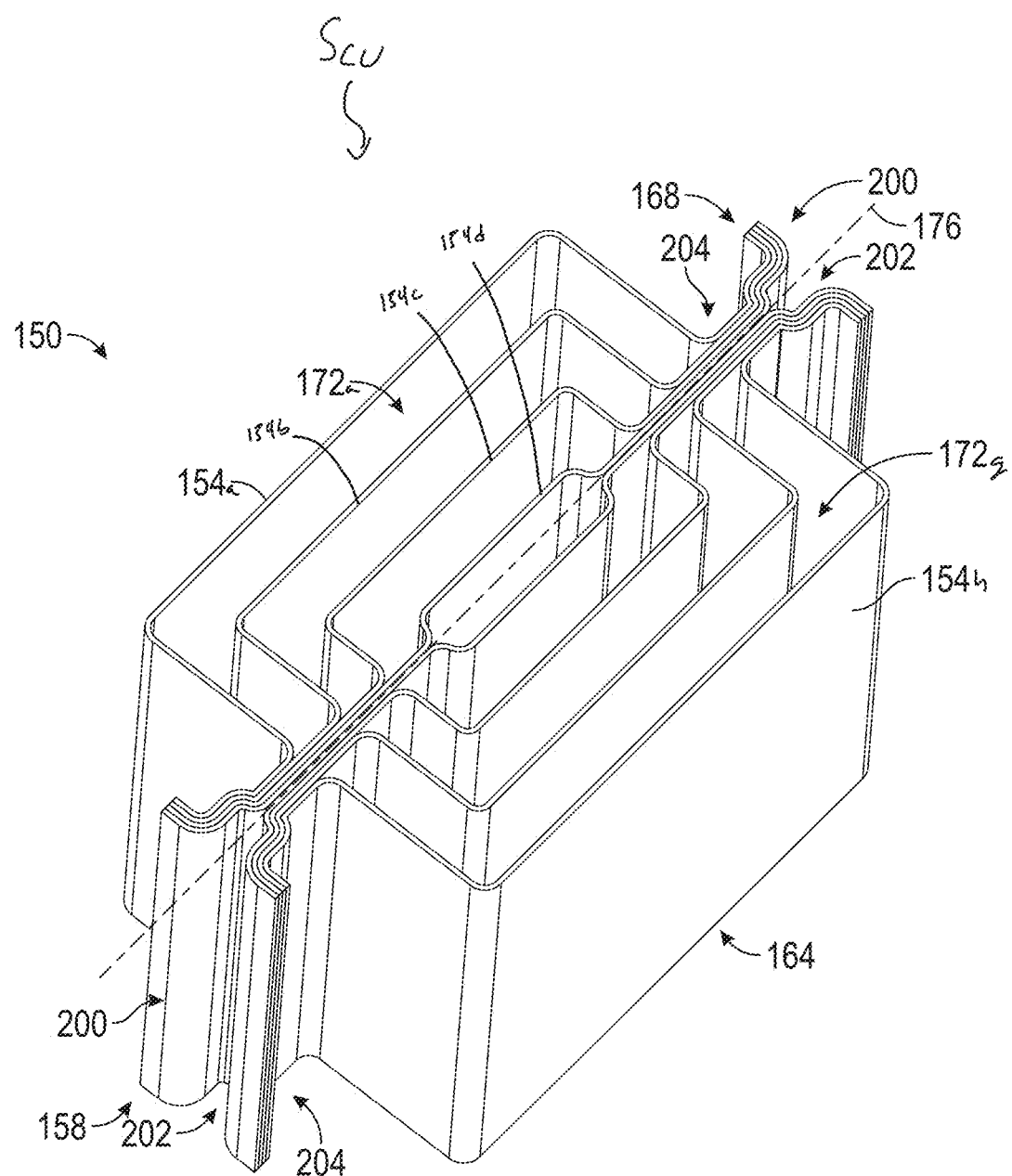
FIG. 4 is a perspective view of internal cooling core of FIG. 2 in a coupled state $S_{CU}$.

As shown in FIG. 3, each conductor 154a-154h is bent according to its position within the core 150. These bends may be formed using any number of machines and known techniques. In addition to bending the individual conductors using a bending machine or press, the conductors may be cast or printed (3D printing) in the desired configuration. Once the individual conductors 154a-154h are formed in the desired configuration, the conductors 154a-154h are typically coupled to one another via a weldment process. In other embodiments, the conductors 154a-154h may be coupled to each other using other known techniques. Instead of forming the individual conductors 154a-154h and then coupling them to one another, as shown in FIGS. 3-5, it should be understood that core 150 could be formed as a single piece via a casting, printing (3D printing), or any other known method of forming the depicted and/or described internal cooling core 150.

As best shown in FIGS. 2, 6-13, 20, 25, and 29, the current inlet and outlet assemblies 300a, 300b include: (i) an adaptor 304a, 304b, (ii) an optional touch proof post 314a, 314b, and (iii) a female terminal 324a, 324b. As discussed above, the current inlet and outlet assemblies 300a, 300b are designed to facilitate current flowing into and out of the internal cooling core 150. To facilitate said current flow, the adaptor 304a, 304b is designed to: (i) extent the entire length along the front and back surfaces of the conductors 154a-154h, (ii) couple the female terminal 324a, 324b to the inner core 150. As such, the adaptor 304a, 304b includes three portions, wherein: (i) a first portion 306a, 306b is a flat extent that is designed to be coupled to an upper extent 230 of the core 150, (ii) a second extent 308a, 308b is a raised extent that provides additional space for the touch proof post 314a, 314b and extends across a middle extent 234 of the core 150, and (iii) a third extent 310a, 310b that is a flat extent that is designed to be coupled to a lower extent 238 of the core 150.

To ensure that the adaptor 304a, 304b can be coupled to the flared out design of each conductor 154a-154h (described above), the width of the adaptor 304a, 304b is between 7 mm and 28 mm and preferably 14 mm. As shown in at least FIG. 11, the width $W_A$ of the adaptors 304a, 304b is: (i) approximately equal to the width of the rear wall of the terminal 324a, 324b $W_{TRW}$, and (ii) less than the width $W_T$ of the terminal. As such, the current flow path is defined from (i) from the male connector assembly 6, (ii) into the sidewalls 328a-328d of the female terminal 324a, (ii) into the rear wall 330 of the female terminal 324a, and (iv) into the adaptor 304a is not restricted by the width of said adaptor 304a. Likewise, the current flow path is further defined: (i) from the internal cooling core 150, (ii) into the adaptor 304b, (iii) into the rear wall of the female terminal 324b is not restricted by the width of said adaptor 304b. In other words, the width $W_A$ of the adaptors 304a, 304b do not form a current choke point in the system 10. Additionally, unlike the thickness of 0.5 mm for each individual conductor 154a-154h, the adaptor 304a, 304b has a significant thickness $T_A$ that is between 4 mm and 1 mm and preferably equal to or larger than 2 mm. The significant thickness $T_A$ of the adaptors 304a, 304b is desirable to ensure that said thickness $T_A$ is equal to or greater than the thickness $T_{ME}$ of the flat mounting extent 200. As such, the thicknesses $T_A$ of the adaptors 304a, 304b also do not create a choke point for current flow into and out of the internal cooling core 150.

It should be understood that other designs and configurations of the adaptor 304a, 304b are contemplated within this disclosure. For example, the second extent 308a, 308b and the touch proof post 314a, 314b may be omitted. As such, the adaptor 304a, 304b in this alternative embodiment would be a linear piece of metal coupled between the core 150 and the female terminals 324a, 324b. In a further alternative embodiment, the adaptor 304a, 304b may be omitted in its entirety and the female terminals 324a, 324b may be directly coupled to the core 150. In particular, this alternative design may be particularly useful when the core 150 is integrally formed from a single piece of metal (e.g., cast or printed). Additionally, this alternative design is beneficial because it either: (i) reduces parts, weight, and cost or (ii) allows for an increase in the internal cooling core 150.

The touch proof post 314a, 314b is made from a non-conductive material, is designed to protect from foreign objects contacting the conductive extent of the female terminals 324a, 324b. Additionally, said touch proof post 314a, 314b is received by an extent of the male connector assembly when the male terminal is inserted into the female receptacle 326a, 326b, which aids in positing of the male terminal, and reduces vibrations between the male the female terminals. Additional information about the touch proof post 314a, 314b is described in connection with PCT/US19/36070, PCT/US20/13757, PCT/US20/49870, PCT/US21/33446, and U.S. Provisional Application No. 63/222,859, each of which is incorporated herein by reference. As discussed within these references, the touch proof post 314a, 314b is optional and may be omitted from system 10. Moreover, the touch proof post 314a, 314b may be replaced with the internal interlock system described in detail in PCT/US21/43686, which is incorporated herein by reference.

The female terminal 324a, 324b is made from a conductive material and is designed to be mechanically and electrically connected to the male terminal bodies (not shown), which are contained in the male charging connector assembly 6 and the male discharging connector assembly 8. The female terminal 324a, 324b includes a female terminal body 326a, 326b, wherein said body 326a, 326b is comprised of: (i) a rear wall 330 and (ii) an arrangement of female terminal sidewalls 328a-328d that are coupled to one another via a rear wall 330 to form a substantially rectangular shape. The rear wall 330 coupled to the adaptor 304a, 304b and includes an opening 330a formed therein that is designed to receive an extent of the touch proof post 314a, 314b.

In the arrangement of female terminal side walls 328a-328d, one female terminal side wall 328a of the arrangement of female terminal side walls 328a-328d is: (i) substantially parallel with another one female terminal side wall 328c of the arrangement of female terminal side walls 328a-328d and (ii) substantially perpendicular to two female terminal side wall 328b, 328d of the arrangement of female terminal side walls 328a-328d. Also, all female terminal side walls 328a-328d are perpendicular to the rear wall 330. As such, the combination of walls 328a-328d, 330 of the female terminal body 326a, 326b defines a female terminal receiver 332. The female terminal receiver 332 is designed and configured to be coupled, both electrically and mechanically, to an extent of the male terminal body when the male terminal body is inserted into the female terminal receiver 332. Additional information about the female terminal 324a, 324b is described in connection with PCT/US19/36010, PCT/US19/36070, PCT/US20/13757, PCT/US20/49870, PCT/US21/43686, and U.S. Provisional Application No. 63/222,859, each of which is incorporated herein by reference.

The female terminal 324a, 324b is typically formed for a single piece of material (e.g., metal). Therefore, the female terminal 324a, 324b is a one-piece female terminal 324a, 324b and has integrally formed features. To integrally form these features, the female terminal 324a, 324b is typically formed using a die cutting process. However, it should be understood that other types of forming the female terminal 324a, 324b may be utilized, such as casting or using an additive manufacturing process (e.g., 3D printing). In other embodiments, the features of the female terminal 324a, 324b may not be formed from one-piece or be integrally formed, but instead formed from separate pieces that are welded together. In alternative embodiments, the current inlet and outlet assemblies 300a, 300b may include multiple female terminals 324a, 324b on each side of the internal cooling core 150. For example, there may be three female terminals in the current inlet assembly 300a, and there may be three female terminals in the current outlet assembly 300b. Alternatively, there may be six female terminals in the current inlet assembly 300a and only one female terminal in the current outlet assembly 300b. In fact, there could be any number (e.g., 1 to 100) of female terminals in the current inlet assembly 300a and any number (e.g., 1 to 100) of female terminals in the current outlet assembly 300b. In further embodiments, the female terminals may be replaced with one or more male terminals or any combination thereof.

III. Enclosure

As best shown in FIGS. 2, 6, 14, 17-19, 25, 27, 34-35, 37-38, 40, 42, and 44-48, the enclosure 400 is comprised of: (i) a current inlet casing 450a, (ii) a current outlet casing 450b, (iii) a current inlet sealing assembly 600a, (iv) a current outlet sealing assembly 600b, (v) a housing assembly 700. The enclosure 400 is configured to allow a non-conductive fluid to pass through the busbar cooling system 10. In particular, the non-conductive fluid is designed to flow into system 10 from an inlet 706 formed within a upper housing 704 of the housing assembly 700, around the conductors 154a-154h contained in the internal cooling core 150, and out of system 10 through an outlet 714 that is formed within a lower housing 712 of the housing assembly 700. Said non-conductive fluid may be in the form of: (i) a gas (e.g., air), (ii) a liquid (e.g., 3M Novec Engineered Fluid, MIVOLT, AmpCool 100 series (i.e., single-phase fluid), hydrocarbon based liquids (e.g., mineral-oils, synthetic-oils or bio-oils), fluorocarbon based liquids, and/or fully engineered liquids), (iii) a phase change material (i.e., dual-phase fluid), or (iv) any other chemical or substance that may be used in connection with the cooling of a material. It should be understood that the above described fluids may: (i) weigh 80% of the weight of water, (ii) may have a dielectric constant between 2 and 2.2, and (iii) a heat capacity between 1.2 and 1.5 kJ/kg K. In addition to the non-conductive fluids that are disclosed above, other non-conductive fluids that are designed to be place in contact with and cool electrical components may be utilized.

As best shown in FIGS. 2, 6, 14-16, 21, 25, 29, and 44-48, the current inlet/outlet casings 450a, 450b are designed to: (i) receive an extent of the female terminals 324a, 324b, (ii) facilitate the coupling of the male charging/discharging connector assemblies 6, 8 with the system 10, (iii) help ensure that fluid does not improperly leak out of the apertures 703a, 705a formed in the front and rear of the housing assembly 700. To achieve these design goals, the casings 450a, 450b include: (i) a main portion 460a, 460b and (ii) a terminal portion 480a, 480b. The main portion 460a, 460b has a plurality of side walls 462a, 462b that are designed to: (i) fill the apertures 703a, 705a that are formed in the housing 700, and (ii) form a receiver 464a, 464b. Said receiver 464a, 464b is designed to receive an extent of the conductive assembly 100 and more specifically a majority of the current receiving/providing segment 158, 168 of the core 150. As such and as shown in FIGS. 25, the current receiving/providing segment 158, 168 of the core 150 extend past the outermost surface of the sidewalls 722a-722d, 732a-732d of the housing assembly 700. This design helps maximizes the cooling capacity of the system 10 and facilitates the coupling of the connector assemblies 6, 8, to the female terminals 324a, 324b.

As discussed above, one function of the main portion 460a, 460b of the casings 450a, 450b is to fill the apertures 703a, 705a that are formed in the housing 700. To ensure that the apertures 703a, 705a are filled and that the main portion 460a, 460b of the casings 450a, 450b make a proper seal with the sidewalls 722a-722d, 732a-732d of the housing assembly 700, the main portion 460a, 460b includes a tongue or flange 468a, 468b that is configured to be received by an extent (e.g., grove) of the sidewalls 722a-722d, 732a-732d. This tongue and grove configuration helps ensure that the main portion 460a, 460b is properly coupled to the housing, whereby ensuring that fluid does not accidently escape the housing assembly 700. It should be understood that other structures may be utilized to ensure that these structures are properly aligned and joined with one another. For example, a dovetail joint or any other similar arrangement may be utilized.

Like the main portion 460a, 460b, the terminal portion 480a, 480b includes a plurality of side walls 482a, 482b that form a received 484a, 484b that is designed to receive an extent of the conductive assembly 100 and more specifically a majority of the female terminal 324a, 324b. The terminal portion 480a, 480b also includes a ramped or sloped inner surface 482a, 482b that is aids in the coupling of the male terminal assemblies of the male charging/discharging connector assemblies 6, 8 with the female terminal 324a, 324b. This ramped or sloped inner surface 482a, 482b is described in greater detail within PCT/US19/36070 and PCT/US21/57959, which both incorporated herein by reference. Further, the terminal portion 480a, 480b includes an outward projection 484a, 484b that interacts with the connector position assurance (CPA) coupled to the male charging/discharging connector assemblies 6, 8. Additional details about the CPA projections 484a, 484b and the male CPA structures that interacts with the CPA projection 484a, 484b are described within PCT/US19/36070, PCT/US20/49870, PCT/US21/33446, PCT/US21/57959.

In addition to keeping the fluid from leaking out of the housing assembly 700, the current inlet/outlet casings 450a, 450b are made from a non-conductive material (e.g., plastic) and are designed to protect the female terminals 342a, 324b for contact with foreign objects. It should be understood that other shapes, configurations, or designs of the inlet/outlet casings 450a, 450b are contemplated by this disclosure. For example, the inlet/outlet casings 450a, 450b may include terminal portions of the conductive assembly 100 includes multiple terminals on one or both sides of the internal cooling core 150. Alternatively, the shape of the terminal portions 480a, 480b may be circular or any other shape that is configured to receive the shape of the female terminals 324a, 324b. Further, the shape of the main portion 460a, 460b may be altered if the shape of the adaptor 304a, 304b or the current receiving/providing segment 158, 168 of the individual conductors 154 is altered.

As best shown in FIGS. 2, 6, 20, 25, and 29, the sealing assemblies 600a, 600b are designed to ensure that fluid does not improperly leak out of the enclosure 400. The sealing assemblies 600a, 600b are preferable formed from a liquid that is injected into the gaps or openings between the adaptor 304a, 304b, female terminal 324a, 324b and the inlet/outlet casings 450a, 450b during assembly and then the liquid cures and forms a solid seal between these components. For example, the liquid may be a Loctite manufactured by Henkel AG & Company, KGaA. Alternatively, the seal may be formed from a solid silicon material or any other type of liquid or solid sealing agent.

As best shown in FIGS. 1-2, 6, 14, 17-48, the housing assembly 700 includes an upper housing 704 and a lower housing 712 that may be coupled together using a welded processes. Both the upper and lower housings 704, 712 include a wall arrangement 720, 730, which are comprised of: (i) a plurality of exterior side walls 722a-722d, 732a-732d, (ii) a top or a bottom wall 724, 734, and (iii) a plurality of interior walls 748a-748g. The combination of exterior walls 722a-722d, 724 of the upper housing 704 from an upper receptacle 704a, while the combination of walls 732a-732d, 734 of the lower housing 712 from a lower receptacle 712a. The combination of the upper receptacle 704a and lower receptacle 712a form the non-conductive fluid receiver 707. As discussed in greater detail below, the interior walls 748a-748g and the cooling segment 164 of the internal cooling core are positioned in the non-conductive fluid receiver 707, while the non-conductive fluid receiver 707 is designed and configured to receive the non-conductive fluid, when said fluid passes from the inlet 706 to the outlet 714. It should be understood that the housing assembly 700 is made from a non-conductive material (e.g., plastic) and the components of the housing 700 (i.e., upper and lower housings 704, 712) may be welded together once the conductive assembly 100 is installed therein. Additionally, other methods of joining the components of the housing 700 are contemplated by this disclosure.

Figure 19:
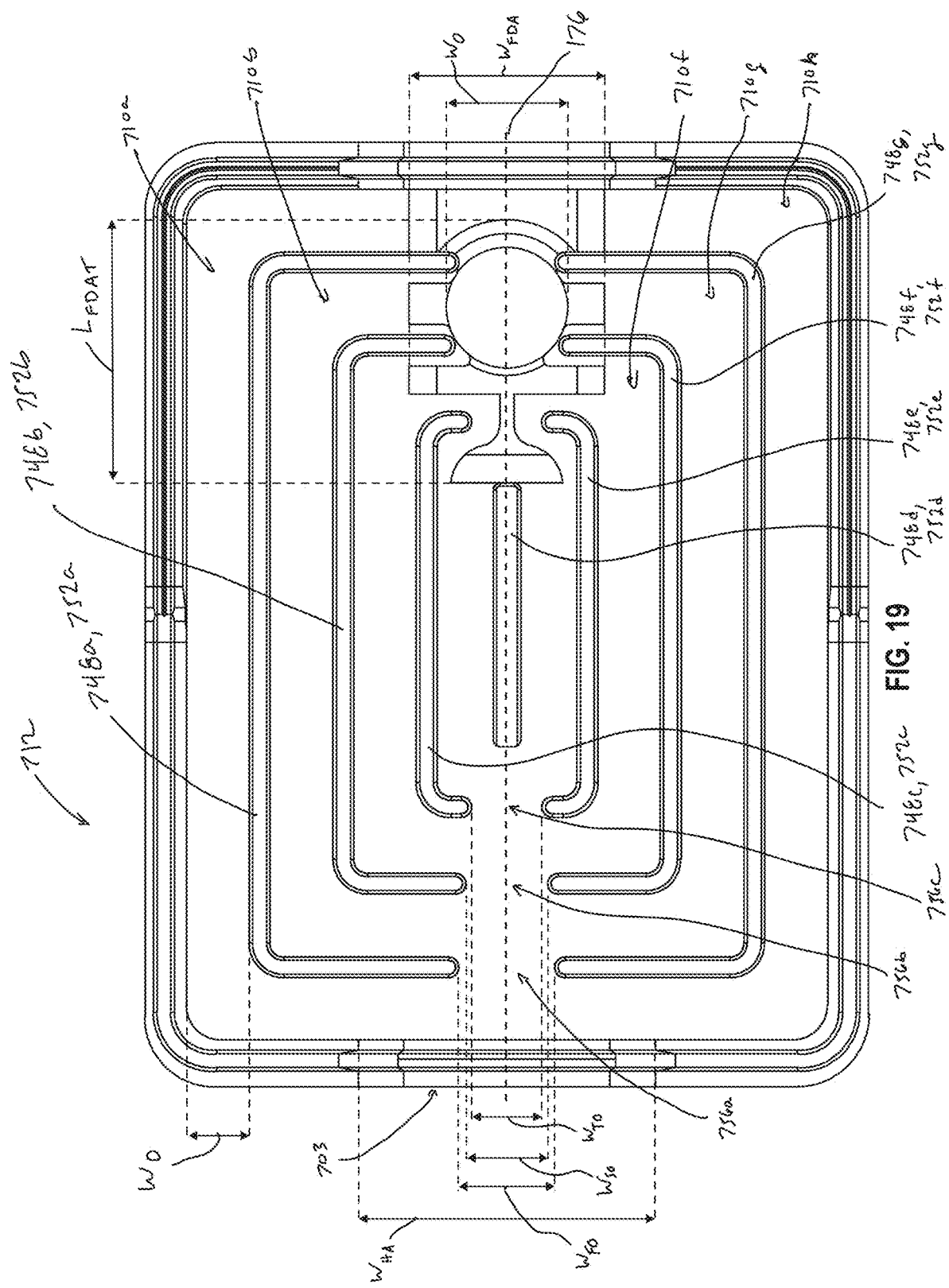
FIG. 19 is a plan view of a housing of the enclosure of FIG. 14, showing the dimensions of the internal cavities.
Figure 20:
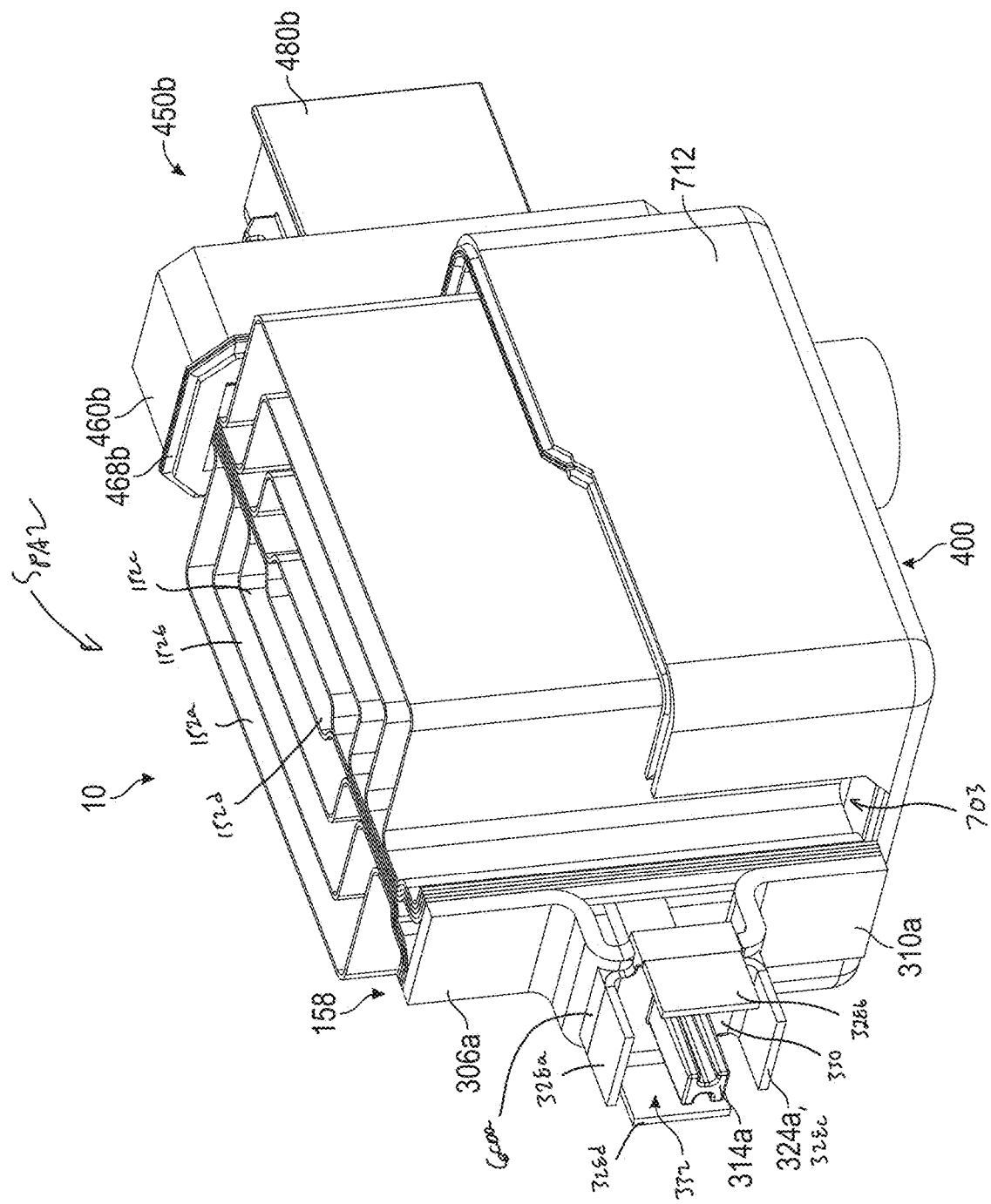
FIG. 20 is a perspective view of the busbar cooling system of FIG. 1 in a second partially assembled state $S_{PA2}$, showing the conductive assembly and the lower housing.
Figure 21:
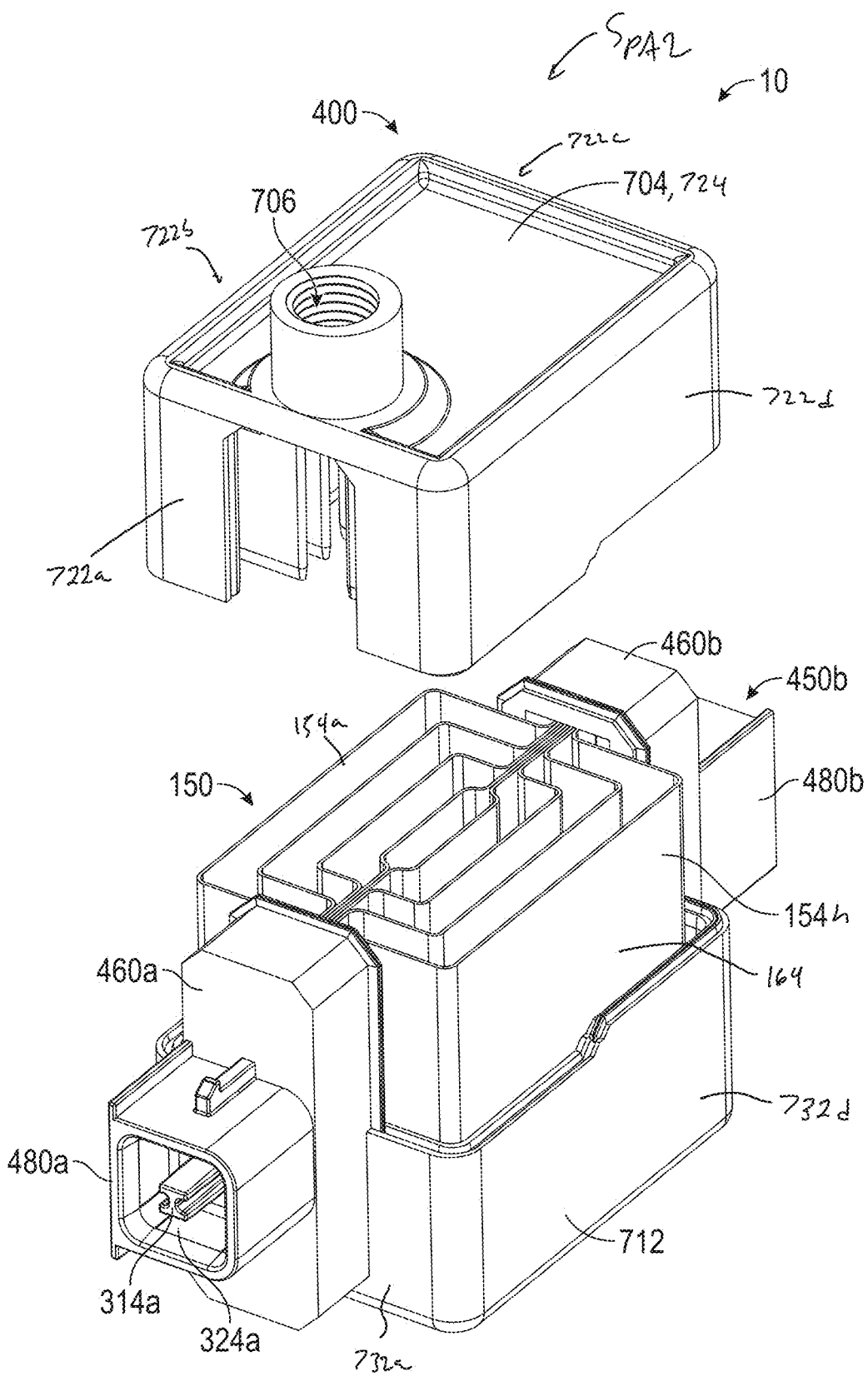
FIG. 21 is a perspective view of the busbar cooling system of FIG. 1 in the second partially assembled state $S_{PA2}$, wherein the upper housing and current inlet casing have been omitted to show a sealing assembly and an extent of the conductive assembly.
Figure 22:
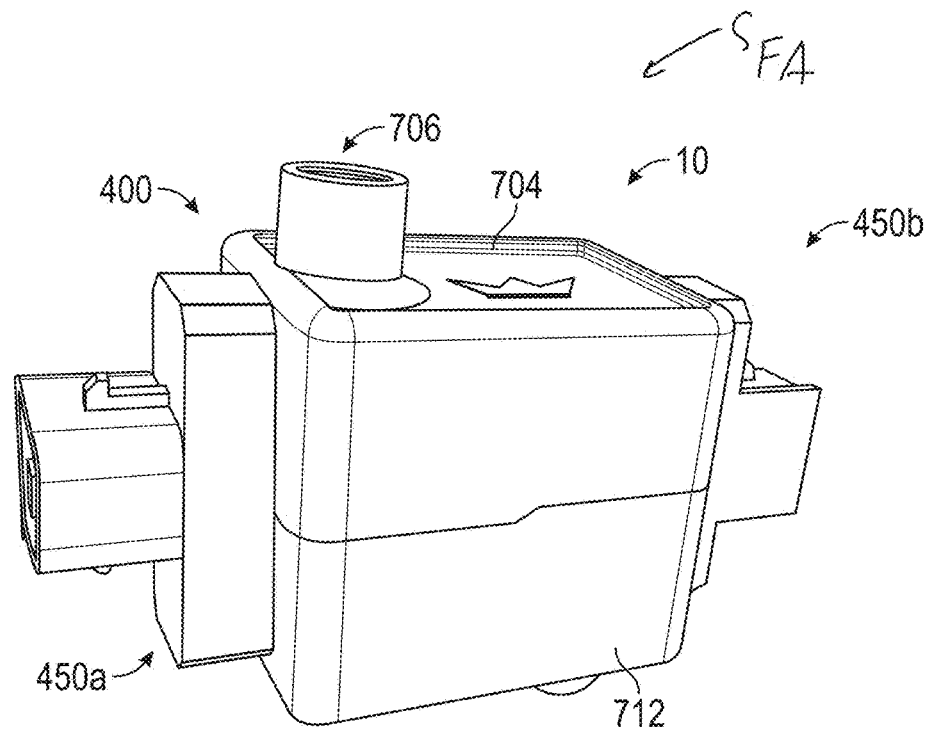
FIG. 22 is a perspective view of the busbar cooling system of FIG. 1 in a fully assembled state $S_{FA}$.
Figure 23:
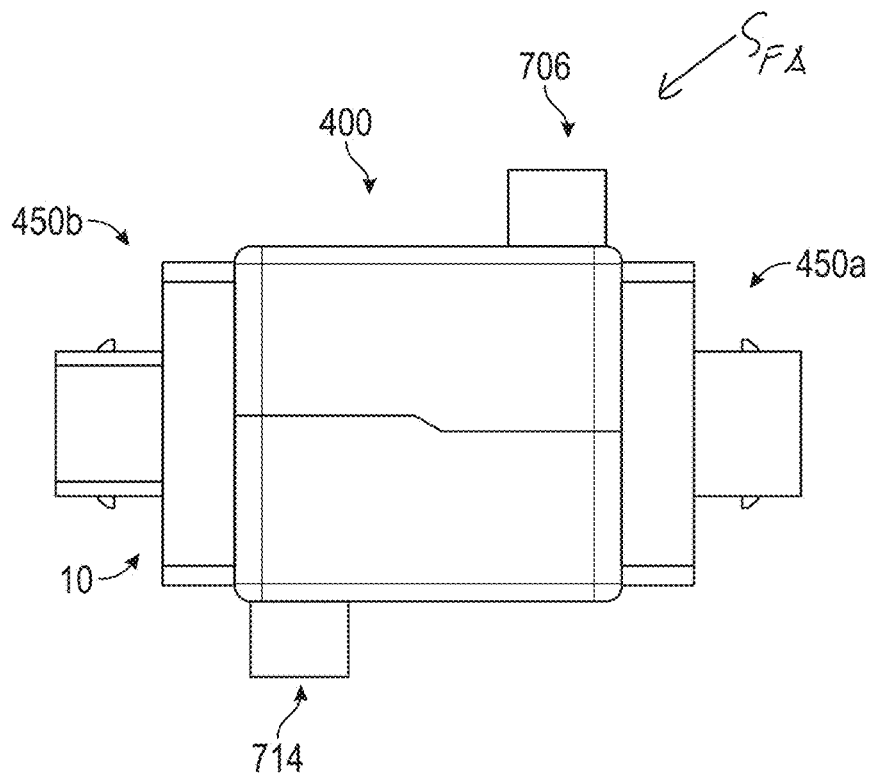
FIG. 23 is a first side view of the busbar cooling system of FIG. 22.
Figure 26:
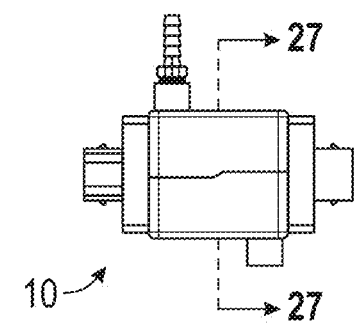
FIG. 26 is a second side view of the busbar cooling system of FIG. 22.
Figure 27:
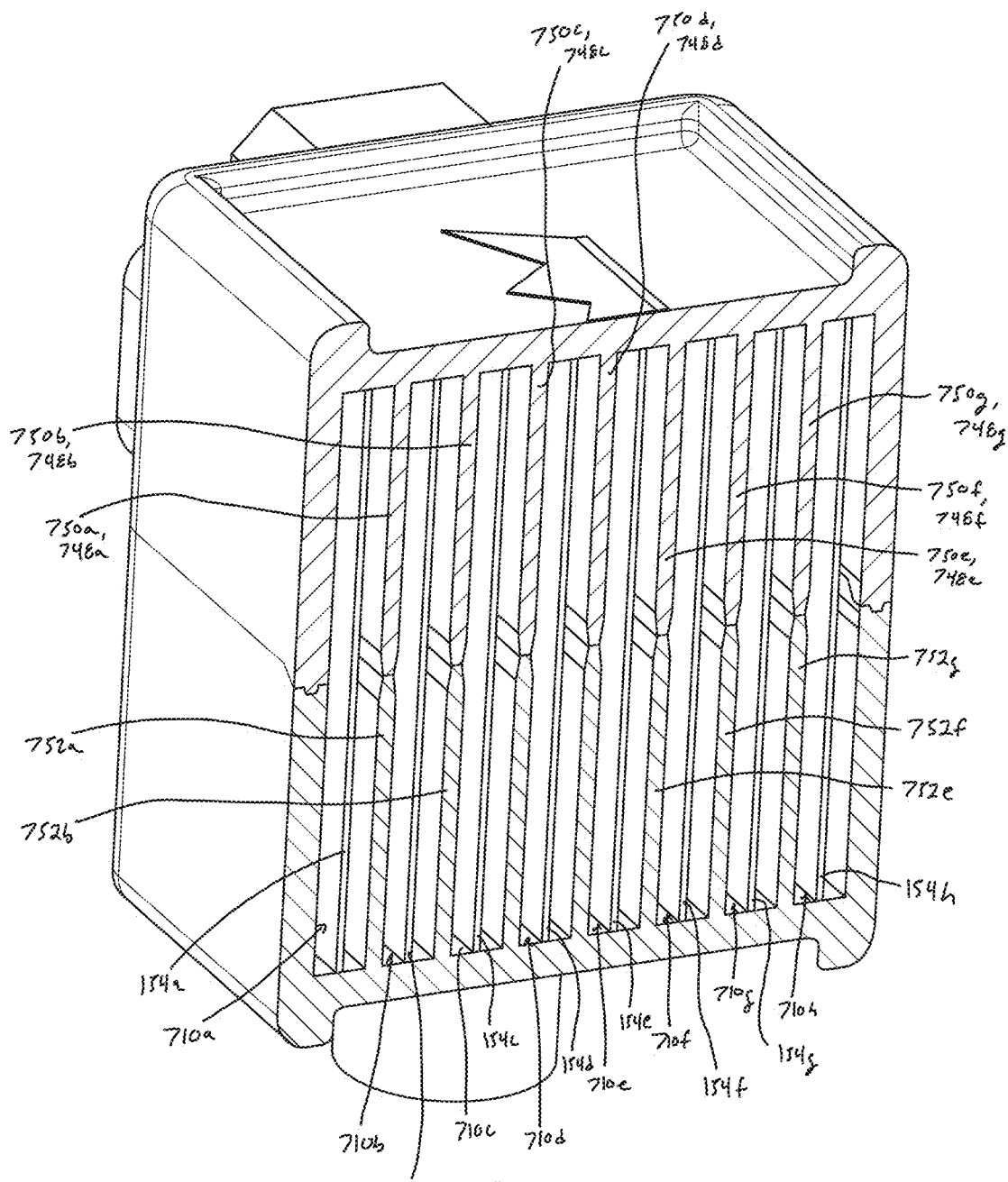
FIG. 27 is a cross-sectional view of the busbar cooling system taken along line 27-27 of FIG. 26, showing the distinct cavities formed in the enclosure and an extent of the internal cooling core positioned therein.
Figure 32:
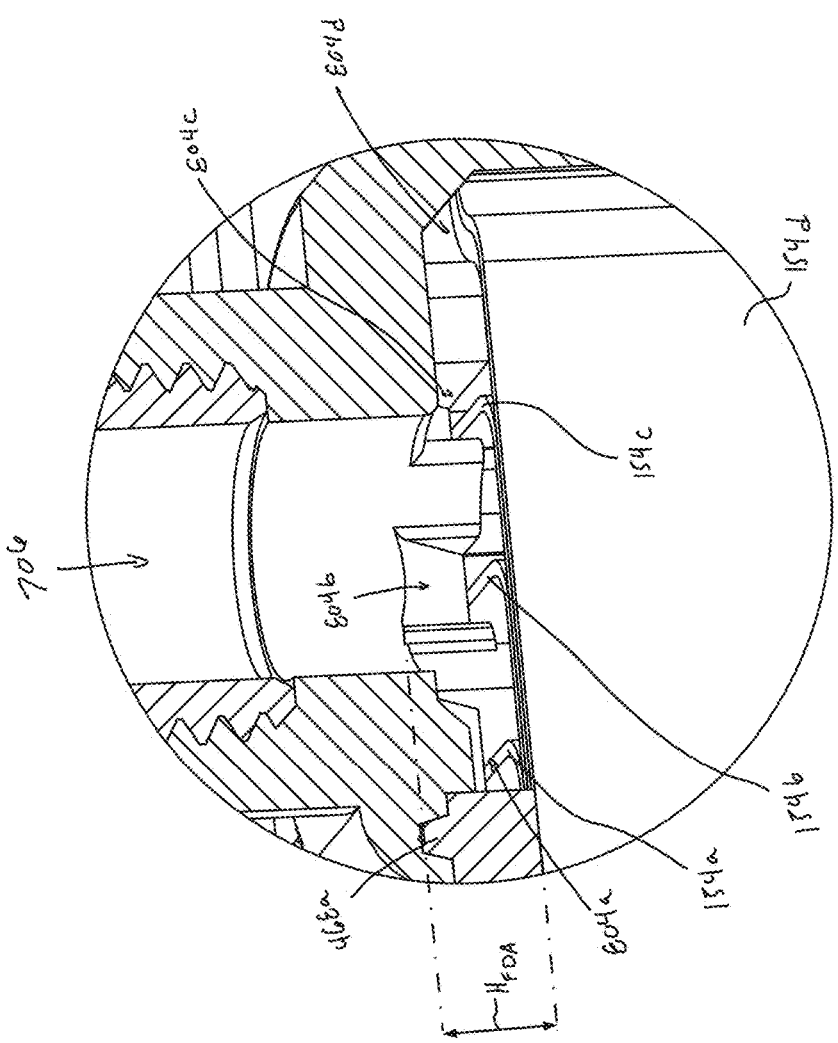
FIG. 32 is zoomed-in view of FIG. 31.
Figure 30:
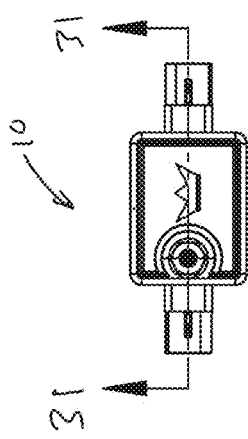
FIG. 30 is a top view of the busbar cooling system of FIG. 22.
Figure 31:
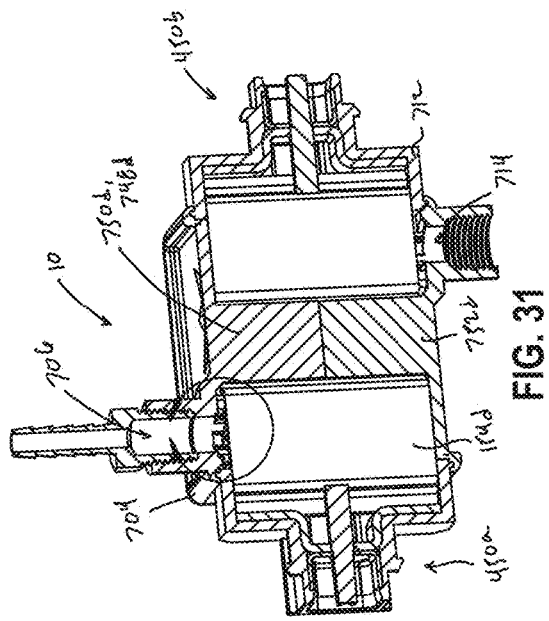
FIG. 31 is a cross-sectional view of the busbar cooling system taken along line 31-31 of FIG. 30, showing a fluid distribution assembly formed in an extent of the upper housing.
Figure 39:
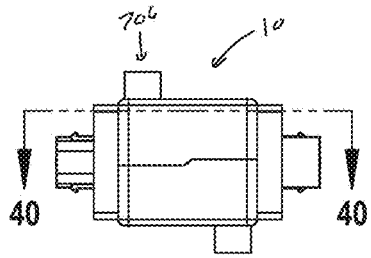
FIG. 39 is a side view of the busbar cooling system of FIG. 22.
Figure 41:
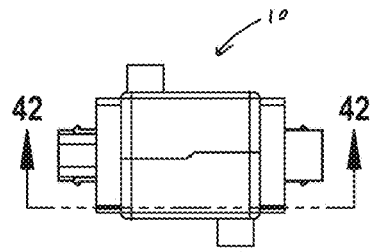
FIG. 41 is a side view of the busbar cooling system of FIG. 22.

As shown in the Figures including FIG. 19, a plurality of structures may be formed in the wall arrangement 720, 730, wherein said structures may include: (i) a frontal aperture 703 and a rear aperture 705, wherein said frontal aperture 703a is formed in the front wall 722a, 732a and said rear aperture 705 is formed in the rear wall 722c, 732c, and (ii) an inlet opening 706 and an outlet opening 714, wherein said inlet opening 706 is formed in the top wall 724 and said outlet opening 714 is formed in the bottom wall 734. Said housing apertures 703, 705 allow the terminal 324a, 324b to be coupled to the core 150 and male connector assemblies 6, 8 and have an aperture width $W_{HA}$ that is greater than both the opening 706, 714 width $W_O$ and fluid distribution assembly 800a, 800b width $W_{FDA}$. It should be understood that in other embodiments, the aperture width $W_{HA}$ may be smaller or larger.

The inlet and outlet openings 706, 714 are configured to allow fluid to enter and exit the non-conductive fluid receiver 707. As shown in the Figures, the inlet and outlet openings 706, 714 have substantially the same size and are positioned above and below portions of the cooling core 150 at a location where the conductors 154a-154h are coupled to one another. To facilitate the fluid flow into and out of the system 10, the inlet and outlet openings 706, 714 may be configured to receive a threaded barbed hose fitting 708, wherein said threaded barbed hose fitting 708 is designed to be couple a hose or other liquid carrying member to the housings 704, 712. In other embodiments, the inlet and outlet openings 706, 714 may have other: (i) locations, (ii) differing sizes, and/or (iii) configurations that interact with other components to receive and return the non-conductive fluid.

As best shown in FIGS. 25, 32, 35, 38, 40, and 42, the housings 704, 712 include a fluid distribution assembly 800a, 800b that extends radially from the inlet/outlet openings 706, 714 and into the housings 704, 712. The fluid distribution assembly 800a is comprised of a collection of a plurality 802a, 802b of channels 804a-804g, 806a-806g. In particular, the channels 804a-804g, 806a-806g are recesses or grooves that are formed in a wall of the housing 704, 714, such as the top/bottom wall 724, 734 of the housings 704, 712. While the shape of each channel 804a-804g, 806a-806g are mirrored across the central longitudinal axis 176, the shape of channels on one side of the axis 176 are substantially different from one another. In particular, channels 804a, 804g, 806a, 806g are the deepest and widest channels, while channels 804d, 806d are the narrowest and thinnest channels. For example, the width of channels 804a, 804g, 806a, 806g is nearly 4.5 times greater than the width of channels 804d, 806d. Also, extending from channels 804d, 806d is a fan shaped recess that further aids in the distribution of fluid in the cavities that receive the center most conductors 154d, 154e. It should be understood that other configurations are contemplated by this disclosure.

Figure 40:
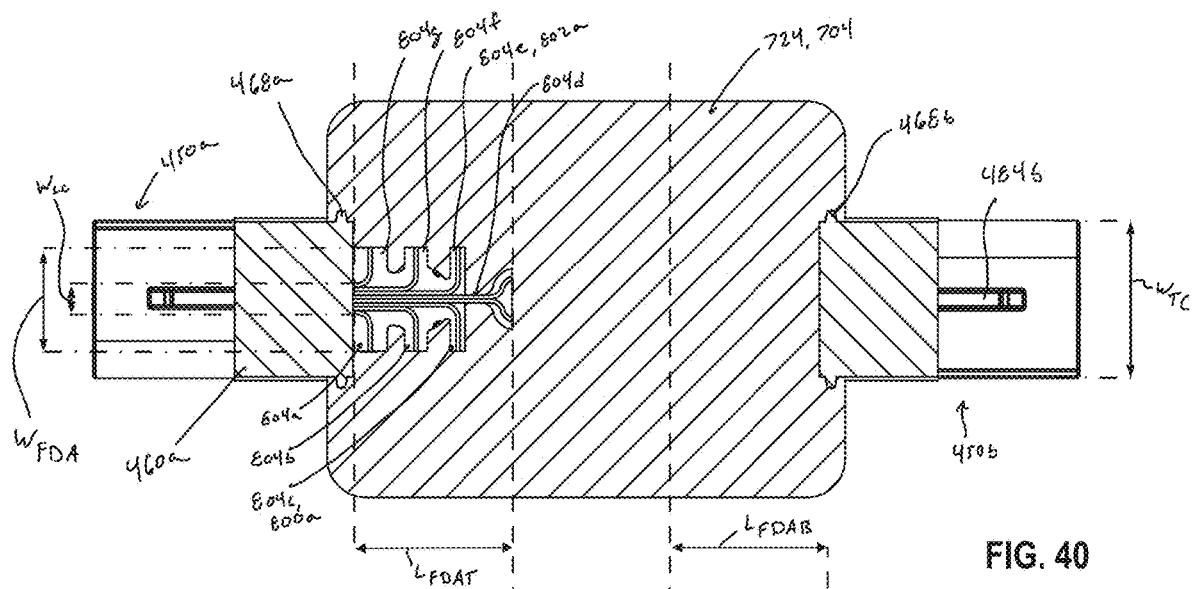
FIG. 40 is a cross-sectional view of the busbar cooling system taken along line 40-40 of FIG. 39, showing a fluid distribution assembly formed in an extent of the upper housing.
Figure 42:
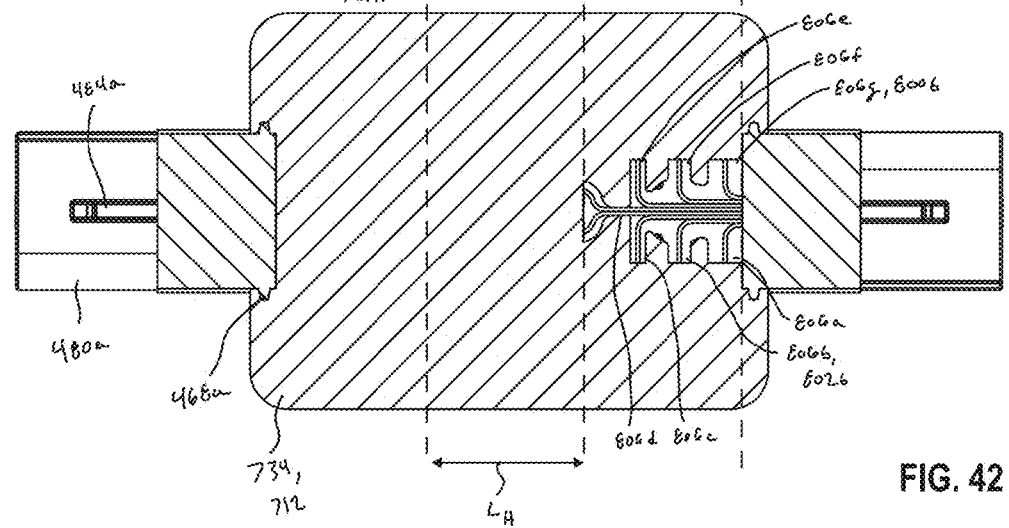
FIG. 42 is a cross-sectional view of the busbar cooling system taken along line 42-42 of FIG. 41, showing a fluid distribution assembly formed in an extent of the lower housing.
Figure 43:
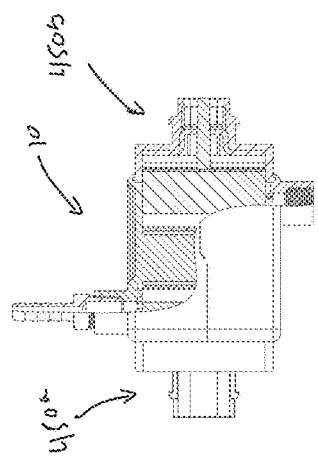
FIG. 43 is a side view of the busbar cooling system of FIG. 22, wherein a portion of the busbar cooling system has been cutaway to reveal an inner extent of housing and the conductive assembly.

As best shown in FIGS. 38, 40, and 42, an extent of each one of the conductors 154a-154h is positioned substantially in the center of each one of said channels 804a-804g, 806a-806g. In other words, each channel 804a-804g, 806a-806g is substantially centered over an extent of each conductor 154a-154h. This design is beneficial because it ensures that non-conductive fluid that is transferred into or out of the system 10 flows evenly over the interior and exterior surfaces of the conductors 154a-154h. Without the formation of the fluid distribution assembly 800a, 800b, the non-conductive fluid could not flow into certain individual cavities 710a-710h and said flow over the conductors 154a-154h would not be substantially even. Nevertheless, alterations to the housing assembly 700 are contemplated by this disclosure to ensure that the fluid distribution assembly 800a, 800b could be omitted and the non-conductive fluid could flow into all cavities 710a-710h and said flow over the conductors 154a-154h would be substantially even. For example, the space between the upper and lower edges of the conductors 154a-154h and the inner surfaces of the top/bottom wall 724, 734 could be increased and/or openings could be formed between the cavities 710a-710h to allow fluid to flow therebetween.

The fluid distribution assembly 800a, 800b has a width $W_{FDA}$ that is: (i) greater than the width $W_{LC}$ of the longitudinal extent 204a, 204b of the current receiving/providing segment 168 of the cooling core 150, (ii) greater than the opening 706, 714 width $W_O$, and (iii) less than the width WTC inlet/outlet casings 450a, 450b. This configuration ensures that an extent of each conductor 154a-154h is positioned within an extent of the fluid distribution assembly 800a, 800b, while not extending too far into the distinct cavities 710a-710h of the housing assembly 700. The fluid distribution assembly 800a, 800b also includes a height $H_{FDA}$ that extends between an extent of the assembly 800a, 800b and the top/bottom of the conductors 154a-154h. Said height $H_{FDA}$ is non-uniform across the fluid distribution assembly 800a, 800b and in fact tapers to zero or disappears as it moves radially outward from the edge of the inlet/outlet openings 706, 714. As such, each of the fluid distribution assembly 800a, 800b has a length $L_{FDA1}$, $L_{FDA2}$ that extends from the outermost extent of the channels 804a-804g, 806a-806g to an inner most extent of the channels 804a-804g, 806a-806g. The length of $L_{FDA1}$, $L_{FDA2}$ the fluid distribution assembly 800a, 800b does not extend over half the length of the housing 700 and as such, there is a housing length $L_H$ is positioned between the fluid distribution assembly lengths $L_{FDA1}$, $L_{FDA2}$.

As described above, the housing 700 includes a plurality of interior walls 748a-748g. In particular, the plurality of interior walls 748a-748g includes: (i) a plurality of upper housing an interior wall arrangement with a plurality of interior walls 750a-750g that extend downward from the top wall 724 and (ii) a plurality of lower housing having a interior wall arrangement with a plurality of interior walls 752a-752g that extend upward from the bottom wall 734. In other words, said plurality of interior walls 748a-748g are positioned in the non-conductive fluid receiver 707 of the housing 700 are formed from walls 750a-750g, 752a-752g. Specifically, interior wall 750a of the upper housing 704 is placed in contact with interior wall 752a of the lower housing 712, when the upper housing 704 is coupled to the lower housing 712, to form wall 748a. Additionally, the other interior walls 750b-750g of the upper housing 704 have a similar positional relationship with the other interior walls 752a-752g of the lower housing 712, when the upper housing 704 is coupled to the lower housing 712, to form walls 748b-748g. It should be understood that the disclosure contemplates interior walls 748a-748g with other configurations. For example, openings other than 756a-756c may be formed in said walls 748a-748g.

The interior walls 748a-748g have gaps or openings 756a-756c formed between extents of said walls 748a-748g, wherein said gaps or openings 756a-756c are aligned with: (i) each other, (ii) the front and rear apertures 705a, 705b, and (iii) the center wall 748d. In particular, the first gap or opening 756a is formed between an outermost pair of walls 748a, 748g and has a first opening width $W_{FO}$, the second gap or opening 756b is formed between a second outermost pair of walls 748b, 748f and has a second opening width $W_{SO}$, and the third gap or opening 756c is formed between a innermost pair of walls 748c, 748d and has a third opening width $W_{TO}$. As shown in FIG. 19, the first opening width $W_{FO}$ is larger than the second opening width $W_{SO}$, and the second opening width $W_{SO}$ is larger than the third opening width $W_{TO}$. Other than openings 756a-756c, no openings are formed between the walls 748a-748g, which therefor forms distinct cavities 710a-710h in the non-conductive fluid receiver 707. Due to this configuration and the configuration of the fluid distribution assembly 800a, 800b, no fluid can flow between the cavities 710a-710h within the area of the system 10 that extends between the inner most points of the fluid distribution assembly 800a, 800b and is shown as the housing length $L_H$ in a combination of FIGS. 40 and 42.

Each distinct cavity 710a-710h is configured to receive a major extent of one of the individual conductors 154a-154h. In other words, the outermost cavity 710a receives a substantial extent of the outermost individual conductor 154a. Likewise, one of the innermost cavities 710d receives a substantial extent of one of the innermost individual conductor 154d. The arrangement of these conductors 154a-154h within these cavities 710a-710h is best shown in FIGS. 21, 25, 27, 37, and 44. By forming these distinct cavities 710a-710h that surround each of the conductors 154a-154h, turbulent flow across the surface of each conductor 154 is increased, which increases the cooling capabilities of the system 10. The conductors 154a-154h extend across the entire height of the cavity 710a-710h in order to maximize the cooling capacity in a defined space. In alternative embodiments, the internal walls 708, 7016 may be omitted and the volume contained within the housing 700 may be substantially unobscured except for the conductors 154. This design may not perform as well as the design that includes the internal walls 708, 716, but maybe sufficient in some applications.

Do to the concentric configuration, the outer cavities 710a, 710h have a longer length than the inner cavities 710d, 710e and as such outer cavities 710a, 710h will hold more fluid than the inner cavities 710d, 710e. The width $W_D$ of each distinct cavity 710a-710h may be between 1 mm and 20 mm, preferably between 4 mm and 5 mm. The width of each distinct cavity 710a-710h may remain constant or substantially constant across the housing 700, or said widths may vary laterally or horizontally across the housing 700. Additionally, the outer cavities 710a, 710h may have a larger width than the inner cavities 710d, 710e. This is beneficial because the length of the conductors 154a, 154h are longer in these cavities and increasing fluid flow across these conductors 154a, 154h will help reduce the effects of the increases of resistance. Other configurations of the width, length, depth, and configuration of these cavities 710a-710h is contemplated by this disclosure.

IV. Operation and Functionality of the System

Figure 44:
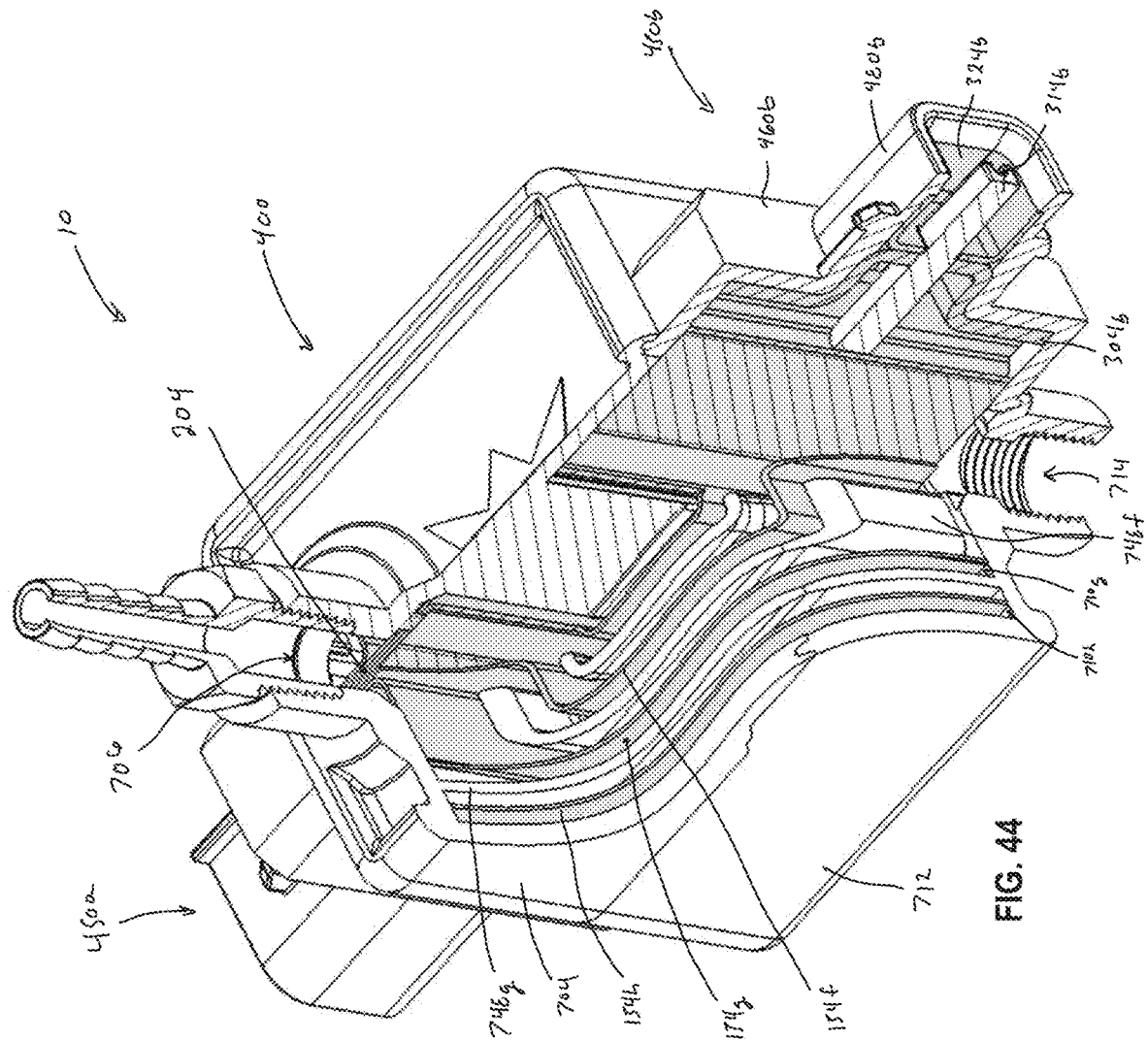
FIG. 44 is a perspective view of the busbar cooling system of FIG. 43, wherein the Figure has been annotated to show current flow through the busbar cooling system.
Figures 45, 46:
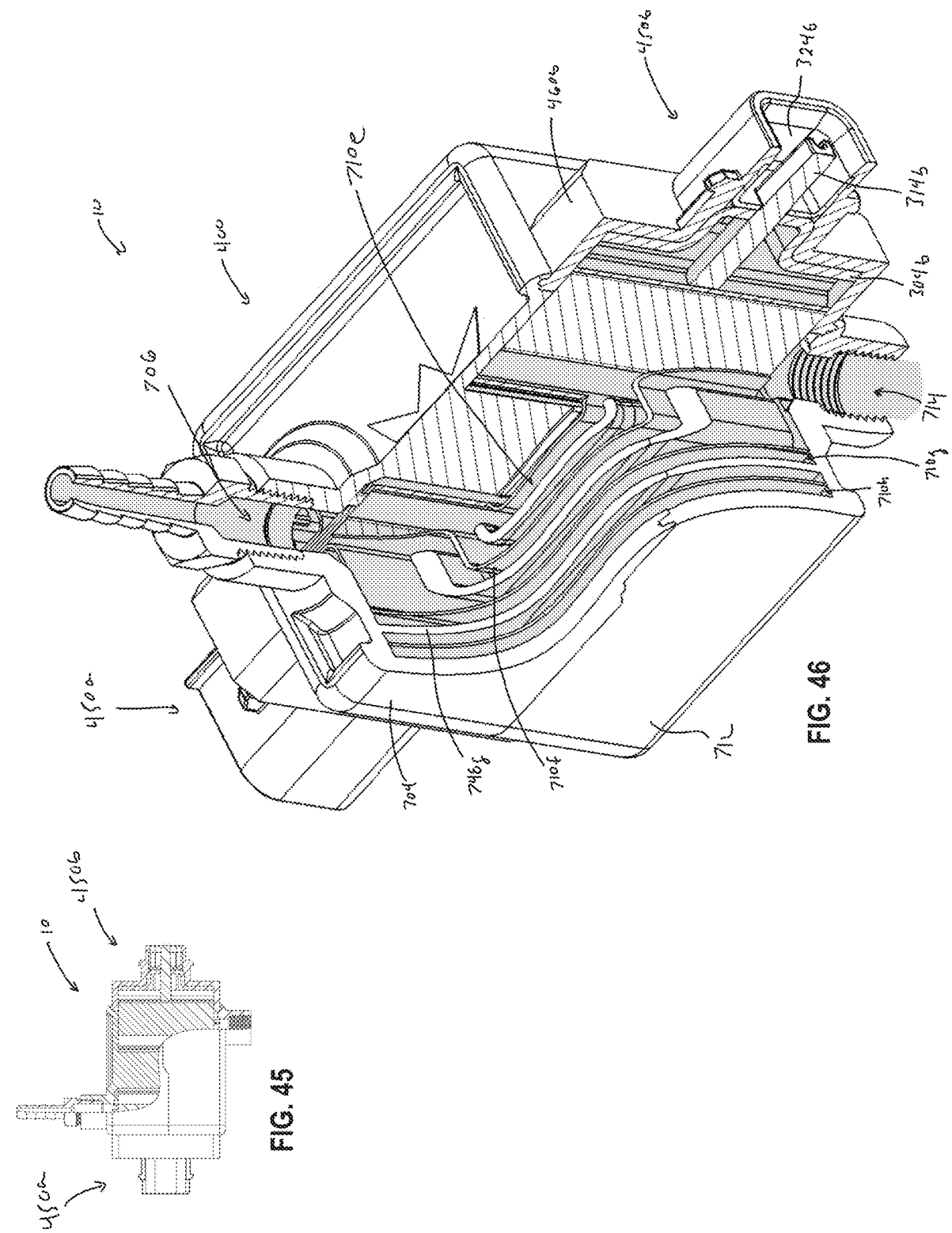
FIG. 45 is a side view of the busbar cooling system of FIG. 22, wherein an portion of the busbar cooling system has been cutaway to reveal an inner extent of housing and the conductive assembly.
FIG. 46 is a perspective view of the busbar cooling system of FIG. 45, wherein the Figure has been annotated to show fluid flow through the busbar cooling system.

FIGS. 44 and 46 have been included herein to illustrate the operation of system 10, wherein FIG. 44 has been annotated to show an electrical flow path through the system 10 and FIG. 46 has been annotated to show a fluid flow path through the system 10. To show the electrical current flow path, the conductive elements of system 10 are shown with orange highlighting in FIG. 44. In particular, the electrical flow path through the system 10 includes: (i) the upstream busbar 5a, (ii) the male charging connector assembly 6, which includes electrical flow through the male terminal assembly (e.g., contact arm), (iii) the female terminal 324a, which includes electrical flow through the sidewall sidewalls 328a-328d and into the rear wall 330, (iv) the adaptor assembly 304a, (v) the internal cooling core 150, including electrical flow through the current receiving segment 158, the cooling segment 164, and the current providing segment 168, (vi) the adaptor assembly 304b, (vii) the female terminal 324b, which includes electrical flow through the sidewalls 328a-328d and into the rear wall 330, (viii) the male charging connector assembly 6, which includes electrical flow through the male terminal assembly (e.g., contact arm), and (ix) the downstream busbar 5b. To note, the housing 700 is not highlighted in this orange color because it is made from a non-conductive material.

Similar to FIG. 44, the cavities 710a-710h have been annotated with blue highlighting to show how the fluid enters and moves through the system 10. In particular, the fluid flow path through the system 10 includes: (i) hose fitting 708, (ii) inlet opening 706, (iii) fluid distribution assembly 800a, which includes channels 804a-804g, (iv) cavities 710a-710h, and (v) outlet opening 714. To note, the housing 700 and the conductors 154 are not highlighted in this blue color because the fluid enters into housing 700 and flows around the conductors 154 and is not absorbed by either one of these structures.

As described above, the length of the concentric arrangement of conductors 154a-154h is approximately 28% greater than the total length of all conductors contained in the conventional rectangular busbar CRB. This increase in length also increase the resistance of the internal cooling core 150 as compared to the resistance of the conventional rectangular busbar CRB, wherein the total resistance of the internal cooling core 150 is about 30.5% larger than the total resistance of the conventional rectangular busbar CRB. While the concentric arrangement of conductors 154a-154h increased both the length and resistance over the conventional rectangular busbar CRB, it also increased the surface area by approximately 1,044% or about 10.4 times. This substantial increase in surface area leads to an even greater increase in thermal conductivity, as the thermal conductivity is calculated by multiplying the surface area by the thermal conductivity constant of the material and dividing that result by the thickness of the material. As such, the thermal conductivity of the internal cooling core 150 is approximately 83 times greater than the thermal conductivity of the conventional rectangular busbar CRB that is configured to extend between the current inlet assembly 300a and the current outlet assembly 300b. Said 83× increase amounts to approximately an 8,300% increase, which is determined by dividing the thermal conductivity of internal cooling core 150 (67,709,421 J/s·m·° C.) by the thermal conductivity of the conventional rectangular busbar (810,615 J/s·m·° C.). Because the percent increase in the thermal conductivity of the internal cooling core 150 is several hundred times greater than the percent increase in the resistance of the internal cooling core 150, the system 10 enjoys at least the following significant benefits over a conventional cooling system: (i) the size of the busbar 5 to be substantially reduced, (ii) the current carrying capacity, which complying with the standard 55 degrees C. rise over ambient, to be substantially increased, and/or (iii) the ability to use other non-traditional materials (e.g., aluminum, brass, graphene, zinc, nickel, bronze, iron, steel, lead, stainless steel, and/or any combination thereof) in the power distribution system 10. In light of the above calculations, preliminary testing by the owner of the present Application has shown that the system 10 allows for: (i) increasing, and potentially doubling, the current carrying capacity of the upstream and downstream busbars 5a, 5b, and/or (ii) significantly reducing the dimensions of the upstream and downstream busbars 5a, 5b, which reduces the material and fabrications costs of these components.

Figure 52:
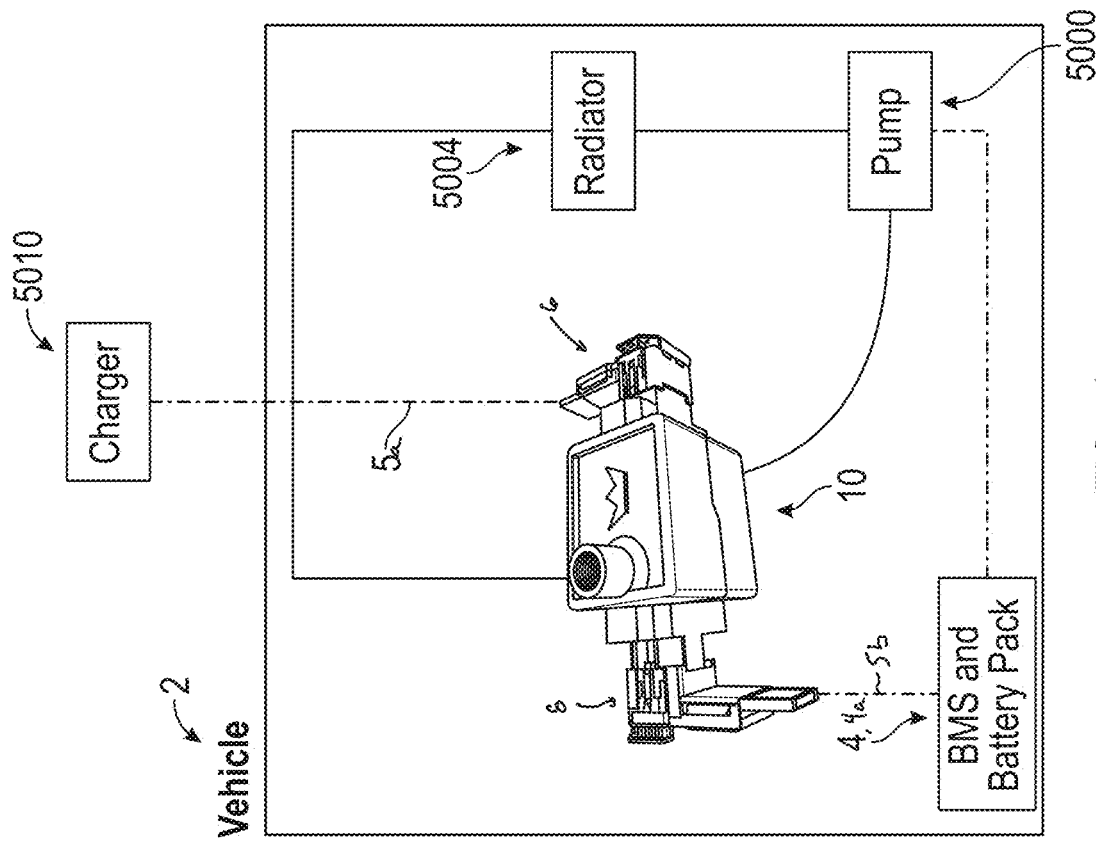
FIG. 52 is a diagram showing a first installation environment of the inventive busbar cooling system.
Figure 53:
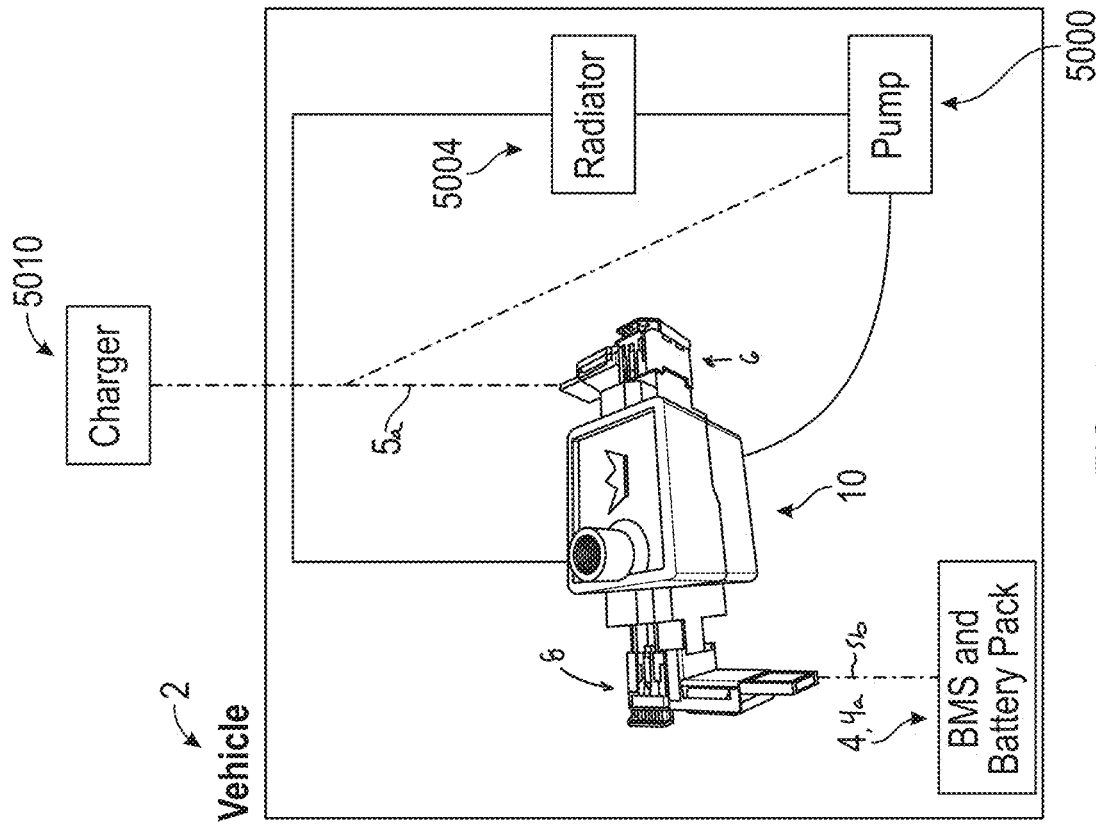
FIG. 53 is a diagram showing a second installation environment of the inventive busbar cooling system.

As described above, system 10 may be installed in multiple different configurations, wherein each configuration has a unique benefit. In a first configuration shown in FIG. 52-53, the busbar cooling system 10 may be completely separate from the vehicle's active cooling system. In this configuration, the busbar cooling system 10 includes a separate pump 5000 and a separate radiator 5004. The separate pump 5000 that is associated with the system 10 may be either powered by: (i) only the external DC charging system 5010, as shown in FIG. 52, and is not powered by the vehicle's battery pack 4 (i.e., does not drain the vehicle's battery pack 4 in any manner), or (ii) vehicle's battery pack 4 when the external DC charging system 5010 is coupled to the vehicle, as shown in FIG. 53. The configuration shown in FIG. 52 is beneficial because there is no drain on the vehicle's battery in any state (e.g., while charging or not charging).

FIG. 54 show another configuration, wherein the busbar cooling system 10 is fully integrated into the vehicle's active cooling system and does not require a separate pump or radiator. While this configuration eliminates the weight, cost, and space considerations associated with the pump and radiator requirements of the first configuration, this configuration requires proper plumbing to connect the fluid ports to the vehicle's active cooling. As such, this configuration cannot be retrofitted within a previously designed active cooling system without significant modifications.

Figure 55:
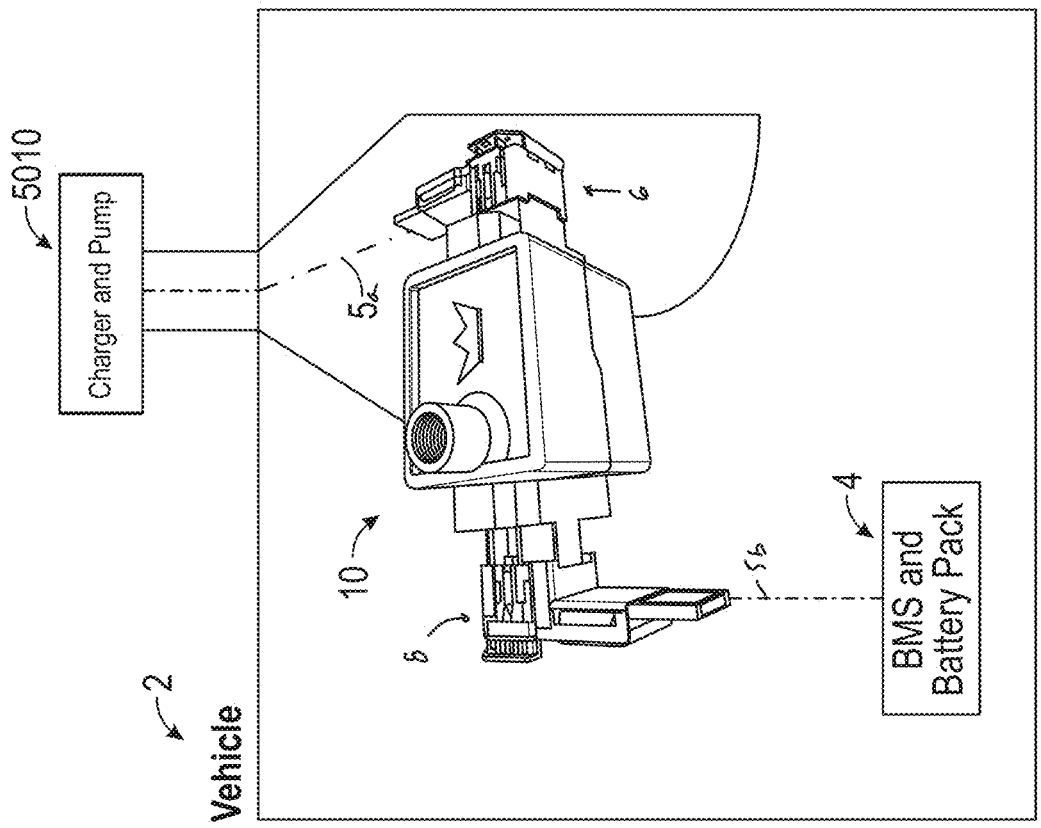
FIG. 55 is a diagram showing a fourth installation environment of the inventive busbar cooling system.

FIG. 55 shows a final configuration, wherein the busbar cooling system 10 may receive fluid from a device (e.g., external DC charging system) that is exterior to the vehicle. This configuration is beneficial because it does not require the pump and radiator requirements of the first configuration and does not require integration into the vehicle's current active cooling system of the second configuration; however, this configuration requires either multiple connections between the external DC charging system and the vehicle or it requires the passing of fluid adjacent a high power connector.

Figure 49:
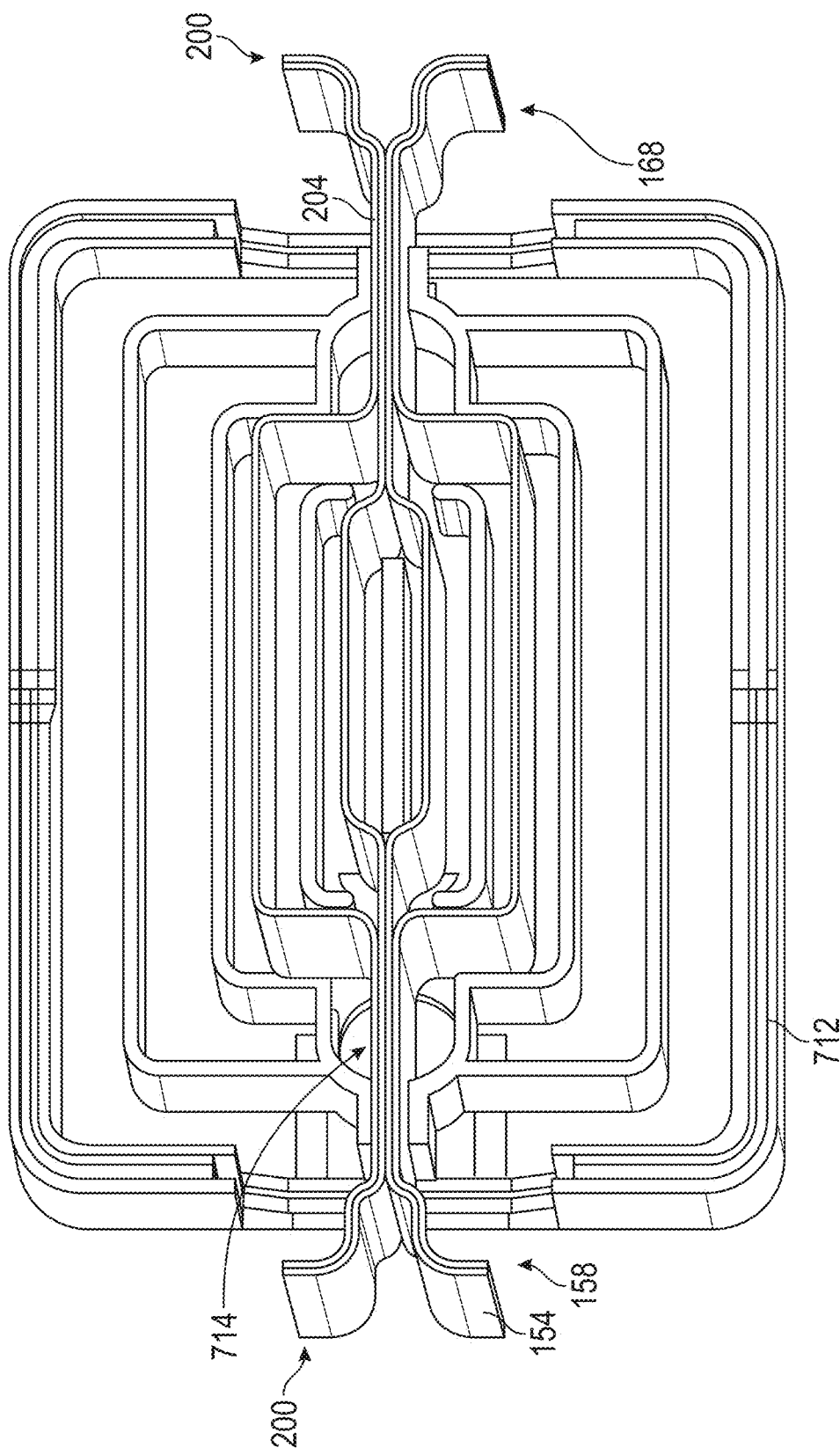
FIG. 49 shows a second embodiment of the internal cooling core positioned within the lower housing of the busbar cooling system of FIG. 1.
Figure 50:
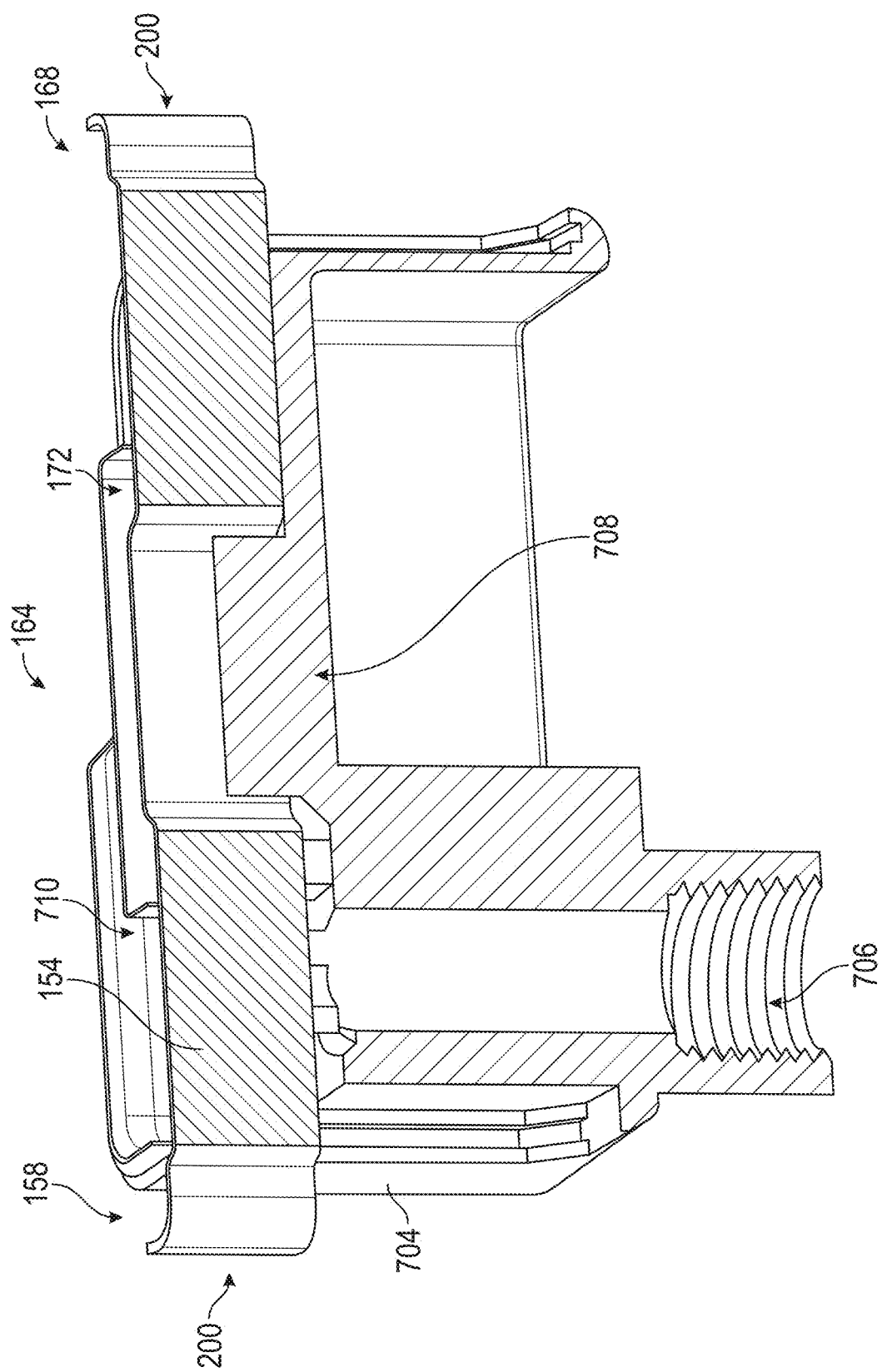
FIG. 50 is a cross-sectional view taken along the longitudinal axis of the second embodiment of the internal cooling core and the lower housing of FIG. 49.
Figure 51:
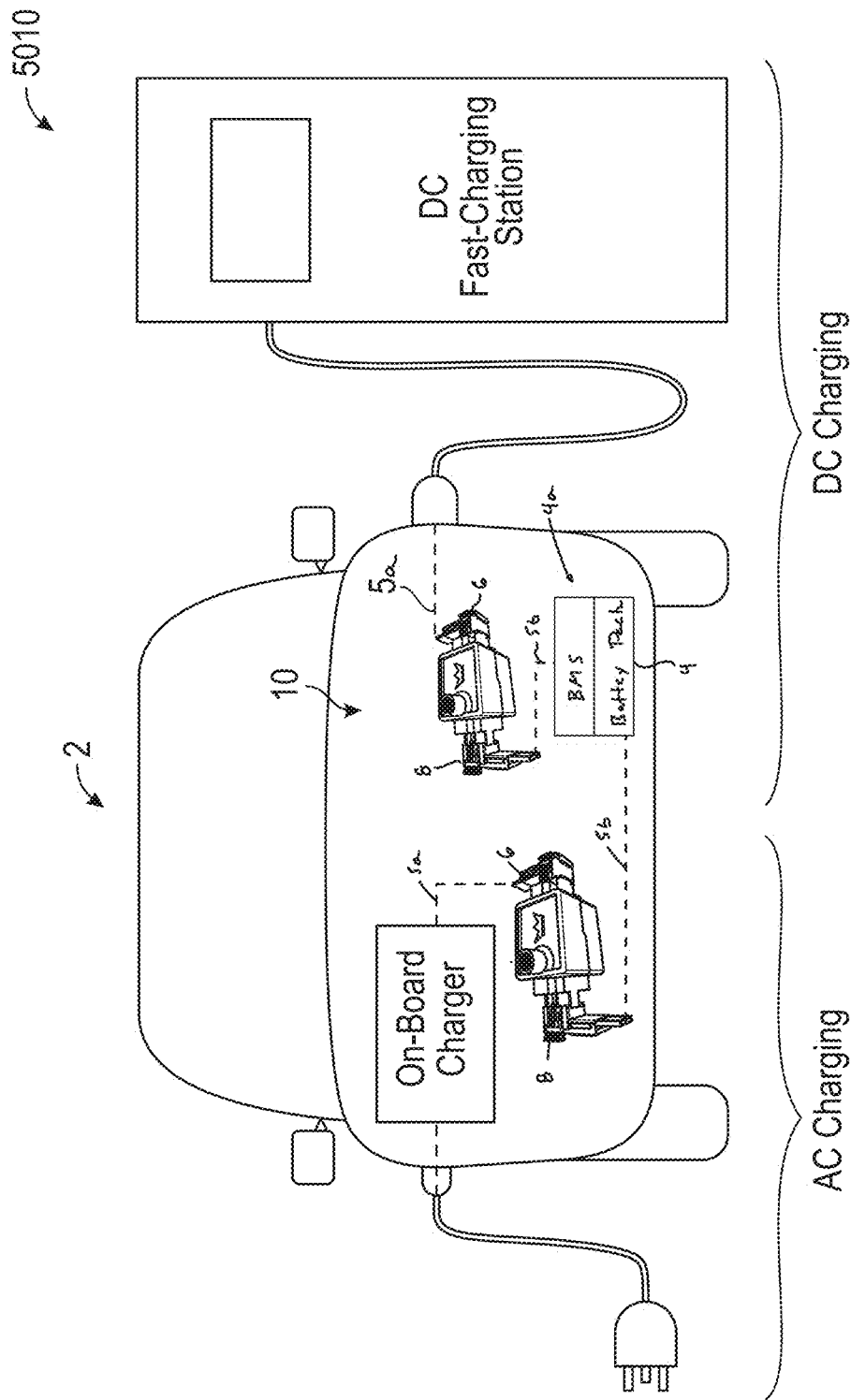
FIG. 51 is a diagram showing a vehicle, an AC charging system, and a DC charging system, and wherein the busbar cooling system is positioned between the battery management system (BMS) and battery units and the DC fast-charging station.

As shown in FIGS. 49 and 50, another beneficial factor of system 10 is the fact that different internal cooling cores 150 may be utilized without changing the other components contained within system 10. Utilizing different internal cooling cores 150 is desirable because they can be appropriately sized to the busbar 5 that they are coupled to and the current applied to said busbar 5. Specifically, FIGS. 49 and 50 show how a lower current application may replace the inner core 150 (i.e., shown in FIGS. 1-48) that has eight individual conductors 154 and a height of 50 mm with an inner core 150a (i.e., shown in FIGS. 49-50) that has four individual conductors 154a-154d and a height of 11 mm. This reduces the system's 10 weight and cost, without requiring a redesign of the system 10 or a comprehensive change of components. It should be understood that while the internal cooling core 150 can be changed to be appropriately sized for the current application, the design may choose to oversize the internal cooling core 150 or may choose to utilize the same size internal cooling core 150 for all of the systems 10 that are contained within a specific application to minimize the change that the wrong system 10 was installed in the wrong location. Nevertheless, the ability to change the internal cooling core 150 to match the desired application provides a significant benefit over conventional systems.

V. Second Embodiment of the System

Similar to system 10 as described above, FIGS. 58-76 show another embodiment of system 1010. For the sake of brevity, the above disclosure regarding system 10 will not be repeated below, but it should be understood that across both embodiments of the system 10, 1010 like numbers represent like structures. For example, the foregoing disclosure relating to the internal cooling core 150 applies in equal force to the internal cooling core 1150 of this second embodiment 1010. Further, it should be understood that the design of both internal cooling cores 150, 1150 are substantially similar.

A primary difference between these two embodiments 10, 1010 is the fact that the second cooling system 1010 does not include separate connectors 6, 8 located in the current inlet/outlet assemblies 300a, 300b; instead, the busbar 1100 extends directly and continuously through the housing 1700. In other words, the internal cooling core 1150 is comprised of the individual conductors 1154 that comprise the busbar 1100. The configuration of the housing 1400 helps reduce the number of components that are required for the system 1010.

Due to the design and configuration of the system 1010, the busbar 5 has a configuration where the individual conductors 1152 that comprise the busbar 5 can be separated from one another into distinct items within the housing 1700. Conventional flexible busbars may be employed with the system 1010, but additional design considerations should be undertaken to ensure that fluid cannot escape the housing 1700 between the conductors 1152. For example, this potential issue may be solved by coupling the conductors 152 to one another where the conductors enter and exit through the apertures formed in the housing 1700. Alternatively, the busbar that is described with PCT Application Nos. PCT/US2020/50018 may be utilized because segments of that busbar are rigid (e.g., conductors 1152 are coupled to one another) and other segments of that busbar are flexible (i.e., conductors 1152 are not coupled to one another or are partially coupled to one another).

Due to the omission of the connectors and the requirement that the internal cooling core 1150 is an integral aspect of the busbar 5, this second embodiment of the system 1010 is not as modular and requires upfront design considerations to incorporate it into the system 10. However, if these consideration are addressed and managed, then this the system 1010 can effectively cool the busbar 5 because it does not require additional components (e.g., connectors) that increase the resistance of the overall system and in turn increases the heat that needs to be cooled during operation of the system 1010. Additionally, the reduction in the number of parts increases the systems 1010 durability while reducing both the manufacturing cost of the system 1010 and potential failure points of the system 1010.

MATERIALS AND DISCLOSURE THAT ARE INCORPORATED BY REFERENCE

PCT Application Nos. PCT/US21/57959, PCT/US21/33446, PCT/US21/43686, PCT/US21/47180, PCT/US21/43788, PCT/US2020/50018, PCT/US2020/50016, PCT/US2020/49870, PCT/US2020/14484, PCT/US2020/13757, PCT/US2019/36127, PCT/US2019/36070, PCT/US2019/36010, and PCT/US2018/019787, U.S. patent application Ser. No. 16/194,891, U.S. Provisional Applications 63/159,689, 63/234,320, 63/222,859, and U.S. Design patent application Ser. Nos. 29/749,813, and 29/749,790, each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935-18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc. Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof.

INDUSTRIAL APPLICABILITY

While some implementations have been illustrated and described, numerous modifications come to mind without significantly departing from the spirit of the disclosure; and the scope of protection is only limited by the scope of the accompanying claims. For example, the overall shape of the of the components described above may be changed to: a triangular prism, a pentagonal prism, a hexagonal prism, octagonal prism, sphere, a cone, a tetrahedron, a cuboid, a dodecahedron, an icosahedron, an octahedron, an ellipsoid, or any other similar shape.

It should be understood that the following terms used herein shall generally mean the following:
  a. "High power" shall mean (i) voltage between 20 volts to 600 volts regardless of current or (ii) at any current greater than or equal to 80 amps regardless of voltage.
  b. "High current" shall mean current greater than or equal to 80 amps regardless of voltage.
  c. "High voltage" shall mean a voltage between 20 volts to 600 volts regardless of current.
  d. "Vehicle" shall mean an airplane, motor vehicle (e.g., car, van, pick-up truck, SUV), a military vehicle (e.g., tank, personnel carrier, heavy-duty truck, and troop transporter), a bus, a locomotive, a tractor, marine applications (e.g., cargo ship, tanker, pleasure boat, submarine and sailing yacht), telecommunications hardware (e.g., server), a power storage system (e.g., backup power storage), renewable energy hardware (e.g., wind turbines and solar cell arrays), a 24-48 volt system, for a high-power application, for a high-current application, for a high-voltage application.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A busbar cooling system for a motor vehicle, the busbar cooling system comprising:
   an enclosure with a non-conductive upper housing and a non-conductive lower housing that are configured to permit fluid to flow through the busbar cooling system, the upper housing having an upper internal wall arrangement and the lower housing having a lower internal wall arrangement, wherein the upper and lower internal wall arrangements collectively define a plurality of distinct and concentrically arranged cavities;
   a conductive assembly that is configured to permit electrical current to pass through the busbar cooling system, said conductive assembly includes an internal cooling core having a plurality individual conductors that are concentrically arranged in a spaced apart relationship to one another; and
   wherein each cavity is configured to receive a substantial extent of one of the conductors of the internal cooling core.

2. The busbar cooling system of claim 1, wherein each pair of concentrically arranged conductors has a unique configuration based upon the positional arrangement within the internal cooling core.

3. The busbar cooling system of claim 1, further comprising:
   a charging connector assembly located between a first busbar and a current inlet casing affixed to an inlet end of the enclosure; and,
   a discharging connector assembly located between a second busbar and a current outlet casing affixed to an outlet end of the enclosure.

4. The busbar cooling system of claim 3, wherein a current inlet assembly resides within the current inlet casing, the current inlet assembly being electrically connected to an inlet portion of the internal cooling core.

5. The busbar cooling system of claim 3, wherein a current outlet assembly resides within the current outlet casing, the current outlet assembly being electrically connected to an outlet portion of the internal cooling core.

6. The busbar cooling system of claim 1, wherein the conductive assembly includes a current inlet assembly and a current outlet assembly.

7. The busbar cooling system of claim 6, wherein during operation of the busbar cooling system, a current flow path is provided from a supply busbar to the current inlet assembly, through the internal cooling core and then through the current outlet assembly to an exit busbar.

8. The busbar cooling system of claim 1, wherein the conductive assembly includes a current receiving segment that resides within a first aperture formed in both the upper and lower housings of the enclosure.

9. The busbar cooling system of claim 8, wherein the conductive assembly includes a current providing segment that resides within a second aperture formed in both the upper and lower housings of the enclosure.

10. The busbar cooling system of claim 1, wherein the upper and lower internal wall arrangements each includes a centermost wall and at least one pair of internal walls that are located external to the centermost wall.

11. The busbar cooling system of claim 10, wherein the at least one pair of internal walls comprises a first pair of internal walls that are outwardly spaced from the centermost wall to define a first pair of cavities.

12. The busbar cooling system of claim 11, wherein the at least one pair of internal walls comprises (i) a first pair of internal walls that are separated by a first gap and (ii) a second pair of internal walls that are separated by a second gap, and wherein the first and second gaps are aligned with the centermost wall.

13. The busbar cooling system of claim 12, wherein the first and second gaps and the centermost wall are aligned with a first aperture formed in both the upper and lower housings of the enclosure.

14. The busbar cooling system of claim 13, wherein the first and second gaps and the centermost wall are aligned with a second aperture formed in both the upper and lower housings of the enclosure.

15. The busbar cooling system of claim 1, wherein the internal cooling core is bathed with a cooling fluid within the enclosure during operation of the busbar cooling system.

16. The busbar cooling system of claim 15, wherein the upper housing has an inlet port that supplies cooling fluid to the internal cooling core and the lower housing has a discharge port that that drains cooling fluid from the internal cooling core and the enclosure to define a cooling fluid flow path.

17. The busbar cooling system of claim 16, wherein the upper housing has a fluid distribution assembly that extends from the inlet port to supply cooling fluid into the cavities and to the internal cooling core to further define a cooling fluid flow path.

18. The busbar cooling system of claim 17, wherein the fluid distribution assembly comprises a plurality of channels formed in a wall of the upper housing, and wherein the channels extend from the inlet port to supply cooling fluid into the cavities and to the internal cooling core to further define the cooling fluid flow path.

19. The busbar cooling system of claim 1, wherein a first pair of conductors of the internal cooling core reside in a first set of cavities that are adjacent to a centermost wall of the upper and lower housings, wherein a second pair of conductors of the internal cooling core reside in a second set of cavities that are located outward of the first set of cavities, wherein a third pair of conductors of the internal cooling core reside in a third set of cavities that are located outward of the second set of cavities, and wherein a fourth pair of conductors of the internal cooling core reside in a fourth set of cavities that are located outward of the third set of cavities and inward of external walls of the upper and lower housings.

* * * * *